United States Patent [19]

Sabaliauskas

[11] Patent Number: 5,359,510
[45] Date of Patent: Oct. 25, 1994

[54] AUTOMATED UNIVERSAL TOURNAMENT MANAGEMENT SYSTEM

[76] Inventor: Anthony L. Sabaliauskas, 2004 Glenwood Ave., Papillion, Nebr. 68128

[21] Appl. No.: 976,460

[22] Filed: Nov. 13, 1992

Related U.S. Application Data

[63] Continuation of Ser. No. 619,293, Nov. 28, 1990, abandoned.

[51] Int. Cl.[5] ............................................. G06F 15/44
[52] U.S. Cl. .................................... 364/410; 364/411; 273/DIG. 26
[58] Field of Search ....................... 364/410, 411, 412; 273/DIG. 26, DIG. 28

[56] References Cited

U.S. PATENT DOCUMENTS

| | | | |
|---|---|---|---|
| 4,910,677 | 3/1990 | Remedio et al. | 364/410 |
| 5,083,271 | 1/1992 | Thacher et al. | 364/411 |
| 5,101,354 | 3/1992 | Mowers et al. | 364/410 |
| 5,127,044 | 6/1992 | Bonito et al. | 379/88 |

OTHER PUBLICATIONS

UNISYS, "Unisys Will Provide Scoring and Stats as The Official Computer Company of the 1987 U.S. Tennis Open" Neswire, Aug. 24, 1987.

*Primary Examiner*—Roy N. Envall, Jr.
*Assistant Examiner*—A. Bodendorf
*Attorney, Agent, or Firm*—John A. Beehner

[57] ABSTRACT

The present invention provides a system capable of scheduling conventional tournaments. The system may also be made universal in that the system may be adapted for use in different types of tournaments such as single or double elimination tournaments for any type of tournament event. The tournament management system includes a digital computer having a processor operating under a set of instructions, memory, at least one input port, and at least one output port. Also included is a data entry device such as a keyboard for entering and converting tournament information into machine readable data signals. The data entry device is connected to the computer via a first data transfer device. Tournament information data signals are received and stored in computer memory for processing by the processor. The digital computer processes the tournament information according to a set of instructions that calls other processes to schedule matches according to a reasonable tournament schema in order to produce a match scheduling and tournament results chart. The processed tournament information is organized into a match scheduling and tournament results chart which schedules the tournament and the tournament information may then be transferred to an output device by a second and transfer device informing tournament officials, referees, teams/players, and spectators of the tournament status.

17 Claims, 59 Drawing Sheets

```
═ 30 Oct 90 ═══ THE TOURNAMENT KING ═══ 10:47 AM ═
┌──────────────┐
│ PRO SINGLES  │
└──────────────┘
═════════ GAME CALCULATOR ═══ DOUBLE ELIMINATION ═

Enter in some numbers ( use reasonable values ) :

CHART SIZE        : 0
        NUMBER OF BYES    : 0
        LENGTH OF MATCH   : 0
        NUMBER OF BOARDS  : 0
        ─────────────────────────
        = LENGTH OF GAME  : 0 HRS.  0 MINS.

( Length of Game is just an Approximation )

Type in numbers and hit the RETURN key to enter
           or Hit the ESC key to Exit
```

Fig. 20

```
================================================================
 30 Oct 90 === THE TOURNAMENT KING === 10:53 AM
┌──────────────┐
│ PRO SINGLES  │=== SINGLE ELIMINATION ===
└──────────────┘
              === PLAYERS DATABASE ===

PLAYER #: 1

NICKNAME   :
        FIRST NAME :
        LAST NAME  :
        STREET     :
        CITY       :
        STATE      :
        ZIP        :

Enter a Player

Type in letters and hit the RETURN key to enter
              or Hit the ESC key to Exit
================================================================
```

Fig. 28

| PRO SINGLES | | | 10:11 AM | |
|---|---|---|---|---|
| NICKNAME | BRACKET | BOARD | TIME | STATUS |
| AL ALLAN | W | 1 | 10:30a | |
| BOB ROBERTS | W | 11 | 10:45a | ON-HOLD |
| DART SHARK | W | 23 | 10:30a | |
| FRANK FUHRTER | L | 2 | 10:30a | |
| GORGEOUS GEORGE | W | 1 | 10:30a | |
| JEFF JEFFRIES | W | 15 | 10:45a | RE-SCHED |
| LARRY LAWRENCE | L | 8 | 11:00a | |
| LOU LEWIS | L | 11 | 10:45a | ON HOLD |
| MARVELOUS MARV | W | 7 | 11:00a | |
| MIKE MICKELAS | W | 3 | 10:30a | |
| NICK NICKOLS | W | 8 | 11:00a | |

FIG. 55

AUTOMATED UNIVERSAL TOURNAMENT MANAGEMENT SYSTEM

CROSS-REFERENCE TO RELATED APPLICATION

This is a continuation of patent application Ser. No. 07/619,293 filed on Nov. 28, 1990, now abandoned.

BACKGROUND OF THE INVENTION

1. Technical Field

This present invention is directed to tournament scheduling and match result tracking devices and more particularly to a universal tournament management system capable of scheduling tournament matches.

2. Description of the Prior Art

Scoring devices are well known in the sporting arts. Both analog and digital scoring devices are available for games of skill such as golf, bowling, pool, horseshoes, and the like.

While such devices are capable of keeping track of individual scores or games they are not capable of managing tournaments. In order to manage a tournament at least the following information is necessary:

tournament type information:
  single or double elimination (with or without round scheduling); and
  chart size;
team/player information:
  team/player names; and
  number of teams/players;
match time and location information:
  number of match sites;
  type of match sites (i.e., bowling lanes, dart boards, tennis courts, etc.);
  tournament start time; and
  average match length.

This information, collectively known as tournament information, must then be processed according to a set of reasonable tournament conventions. For example, once "team/player information" has been determined it is necessary to match the teams/players according to a fixed schema dependent on the number of teams/players. The next step is to determine the location and time of each match based on "match time and location information." Match location and time is also determined according to a reasonable tournament convention and is dependent on the type, number of available match sites, and average match length.

Both "team/player information" and "match time and location" information are dependent on "tournament information." For example, in a single elimination tournament matches will be scheduled differently from those in a double elimination tournament. Likewise, the number of initial matches scheduled (chart size) is seminal and all other information is scheduled around "tournament type information." Thus, a tournament management system may be universal in that it is adaptable to manage all types of tournaments or restricted to a particular size or type of tournament. If the system is universal it must be capable of selectively applying different match scheduling criteria in order to allocate teams/players in a reasonable tournament convention.

Known to the art of managing tournaments are various devices that receive data signals from a plurality of games of skill and that are then capable of determining the high score and announcing a winner among the collective players playing individually on the games of skill connected to the device. A device of this type is disclosed by Klayh, Canadian Patent No. 1 245 361. However, this device does not schedule tournaments--it only determines the winner (based on a high score) of a single widely played video game match.

Countless amateur and professional tournaments are played each year. These tournaments usually involve some type of athletic event (such as tennis, racquetball, softball, baseball, golf, bowling, racing, or the like) or a game of skill (such as darts, chess, pool, horseshoes, marksmanship, or the like). Tournaments of this type require a more complex schema since they are operated under a conventional single or double elimination protocol. A system capable of managing such tournaments has not been available until now.

3. Objects of the Invention

Therefore, it is a principal object of the present invention to provide an automatic tournament management system that is capable of scheduling conventional tournament matches.

Another object of the present invention is to provide an automatic tournament management system that may be user selected and operated for any type of conventional tournament.

Another object of the present invention is to provide an automatic universal tournament management system that is self-contained and operable independent of any electrical communication with any other devices operated by a team/player.

Another object of the present invention is to provide an automatic universal tournament management system that is portable.

Another object of the present invention ms to provide an automatic universal tournament management system that may manage a plurality of tournaments simultaneously.

Another object of the present invention ms to provide an automatic universal tournament management system that may be readily adapted for use in conventional arcade type games.

Another object of the present invention is to provide an automatic universal tournament management system that is capable of producing updatable tournament chart information.

Another object of the present invention is to provide an automatic universal tournament management system which is capable of producing tournament match cards.

Another object of the present invention ms to provide an automatic universal tournament management system that is durable in use and economical to manufacture and use.

Another object of the present invention ms to provide an automatic universal tournament management system which is efficient in operation and refined in appearance.

Another object of the present invention is to provide an automatic universal tournament management system which is easy to install, simple to use, and trouble free.

Finally, another object of the present invention is to provide an automatic universal tournament management system that simplifies tournament management. These and other objects will be apparent to those skilled in the art.

SUMMARY OF THE INVENTION

The present invention provides a system capable of scheduling tournament matches of conventional sports or games of skill tournaments. The system may also be made universal in that means may be provided for adapting the system for use in different types of tournaments such as single or double elimination tournaments for any event. The tournament management system includes a digital computer having a processor operating under a set of instructions, memory, at least one input port, and at least one output port. Also included is a data entry means for entering and converting tournament information into machine readable data signals. The data entry means is connected to the computer via a first data transfer means. Tournament information data signals are received and stored in computer memory for processing by the processor.

The digital computer processes the tournament information according to a set of instructions that calls other processes to schedule matches according to a reasonable tournament schema in order to produce processed tournament information. The processed tournament information may then be transferred to an output device by a second data transfer means.

So that tournament officials, referees, teams/players, and spectators can know the status of any particular team/player or the tournament as a whole various display means are also provided. For example, processed tournament information may be printed on a conventional printer in the form of a tournament chart, or displayed on a plurality of computer/digital process controlled displays located about the tournament locus in quo.

In this manner tournament information is available at all times to tournament officials, referees, teams/players, and spectators.

BRIEF DESCRIPTION OF THE DRAWINGS

Other objects and advantages of the invention will become apparent upon reading the following detailed description and upon reference to the drawings, in which:

FIG. 20 is an illustration of the game calculator input screen of a preferred embodiment of the automatic universal tournament management system adapted to manage dart tournaments;

FIG. 28 is an illustration of the players database information input screen of the players database selection submenu of the setup menu of a preferred embodiment of the automatic universal tournament management system adapted to manage dart tournaments;

FIG. 55 is an illustration of a sample display listing tournament information on one of the scheduling monitors While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DESCRIPTION OF THE PREFERRED EMBODIMENT

Five embodiments of the present invention are illustrated in the present application in FIGS. 1 through 5. In each of these embodiments a conventional personal computer is utilized. This computer may be any readily available 8, 16, or 32 bit machine having at least one input and output port, sufficient random access memory (at least 256 kbytes), and a hard disk storage device with at least 2 Mbytes of available storage space. In a preferred embodiment either an IBM ® compatible or Apple ® compatible machine is favored since they are readily available.

In a preferred embodiment the computer 14 is also supplied with a keyboard for inputting tournament information into the computer. At least one display or monitor 18 (preferably color) is also connected to the computer 14.

Figure 1:
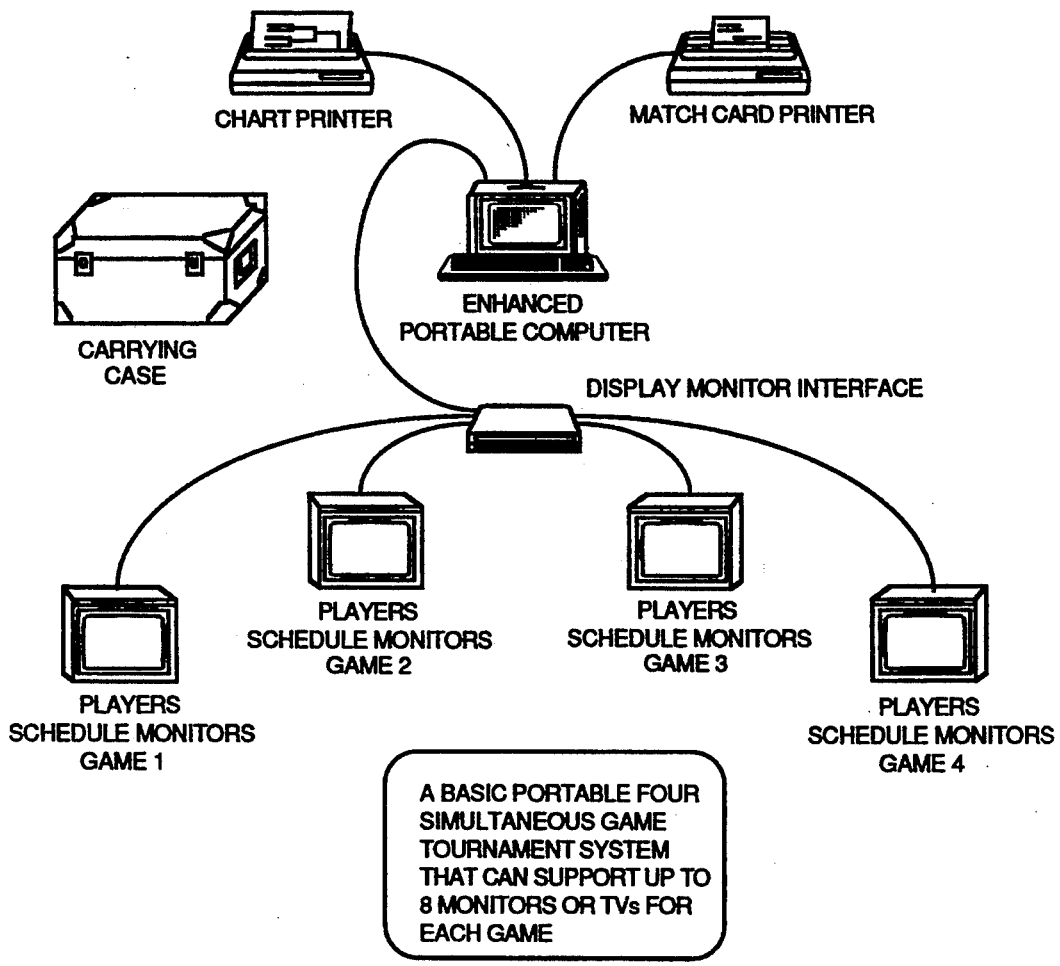
FIG. 1a is a diagrammatic view of a portable preferred embodiment of the universal tournament management system showing the primary hardware components of a portable embodiment of the device.
FIG. 1b is a diagrammatic view of a portable multi-tournament embodiment of the universal tournament management system capable of four tournaments at a time.
Figure 1A:
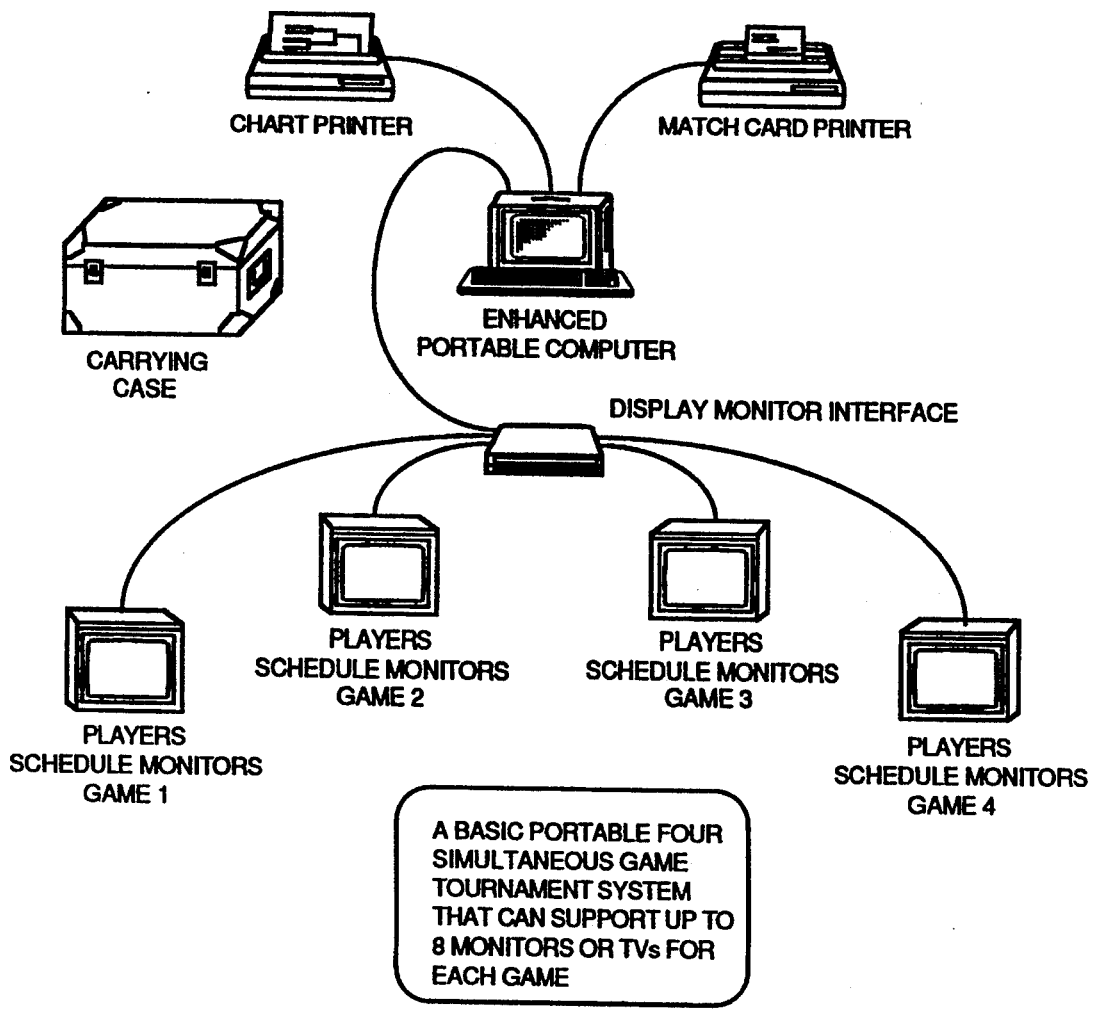
Figure 1B:
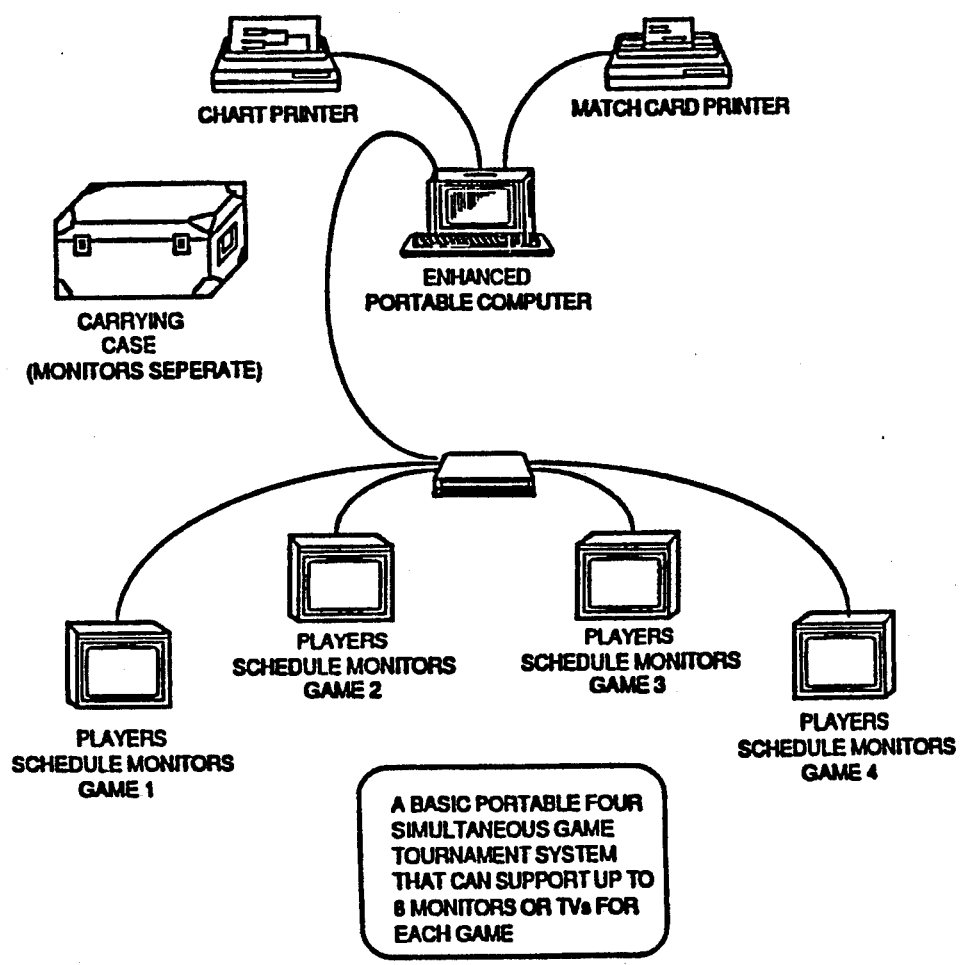

FIG. 1 illustrates a preferred portable system 10 adapted to schedule a small tournament. The system 10 may be stored, delivered, and unpacked from a suitable storage case 12 at the tournament site.

The system includes an IBM ® personal computer 14 such as a Model 30 having an Intel ® 80286 microprocessor, a 3.5 inch 1.44 Mbyte disk drive 16, a 40 Mbyte hard disk, and approximately 1.0 Mbytes of random access memory.

Also included is a VGA compatible monitor 18 and driver, and a conventional keyboard 20. So that tournament information may be displayed about the tournament location a plurality of tournament schedule monitors 22 may be provided. These monitors 22 may be monochrome in order to save cost. For optimum results the monitors are preferably spread out around the tournament location. The monitors are connected to the computer 14 via a display monitor interface 24.

In order to apprise tournament officials, referees, teams/players, and spectators of the tournament status a plurality of updatable tournament wall charts 26 may be provided. These wall charts 26 may be printed in segmented portions 28 by a chart printer 30 connected via the first output port of the computer 14 (FIG. 55a and 55b).

So that teams/players may know the location and time of their next match a match card printer 32 is also provided. The card printer 32 is connected to the second output port of the computer 14 for printing match cards 34. These cards 34 are provided to each team/player before each match. The cards give the location of the next match, the name of the match opponent, the place played for, and a notation blank for the winner. After each match the winning team/player is noted on the card 34 and the card 34 is returned to the system operator for input into the computer 14 via the keyboard 20.

Figure 2:
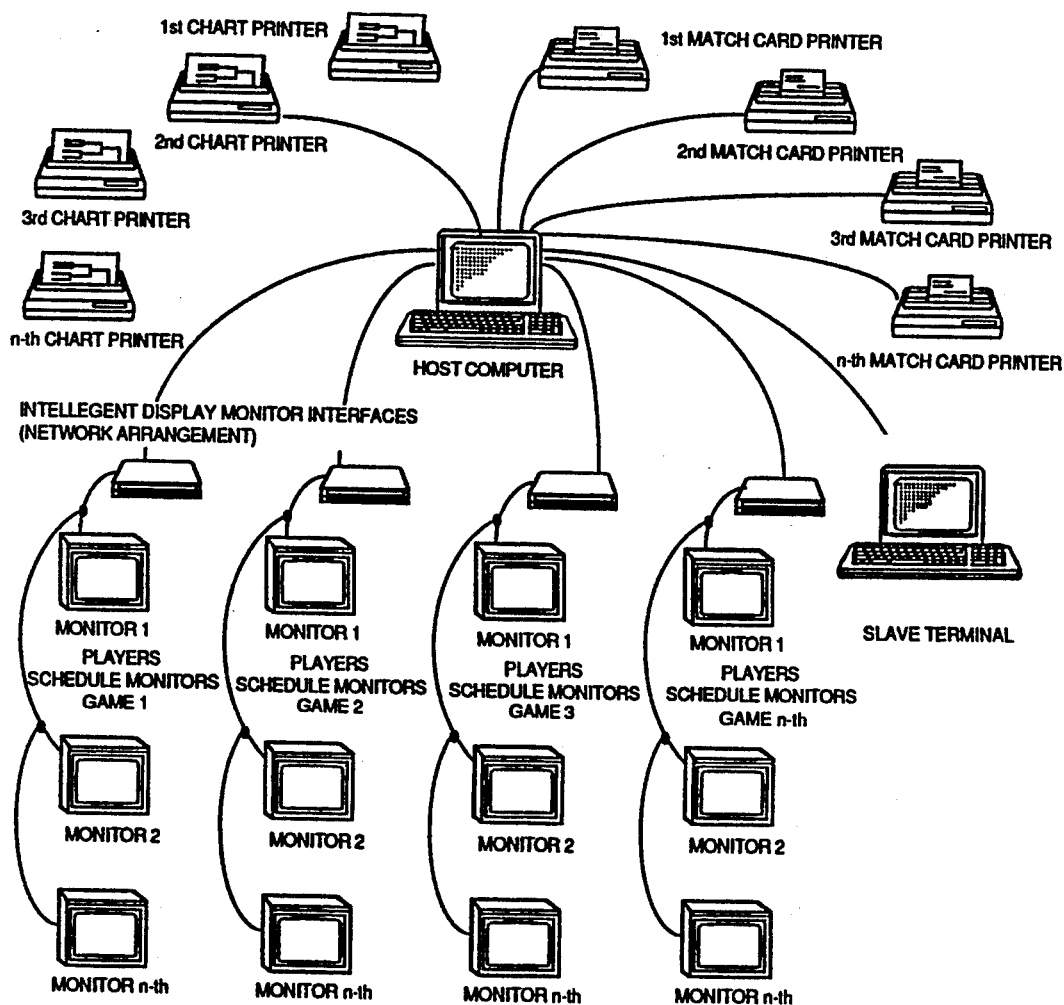
FIGS. 2 and 2a are diagrammatic views of a slave terminal preferred embodiment of the universal tournament management system showing the inventions adaptability, expendability, and the systems capability of communicating with standard video arcade games.
Figure 2A:
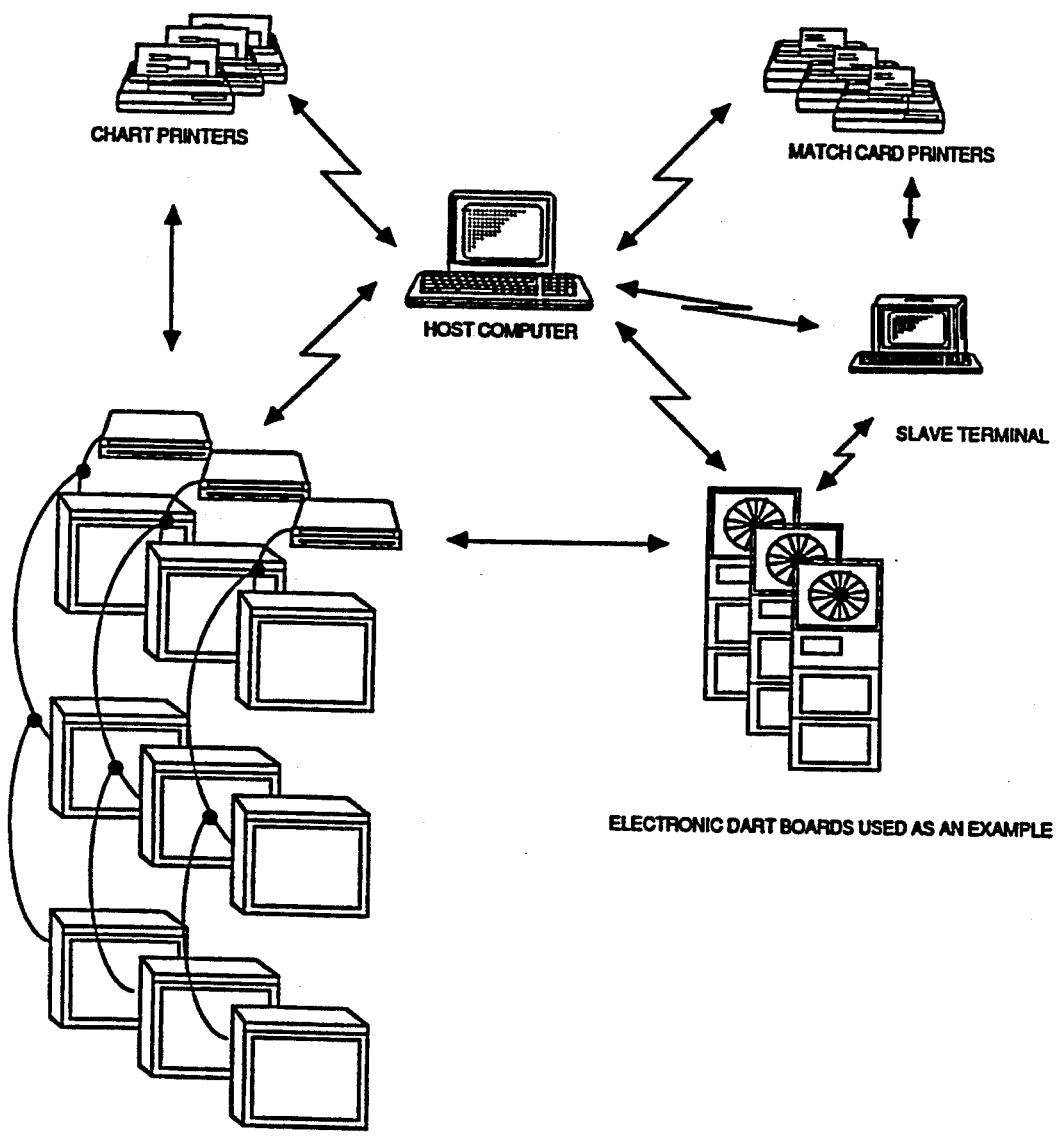
Figure 2B:
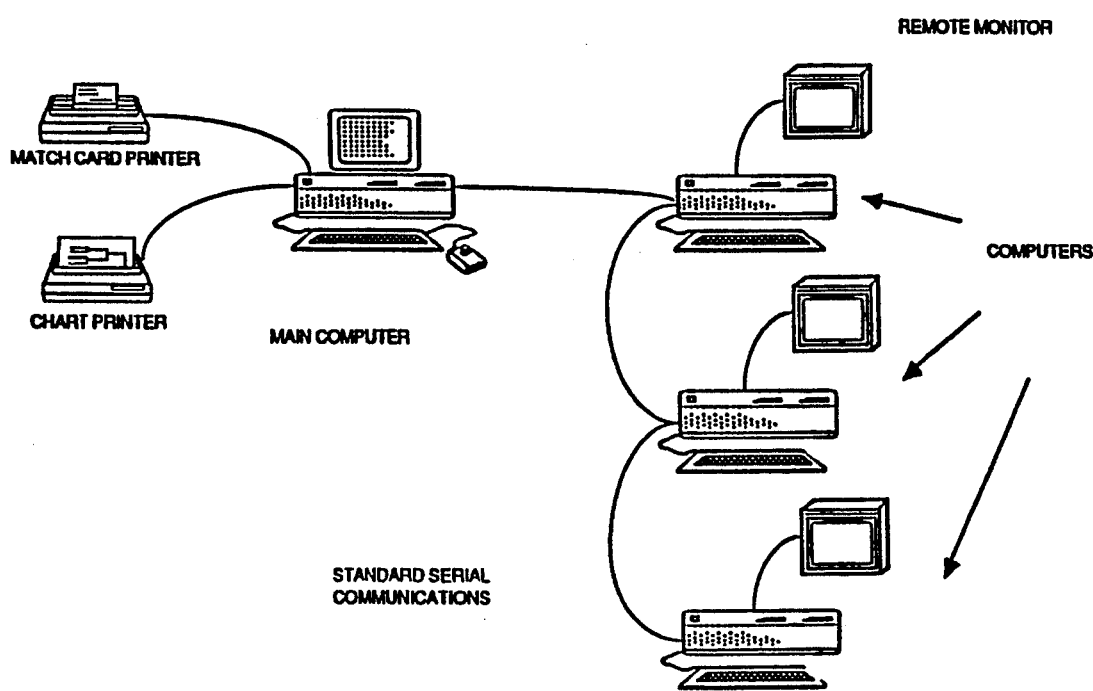
FIG. 2b is a diagrammatic view of a three tournament control computer-computer serial hardware connection of a preferred embodiment of the universal tournament management system
Figure 54A:
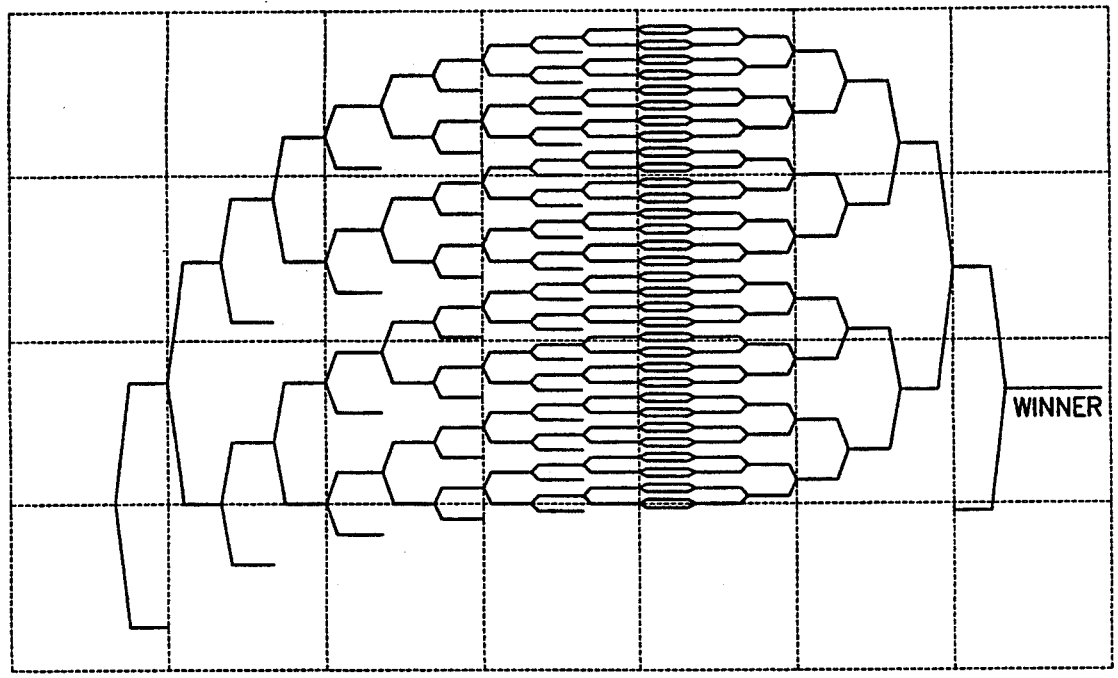
FIG. 54a and 54b is a diagrammatic illustration of the segmented portion, updatable tournament chart, showing how a tournament chart may be updated by simply posting chart portions containing new tournament information over superseded information on the chart.
Figure 54B:
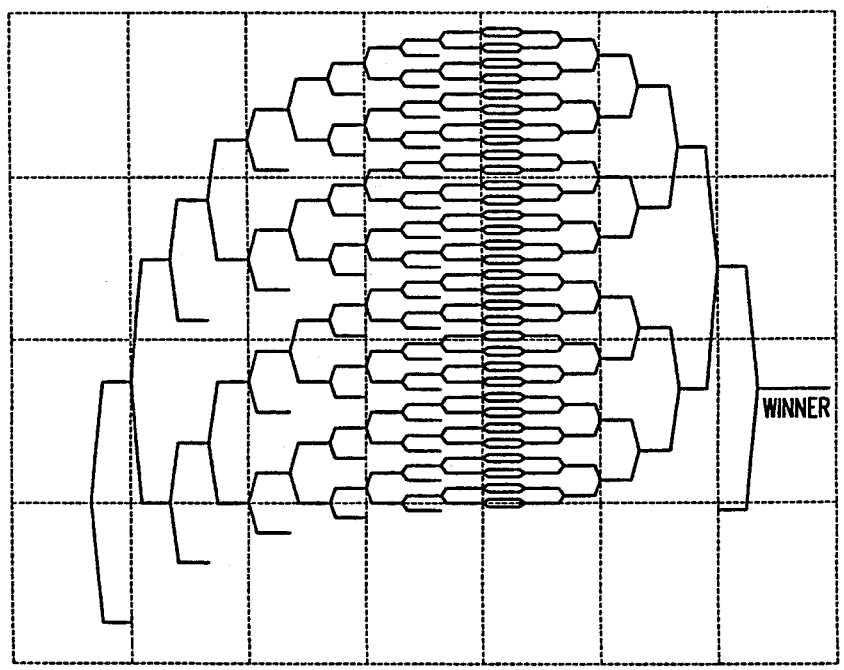

FIG. 2 illustrates a more extensive embodiment of the automatic universal tournament management system 10. A plurality of slave terminals 36 may be connected to the computer 14. These terminals 36 may be used to key in match results at remote match locations. Additionally, a plurality of electronic video games (such as electronic dart boards) may communicate scores to the host computer. Likewise, the host computer may cause tournament information to be displayed on the video game monitor. Also included are a plurality of tournament chart printers 30, match card printers 32, display monitor interfaces 24, and schedule monitors 22 interconnected to the computer 14 in a network arrangement. The schedule monitors 22 display tournament schedule information (FIGS. 54a and 54b).

Figure 3:
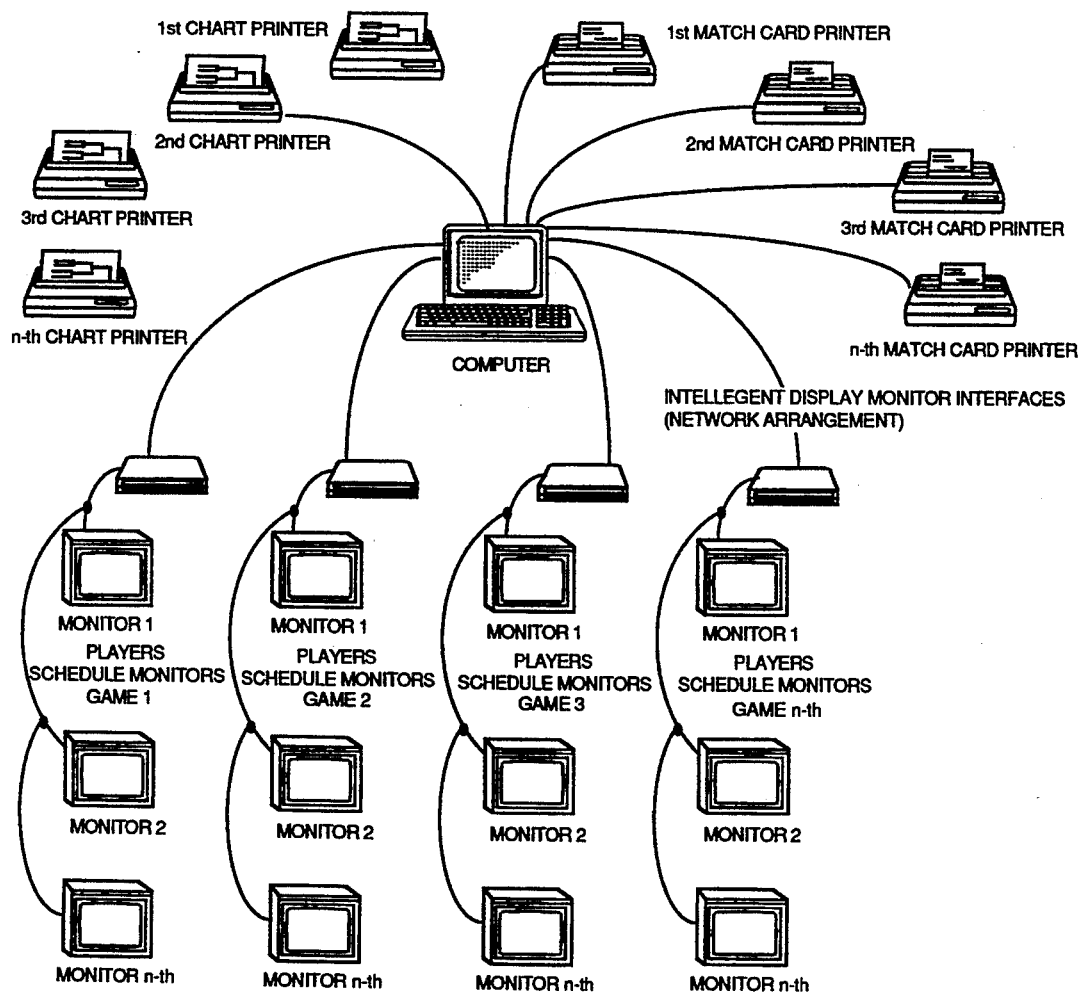
FIG. 3 is a diagrammatic view of a preferred embodiment of the universal tournament management system showing a local area network of intelligent display monitor interfaces used to drive a plurality of monitors.

FIG. 3 illustrates an embodiment having a plurality of schedule monitors 22 interconnected to a computer 14 via a network of intelligent display monitor interfaces 24. In this way additional monitors 22 may be provided about the tournament location.

Figure 4:
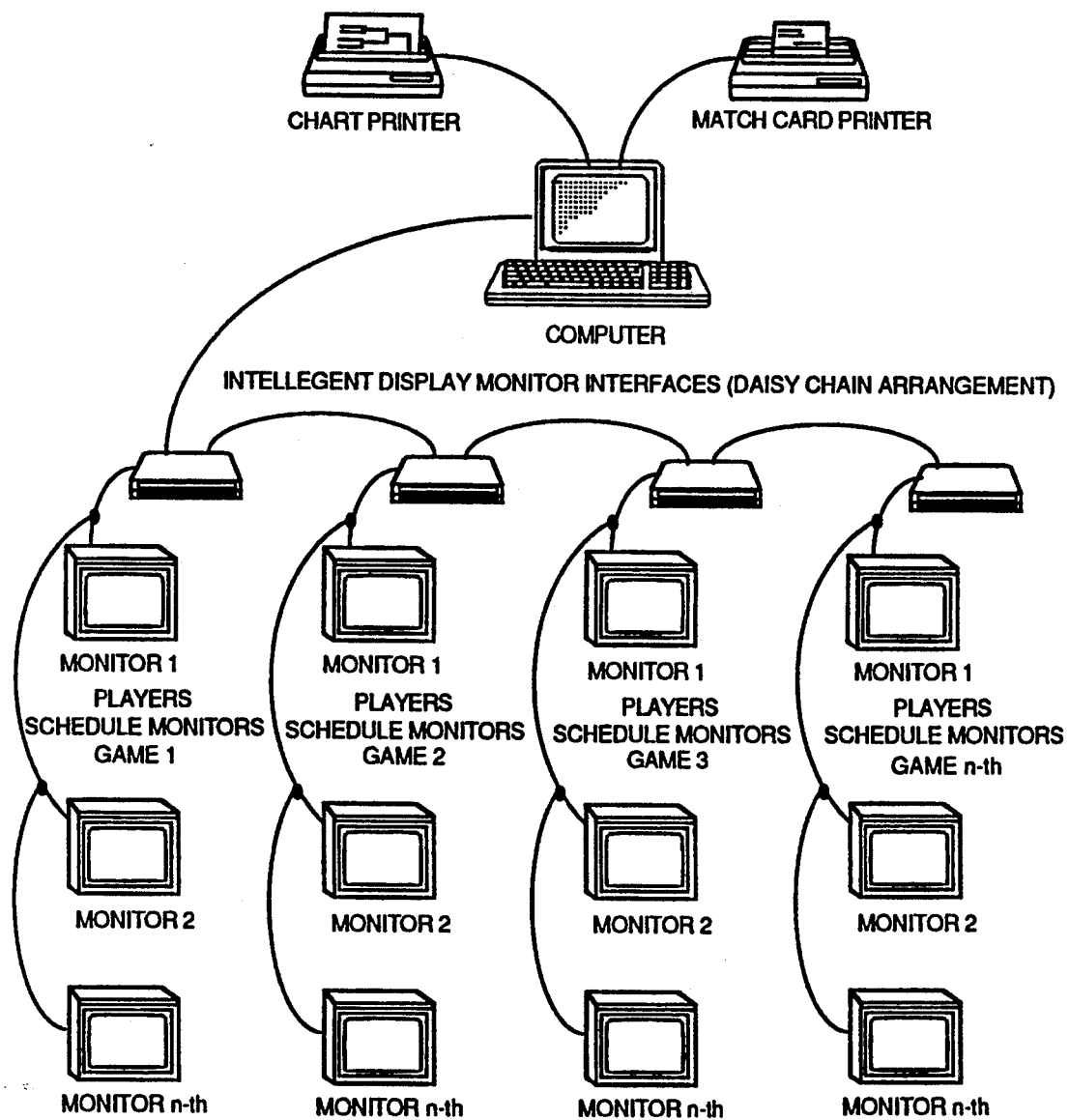
FIG. 4 is a diagrammatic view of a preferred embodiment of the universal tournament management system showing a daisy chain arrangement of intelligent display monitor interfaces used to drive a plurality of monitors.

FIG. 4 illustrates a daisy chain connection arrangement wherein a plurality of intelligent display monitor interfaces 24 may be connected in series. This provides an alternative method of connecting additional scheduling monitors 22 to the computer 14.

Figure 5:
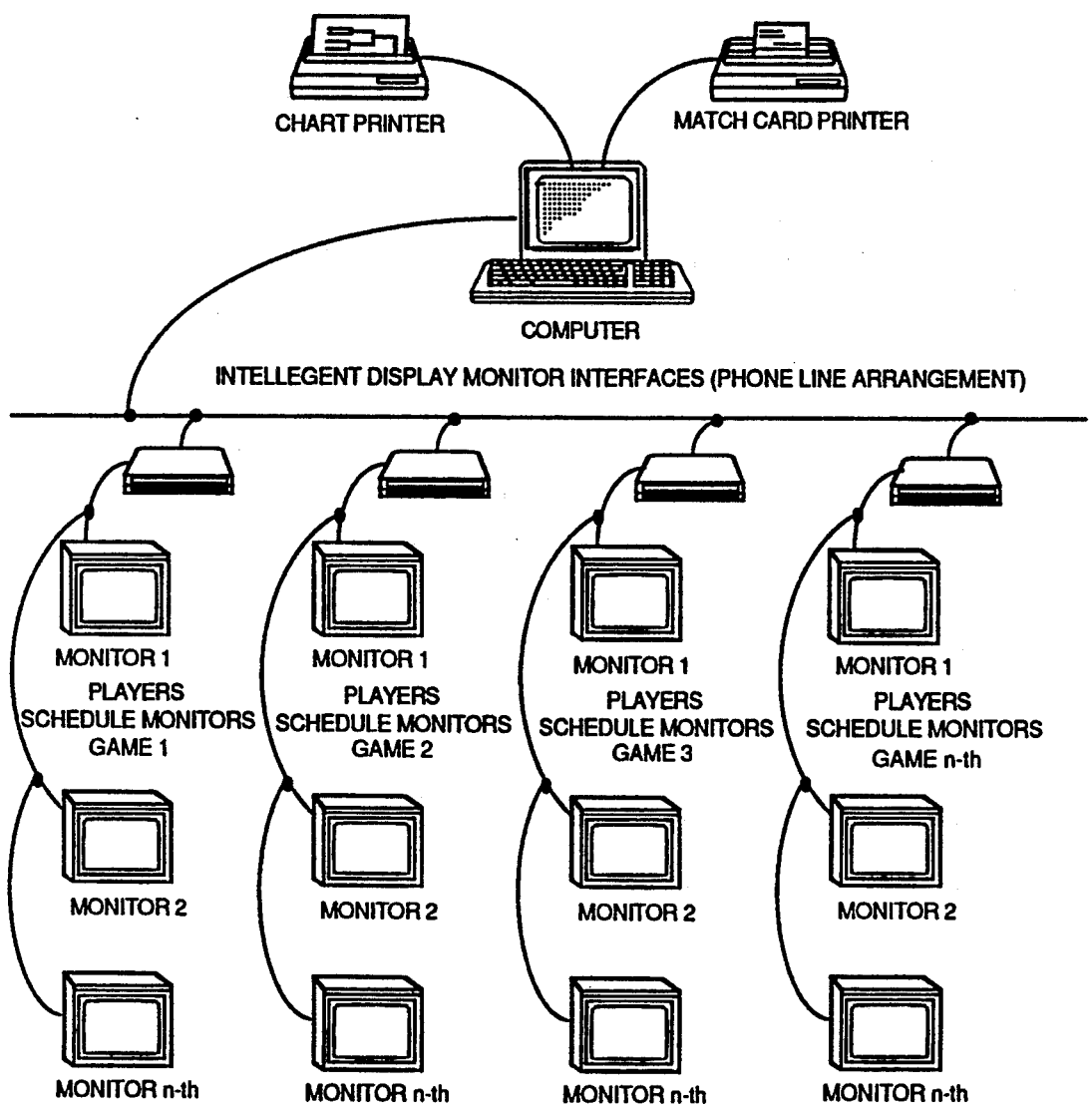
FIG. 5 is a diagrammatic view of a preferred embodiment of the universal tournament management system showing a telephone line arrangement of intelligent display monitor interfaces used to drive a plurality of monitors.

FIG. 5 illustrates a modem intelligent display monitor interface 24 arrangement for use in connecting a plurality of scheduling monitors 22 to the system 10. Such an arrangement may be necessary where the cost or ability to cable is prohibitive because of distances. Electronic games may also be connected via modem.

Each of the system configurations illustrated in FIGS. 1 through 5 utilize an instruction set (software) 36. This software may be loaded from a diskette from the computer 14 disk drive 16 on to the computer hard disk. Once loaded on the hard disk drive the microprocessor and instruction set allow for the processing of various tournament information according to reasonable tournament conventions. Those skilled in the art will also realize that the instruction set may be stored and then loaded from firmware.

Figure 6:
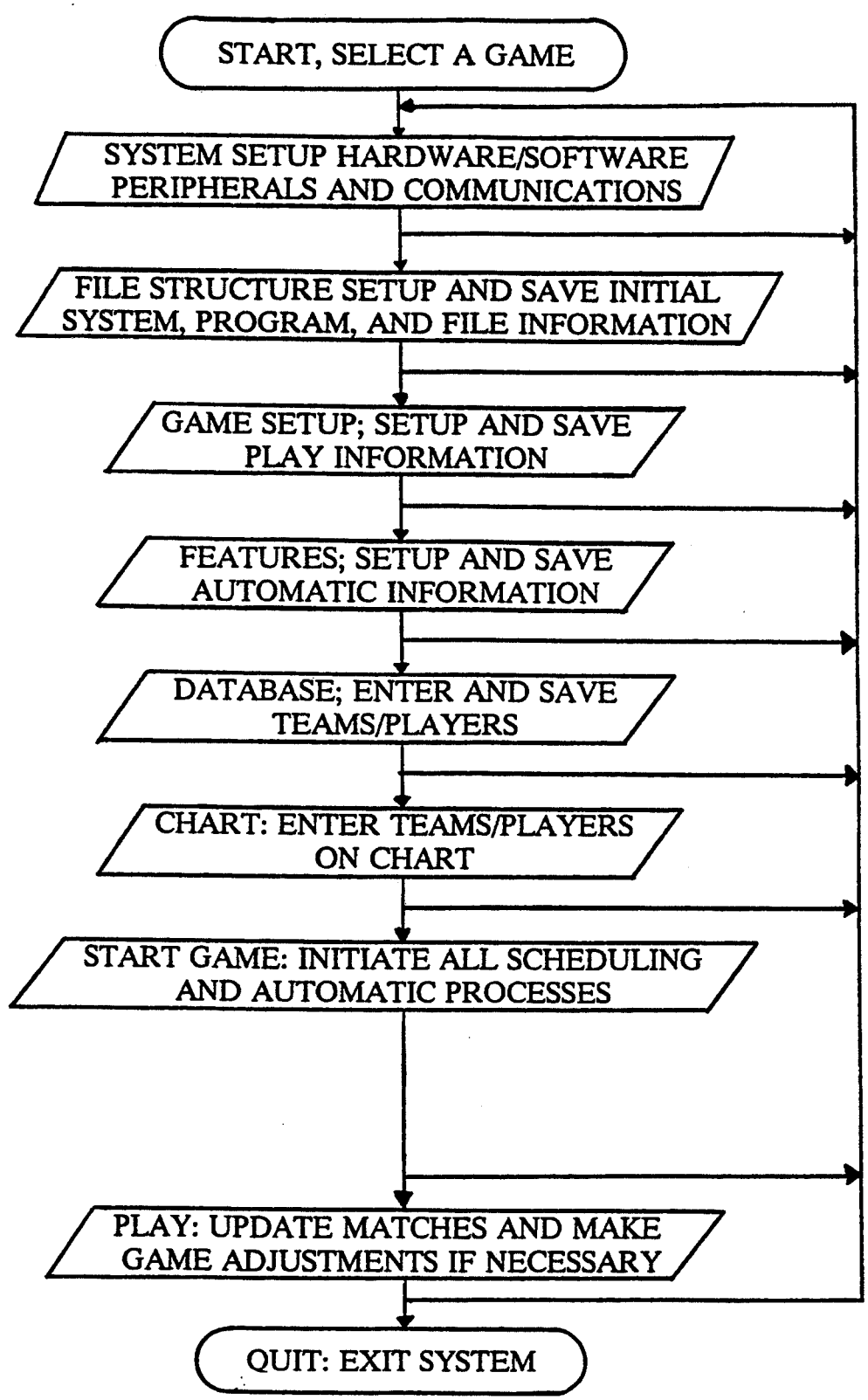
FIG. 6 is a flow diagram of the software or instruction set of a preferred embodiment of the universal tournament management system.
Figure 7:
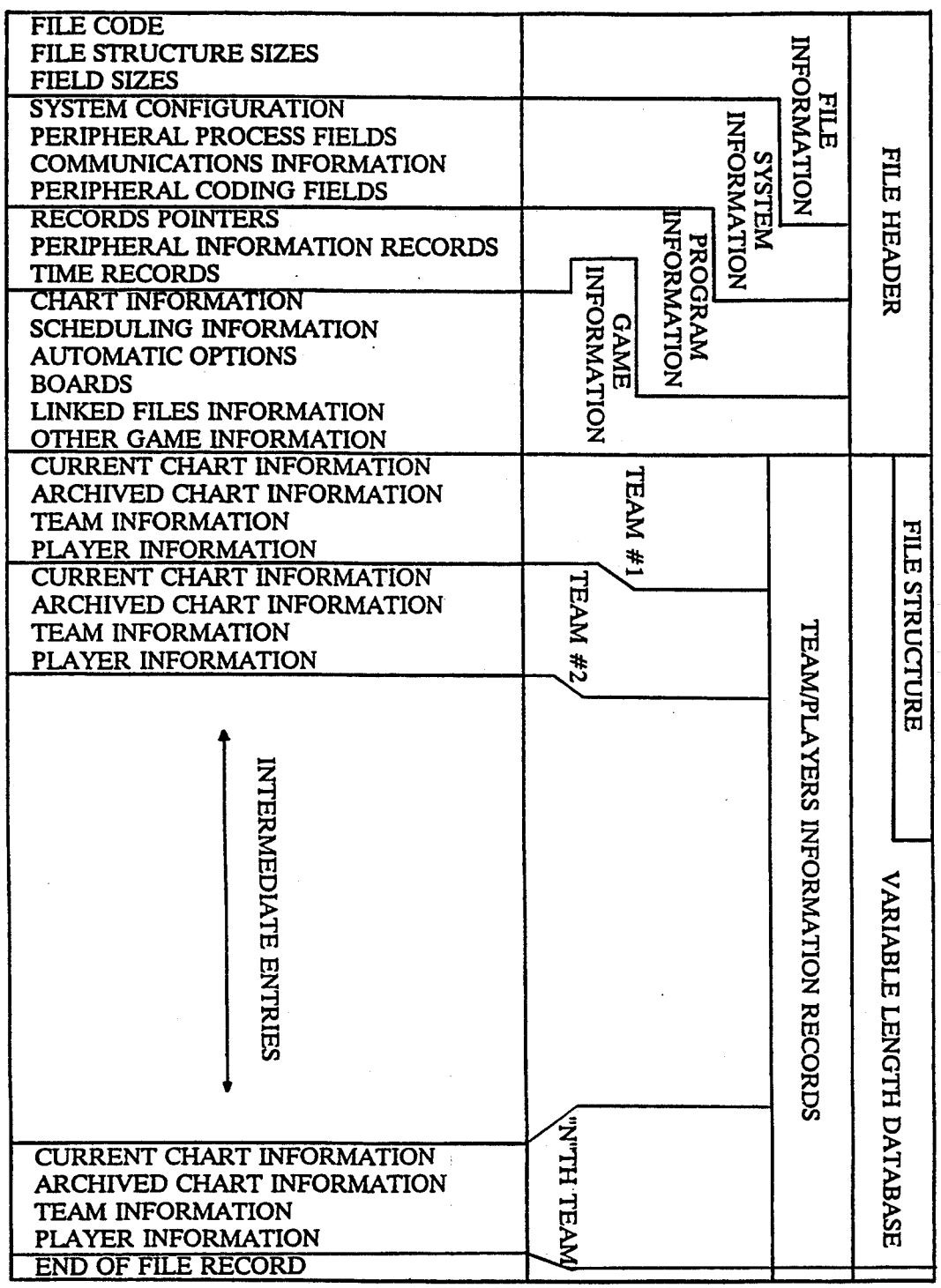
FIG. 7 is a table of the file structure of a preferred embodiment of the universal tournament management system.

FIG. 6 is a flow diagram of the instruction set used in a preferred embodiment of the automatic universal tournament management system 10. FIG. 7 is a table illustrating the file structure of the files created by the system and its instruction set. A number of processes manipulate the files created by the system 10. For example, the main process or menu process provides means for readily interfacing all sub-processes necessary for tournament management. These sub-processes are as follows:

| | |
|---|---|
| File Process | Provides the means to setup a tournament file in a way in which other processes can share, pass, or enter tournament information. |
| Communication Process | Provides the means to setup the tournament interfaces so that communication/interaction may take place. |
| Game Process | Provides the means to setup the way the tournament will be managed (i.e., at a minimum: start time, match length, type and number of sites, and chart type). |
| Database Process | Provides the means for database entry and manipulation of the teams/players into the tournament. |
| Chart Process | Provides the means for extraction/calculation of teams/players positioning in |

|                     | the tournament                                                                                                                       |
| ------------------- | ------------------------------------------------------------------------------------------------------------------------------------ |
| Scheduling Process  | Provides the means for extraction/calculation of teams/players match times in the tournament.                                        |
| Site Process        | Provides the means for extraction/calculation of teams/players' match sites in the tournament.                                       |
| Display Process     | Provides the means for file extraction /manipulation of team/player information to be used in a way in which tournament participants may utilize. |

Figure 8:
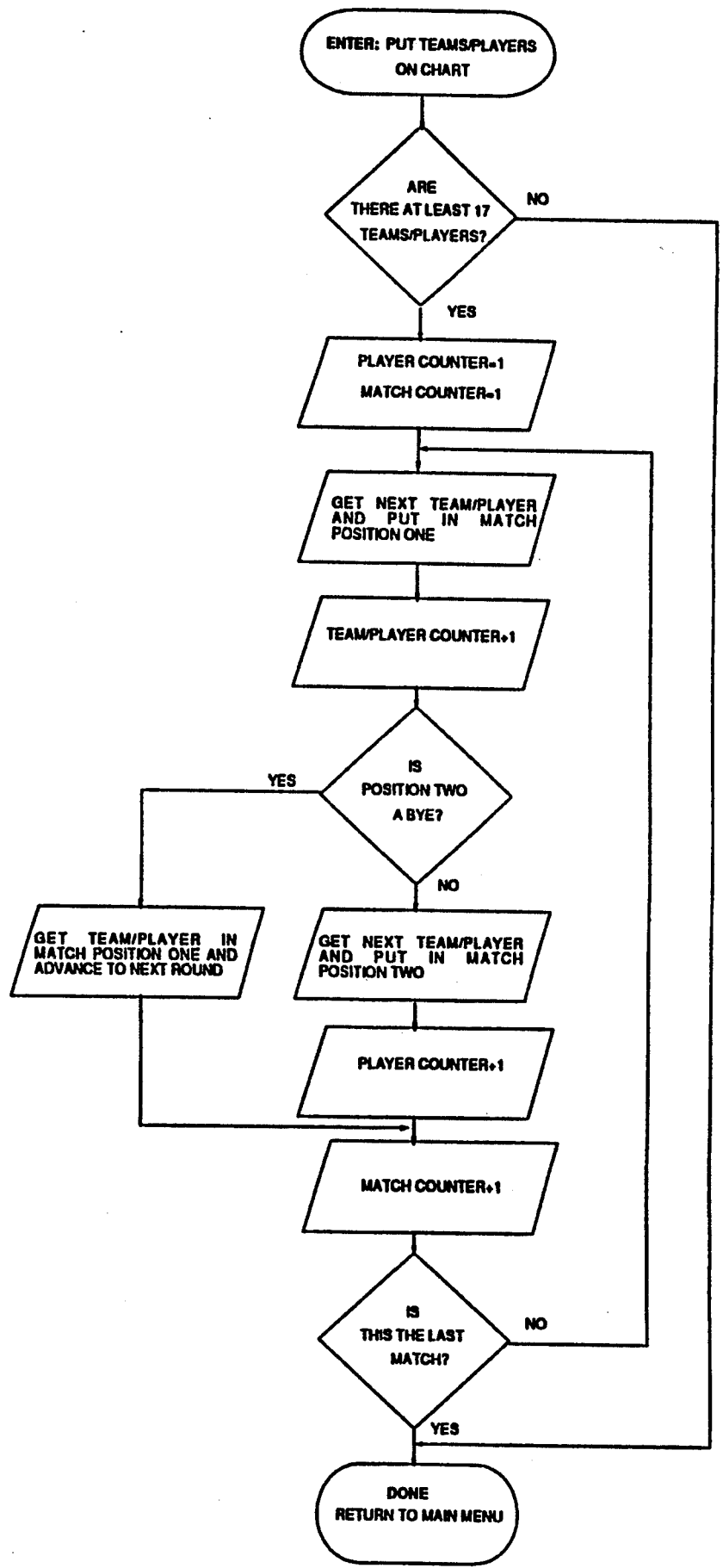
FIG. 8 is a flow diagram of a portion of the software or instruction set of a preferred embodiment of the universal tournament management system showing the main menu subroutines.

FIG. 8 is a flow diagram of instruction set logic 36 used in scheduling teams/players in matches.

Referring to the flow diagram of FIG. 8 it may be seen that the instruction set 36 undertakes the following operations. Program checks are first made to determine if teams/players are already on the chart, or whether the game has already been started, prior to allowing a new team/player to be entered on the chart.

When the option to enter teams/players on the chart is initiated, that operation is first checked against the number of teams/players in order to see if the number of players is ≧17.

Counters and pointers are initialized for the team/player file (database), the match on the chart, and for the position in the match. The team/players are placed on the chart dependent on whether their number equals the player counter on the match that equals the match counter, in the match position that equals the match position counter. BYES can only occur in match position two. If position two is a BYE, then the team/player is advanced to match position one of the next round. For the pre-determined chart size there is a position on the chart for every team/player, and the determined number of BYES always equals the chart size minus the number of teams/players.

If the number of teams/players does not equal the chart size, BYES are added to the chart. The number of BYES are determined by the chart size and number of teams/players. The table below shows the relationship between teams/players, chart size, and BYES. The chart size and number of BYES are calculated each time a team player is entered into the database.

| Number of Teams/Players | Chart Size  | Number of BYES |
| ----------------------- | ----------- | -------------- |
| 0–16                    | not defined | not defined    |
| 17–32                   | 32          | 32 - T/P       |
| 33–64                   | 64          | 64 - T/P       |
| 65–128                  | 128         | 128 - T/P      |
| 129–256                 | 256         | 256 - T/P      |
| 257–512                 | 512         | 512 - T/P      |
| 513–1024                | 1024        | 1024 - T/P     |
| 1025–2048               | 2048        | 2048 - T/P     |

Figure 10:
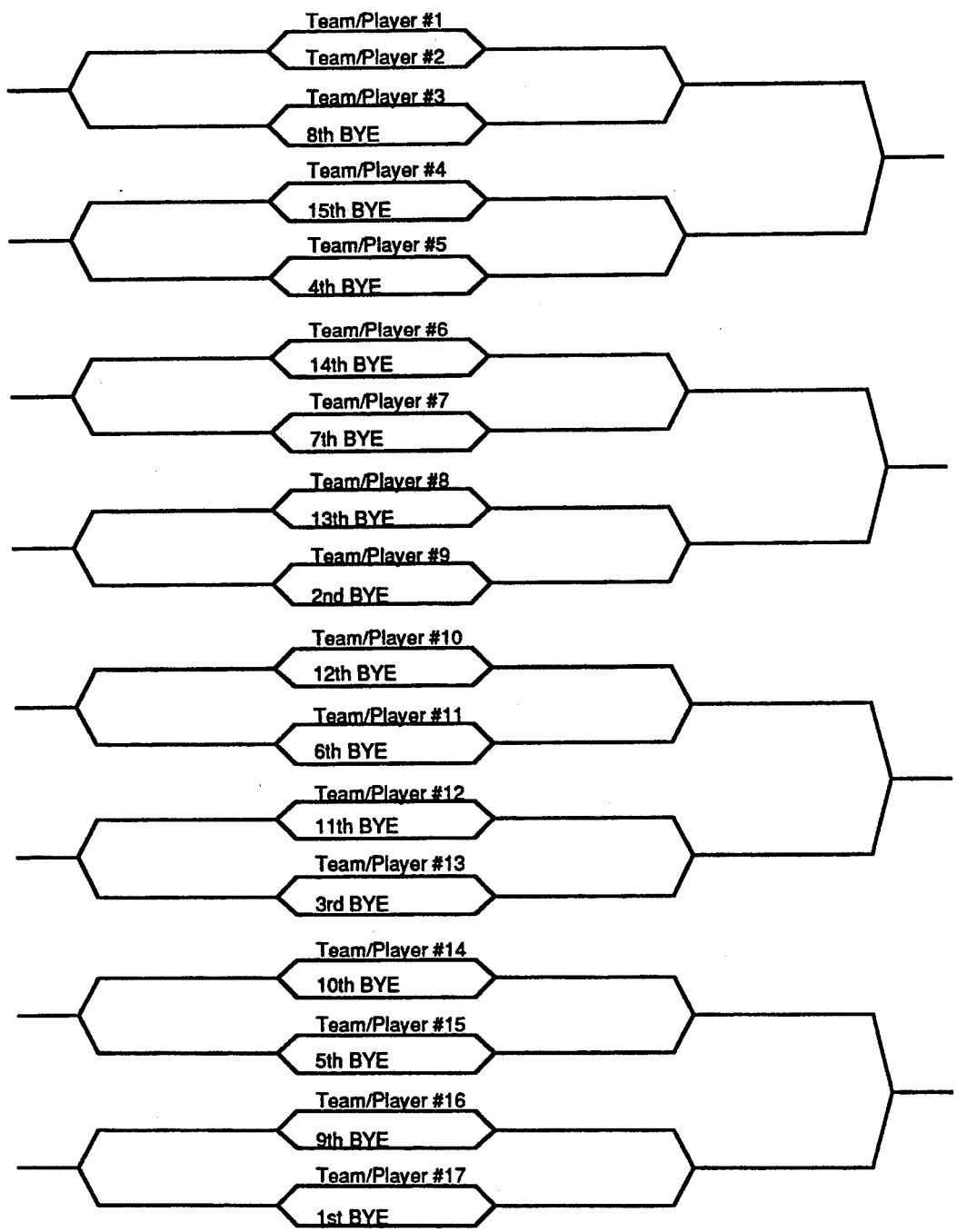
FIG. 10 is a flow diagram of a double elimination chart portion showing BYE entries according to a preferred embodiment of a tournament chart prepared by the system.

A chart size of 32 with only 27 teams/players would have 5 BYES and the BYES would be distributed evenly throughout the chart. FIG. 10 illustrates the distribution of BYES on a 32 team/player chart with the minimum number of 17 teams/players. BYE placement for larger charts utilizes the same placement strategy by dividing the chart by two, placing BYES at the ends of the halves, dividing the halves by two, placing BYES at the end, and so on until the chart is filled.

The primary purpose of the system 10 is to control and facilitate the placement, scheduling, tracking, and communication of tournament information. This should not be confused with keeping score of a particular game or set of games.

The system 10 allows participants to know when and where to play via computer scheduling. Using the system 10, and its instruction set 36 options and peripherals, enables a tournament operator to utilize the system 10 to display and print various chart components that simplify tournament management.

When the main program of the system 10 is initiated, a game must be selected. Since game processing is in real-time, a new game can be started or a game can be selected in progress. All game information is stored in a non-volatile environment so starting or joining a game in progress can occur regardless of system start-up or power ups/downs. If an abrupt unexpected power loss to the system ensues no loss of game information occurs and joining a game in progress can follow immediately after system restart.

Once a tournament is selected, the operator may select all system communication parameters for communication with all equipment and to determine what information will be passed to the other equipment for scheduling purposes. Since other system components are connected via intelligent interfaces information may be passed bi-directionally.

All tournament and system information is placed in the selected game file so that each selected tournament file controls the system under the parameters selected during the tournament setup routines. Tournament information may be changed during the tournament and stored in the selected tournament file. Any and all information that has input characteristics is automatically stored in the tournament file. This also includes new and updated tournament information.

The game setup menus provide options for setting up the initial tournament scheduling parameters. The main tournament chart setup information required to begin the tournament is first entered: (1) chart type, (2) start time, (3) match length, and (4) the number of dart boards available for tournament play.

The automatic features for game operations may be selected as desired. Options include automatic communications between peripherals, match card printing, chart printing, match length adjustments, and the enablement of various user program display messages.

Database functions are also provided during the team/player input steps. Thus, teams/players may be added, deleted, edited, searched, and sorted via a simple to use database menu and the instruction set's 36 various subroutines. The number of players per team is automatically selected for database entry of the players per team. An option is also available that allows a team/player nickname for entry into the database where names and addresses need not be included. As each team/player is entered into the tournament database a team number is assigned and the chart size is automatically calculated. Several file utilities can be used in order to input and combine teams/players from other tournament into another tournament database.

Once all teams/players are entered into the tournament file (database) they can be placed on the chart using the chart options. Teams/players are placed on the first round (center of the chart) and BYES are placed, when needed, in a predetermined alternating half-size divided by two algorithm. Teams/players with a BYE are automatically advanced on the chart and rescheduled. The round and match placement on the chart is stored in the database as are current chart parameters for each team/player.

Teams/players can only be put on the chart if there are at least 17 teams/players scheduled to participate in the tournament. This satisfies the minimum requirement for a 32 team/player chart (system minimum chart size in a preferred embodiment). The maximum chart size (in a preferred embodiment) allows for a 2048 team/player chart. These constraints can be modified on a program level if desired.

Once teams/players are on the chart, the following main chart options may be selected:
preview the team/player placement on the chart;
randomize the teams/players on the chart (all BYES remain fixed); and
swap or "seat" players on the chart.

The tournament can be started once teams/players have been matched on the chart (if at least one board is available). A tournament start time is selected and an initial tournament match length is specified. A specialized alpha-numeric team/player ID is assigned linking each player to the selected tournament and its file. This acts as a safety feature against possible operator errors that might occur while updating a winner or loser if more than one tournament is being played at the same time.

The scheduling of time and boards is then processed for each team/player.

If any automatic features are selected they begin only after the tournament has started. All team/player schedules are then sent to the system peripherals for display or for specific peripheral processing for display/updating. All match cards are then printed on the designated match card printer, and the first several rounds of the tournament chart are printed on the chart printer.

The interaction between peripherals and other peripheral processes remains throughout the tournament whenever a change in schedule is performed (either manually or automatically). All automatic features can either be disabled or enabled at any time during the tournament.

Three main processes occur during team/player chart placement and scheduling. The first determines team/player placement on the chart. Placement is determined according to a fixed schema depending on the number of participants and the chart type (single or double elimination). The second process determines what board a match will utilize. This is determined on a round-by-round basis dependent on the number of available boards and can be varied throughout the tournament. The third process determines what time each match will be played. This is a complex process that is dependent on the initial start time, individual round start times, and the number of available boards.

Through interaction with peripherals, these three system processes fully automate tournament play once team/player information is entered into the tournament file (database).

Figure 9:
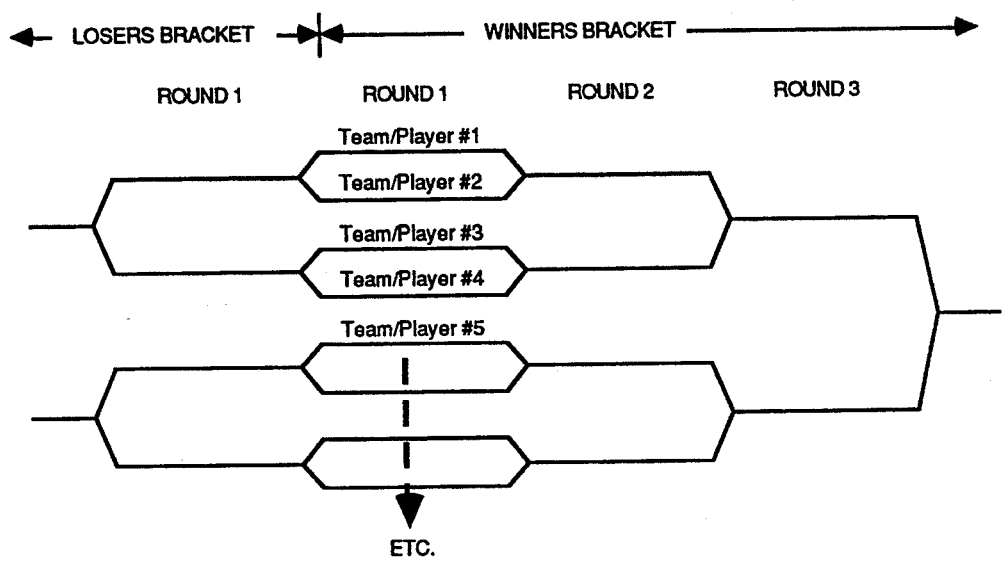
FIG. 9 is a flow diagram of a double elimination chart portion showing team/player entry according to a preferred embodiment of a tournament chart prepared by the system.

The position of teams/players on the chart is determined by their position in the database. A single menu option enables the prompt for the user to enter the teams/players onto the chart. For example, team/player #1 goes to round #1-match #1 (first position), team/player #2 goes to round #1-match #1 (second position). Team/player #3 goes to round #1-match #2 (first position), team/player #4 goes to round #1-match #2 (second position), and so on until all chart positions are filled (FIG. 9).

Figure 11:
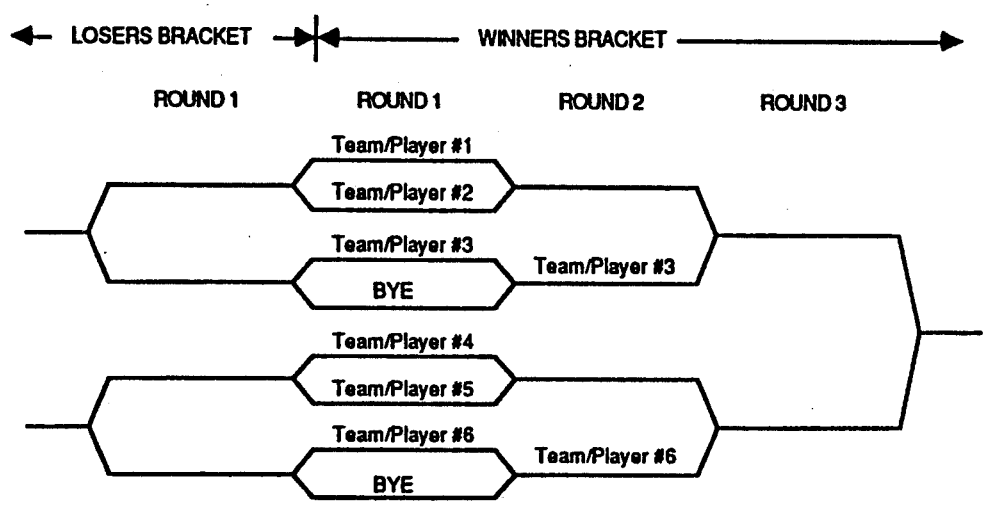
FIG. 11 is a flow diagram of a double elimination chart portion showing automatic team/player BYE advances in a preferred embodiment of a tournament chart prepared by the system.

Once teams/players are on the chart, all teams/players with a BYE in their match are advanced to the next round. (FIGS. 10 and 11). The tournament may be started when teams/players are on the chart, a game start time is given, a game match length is given, and there is at least one board for play. These requirements must be entered in the setup options of the main program. A single menu option is selected in order to start the tournament. After the tournament has started the matches determined by team/player placement on the chart are given a board to play on and a time to play. Times and boards are scheduled in sequential order determined on a round-by-round basis dependent on the availability of boards in that round. In the case of a BYE, no match is scheduled and the team/player is advanced to the next round. If the BYE advancement places a team/player in a match with another team/player a time and board is scheduled for that match.

When a new round is to be scheduled boards and times are scheduled sequentially, however, the tournament operator may also manually select start times, board availability, and utilize a postpone event timer for each round. Therefore, all matches and subsequent rounds are still scheduled sequentially, but checks are made for times and boards in the sequential scheduling.

If there are more boards in round than there are matches, the sequential scheduling feature might schedule a single team/player for two matches at the same time. Therefore, the previous match of a newly scheduled team/player is checked, and if the time is the same as the current schedule time, the sequential scheduling time is then incremented by one match length.

There can be up to 260 boards (match play sites) per game (numbered 1–260). When the game is started, the first match to be scheduled gets the first board, the second match gets the second board, and so on, up to the last board or the last match, which ever comes first. If there are fewer boards than matches, then upon scheduling the last board, the next match will start over with the first board. Since only one match can be played on a board at any one time, the time scheduling process will increment the scheduling time by one match length.

Figure 12A:
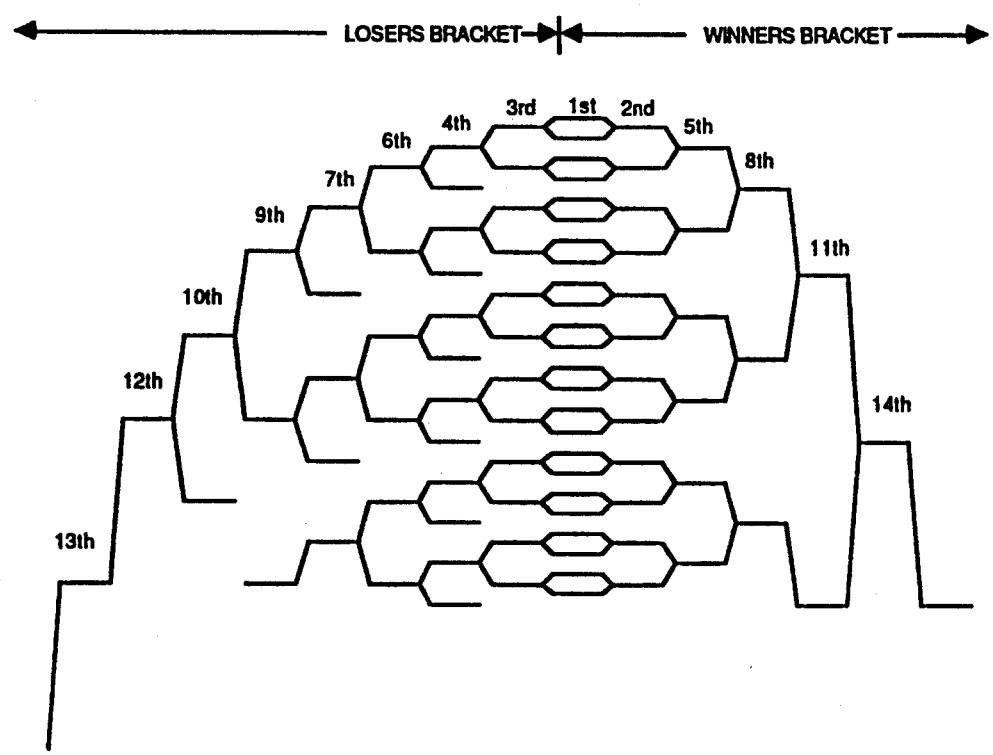
FIGS. 12a and 12b are flow diagrams of double elimination charts showing round scheduling order in a preferred embodiment of a tournament chart prepared by the system.
Figure 12B:
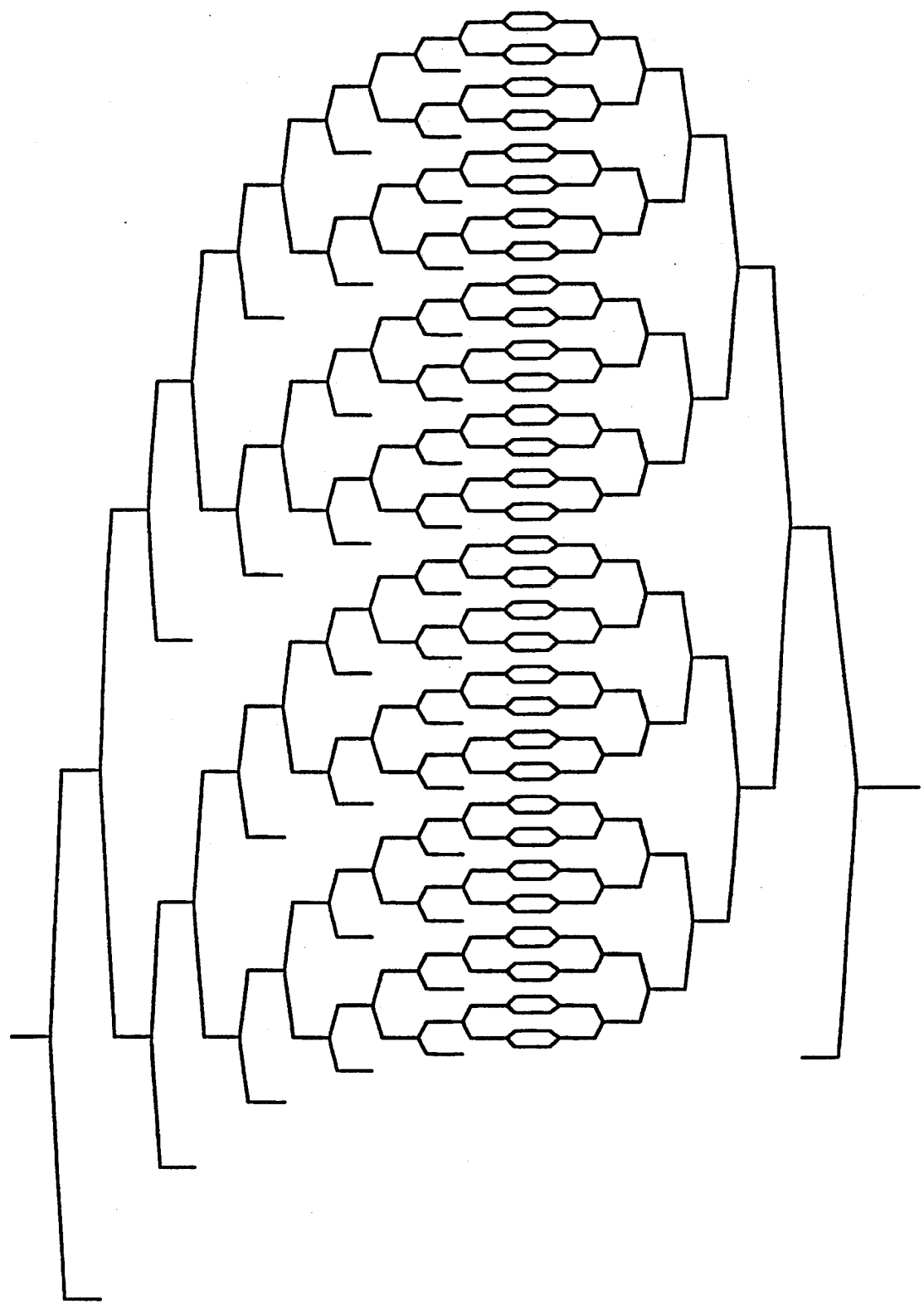

Double elimination rounds are scheduled 1W, 2W, 1L, 2L, 3W, 3L, 4L, 4W, 5L, 6L, 5W, 7L, 8L 6W, 9L, 10L, 7W, 11L, 12L, 8W, etc. (where W=winners bracket and L=losers bracket). Round scheduling always begins with the first, or upper most match (FIGS. 12a and 12b) according to a conventional double elimination round scheduling schema. Therefore, it is an important function of the invention to determine advanced round team/player match placement on a double elimination chart and for scheduling such matches.

Figure 13:
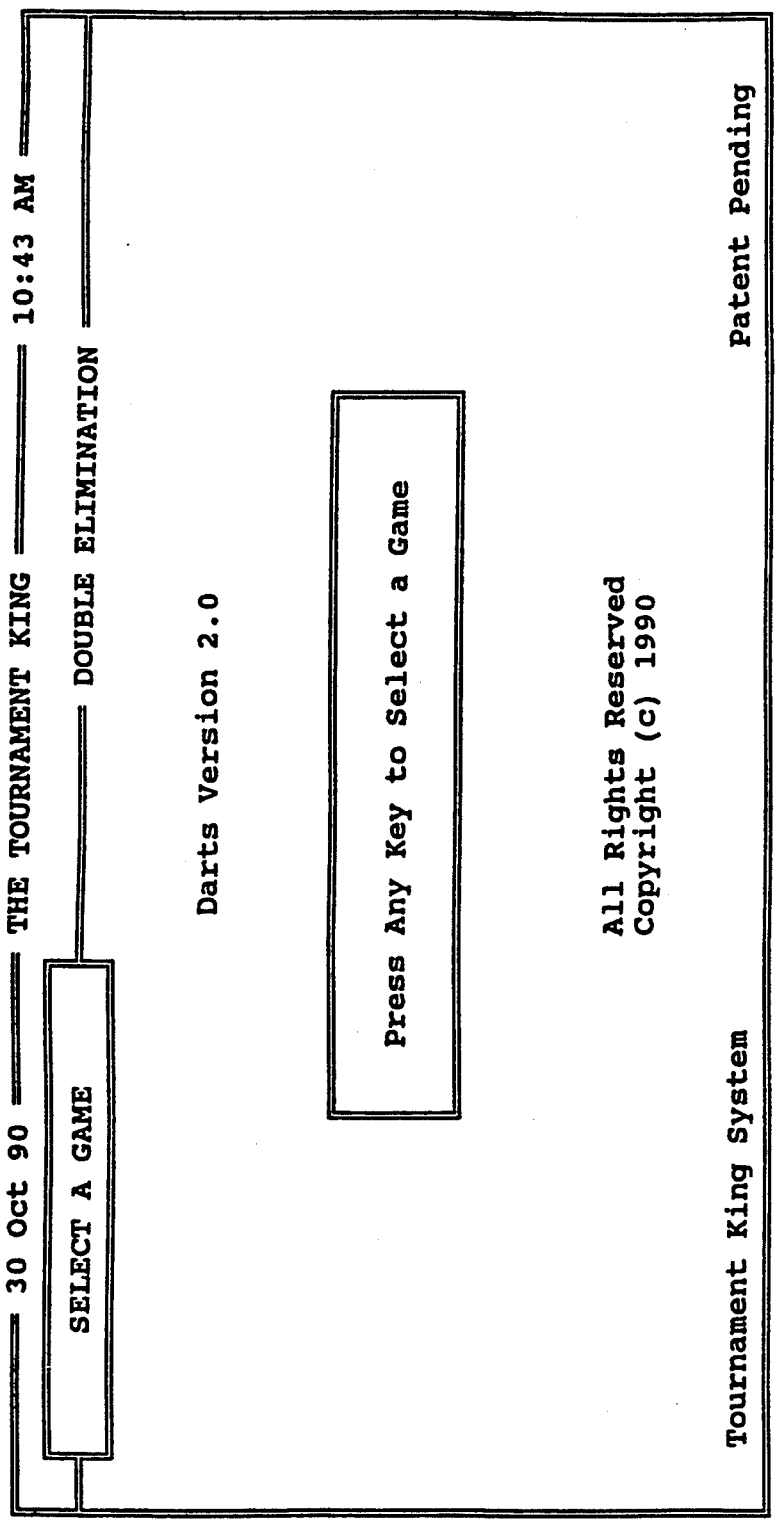
FIG. 13 is an illustration of the opening menu of a preferred embodiment of the automatic universal tournament management system adapted to manage dart tournaments.
Figure 14:
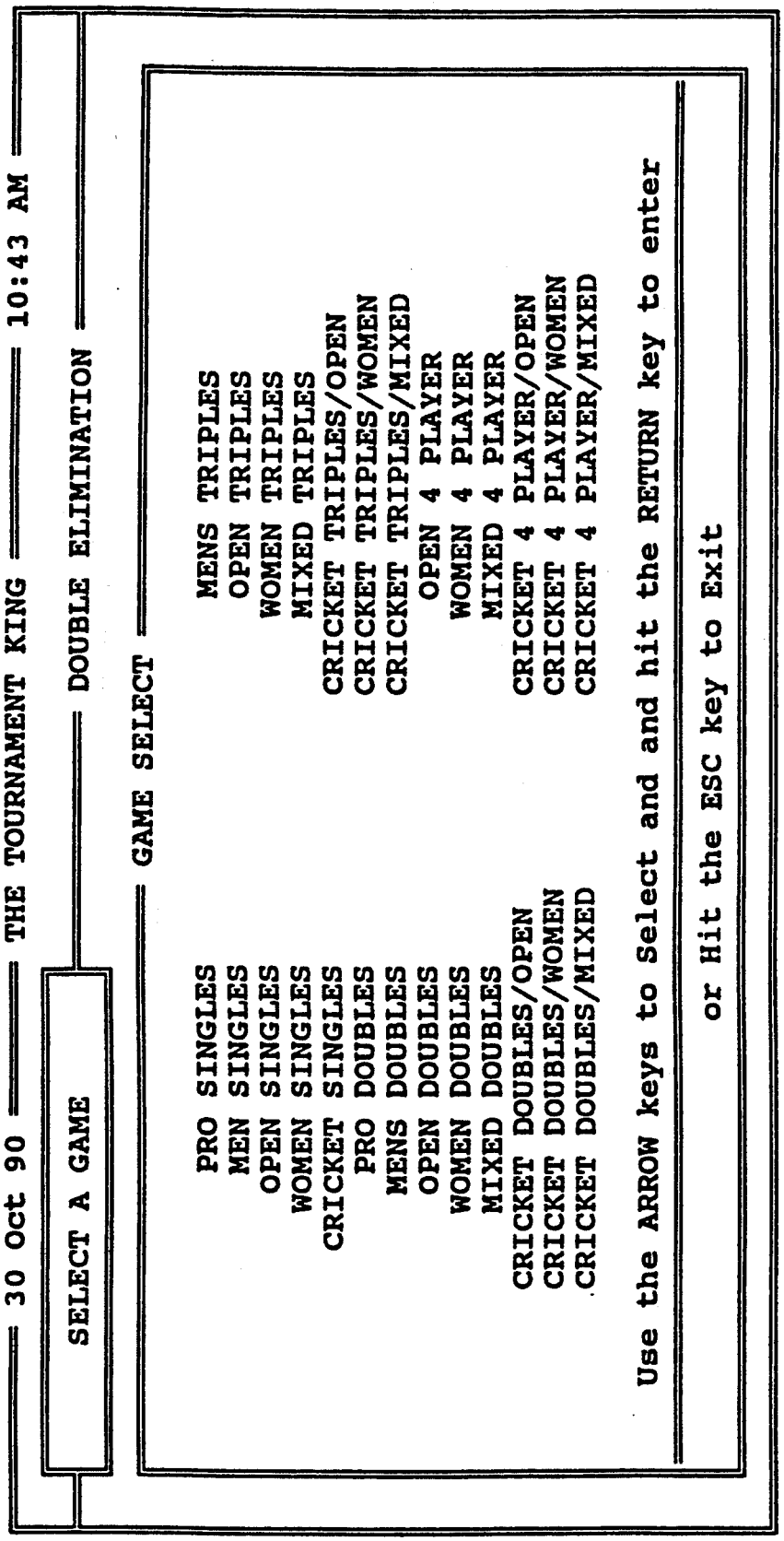
FIG. 14 is an illustration of the game selection menu of a preferred embodiment of the automatic universal tournament management system adapted to manage dart tournaments.

In the operation of a preferred dart tournament embodiment the following screens (FIGS. 13 through 53) appear or may be called to appear on the computer 14 monitor 18 by the system 10 operator utilizing the keyboard 20, FIG. 13 is the first screen that appears. The operator is called upon to strike any key in order to select a game. Once a key is entered on the keyboard 20 the screen illustrated by FIG. 14 appears. The operator must use the cursor keypad keys, tab key, or space bar to scroll through the available games. Once the cursor is on the desired game ("PRO SINGLES" was selected for this example) the operator presses the enter key.

Figure 15:
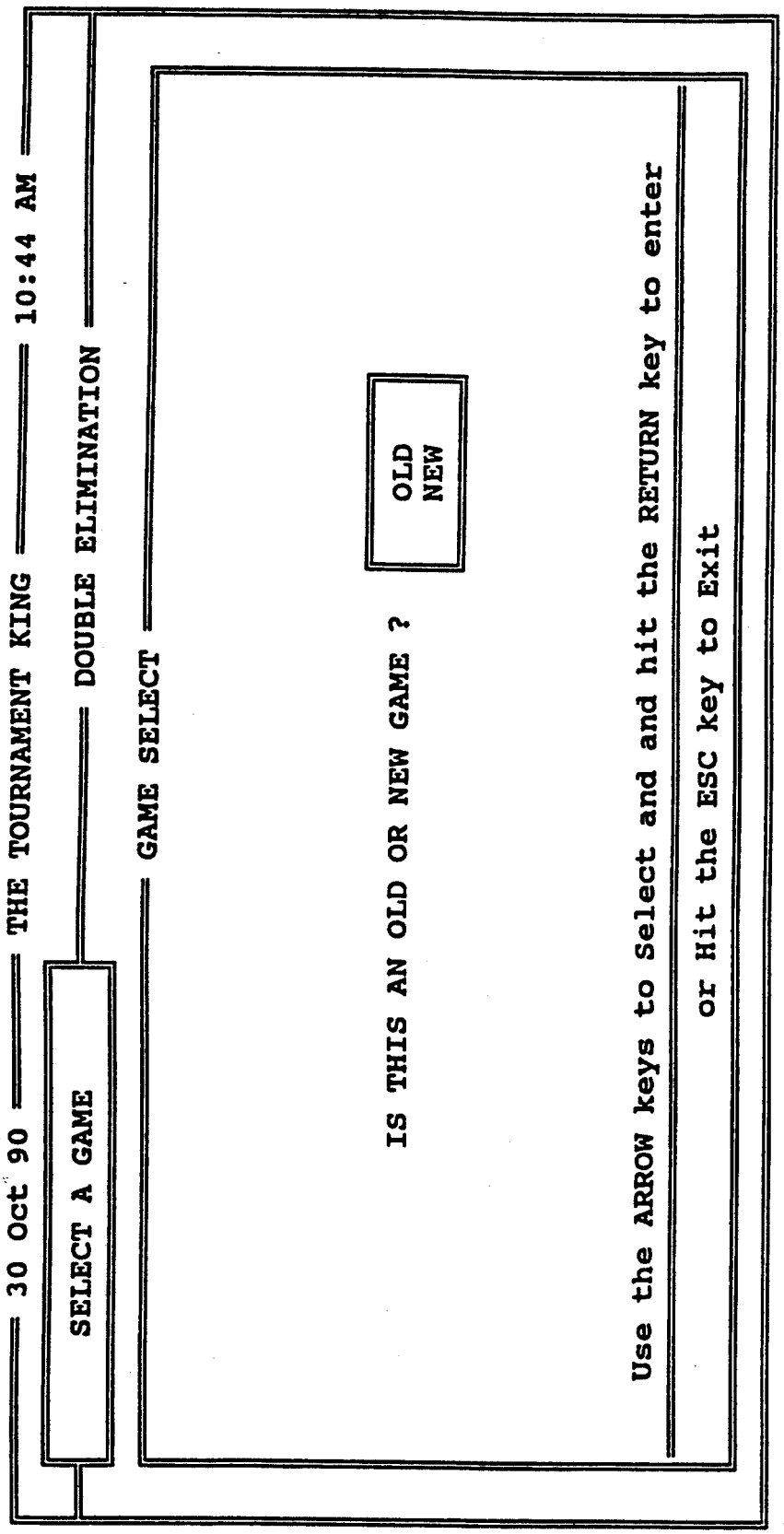
FIG. 15 is an illustration of the second menu of the game selection menu of a preferred embodiment of the automatic universal tournament management system adapted to manage dart tournaments.
Figure 16:
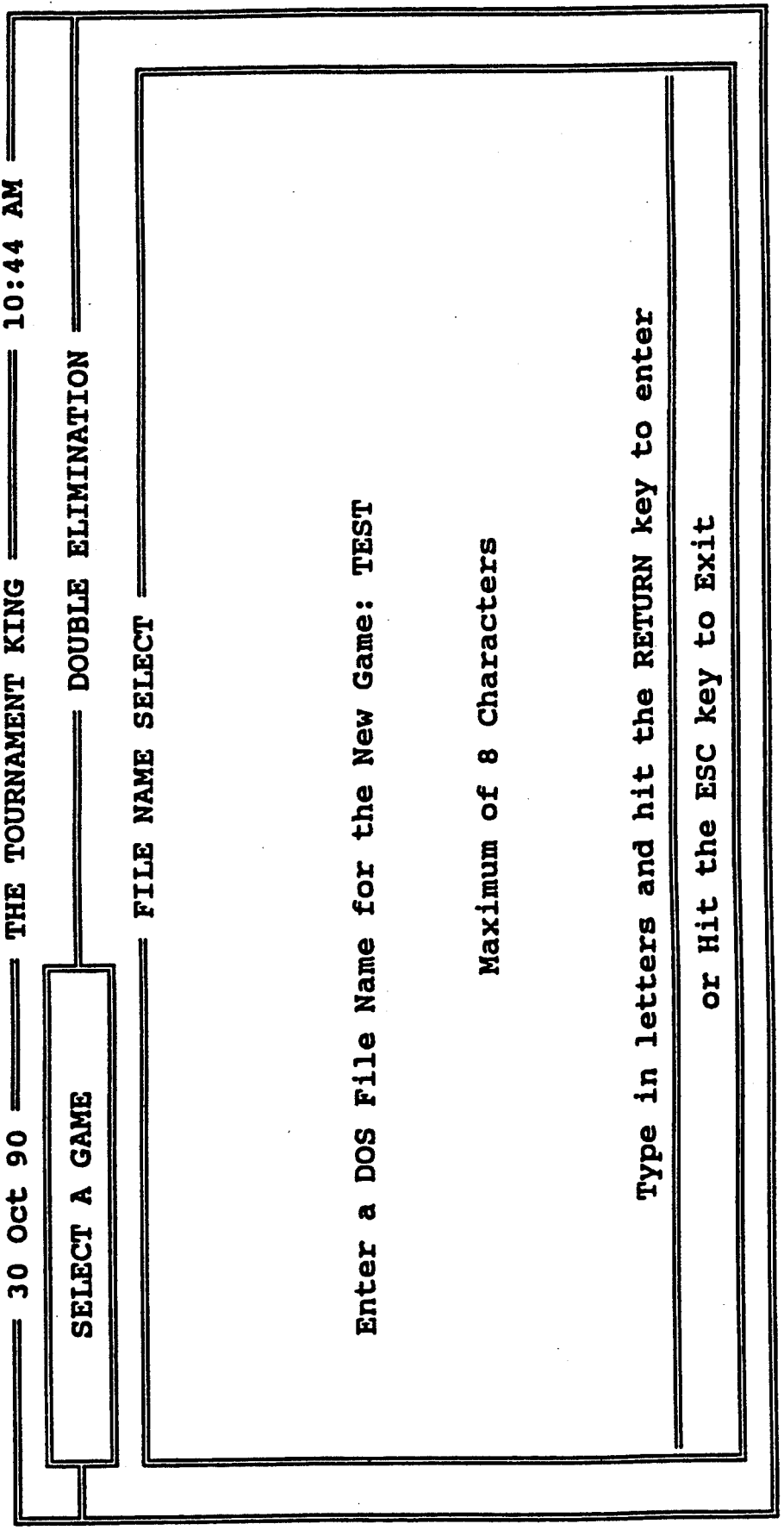
FIG. 16 is an illustration of the third menu, or file selection menu, of the game selection menu of a preferred embodiment of the automatic universal tournament management system adapted to manage dart tournaments.

The screen illustrated in FIG. 15 then appears and the operator is prompted to tell the system 10 whether the game is old or new (a "NEW" game was selected for this example). The screen illustrated by FIG. 16 then appears on the monitor 18 and the operator is prompted to "Enter a DOS File Name for the New Game" (the new game was dubbed "TEST" for this example).

Figure 17:
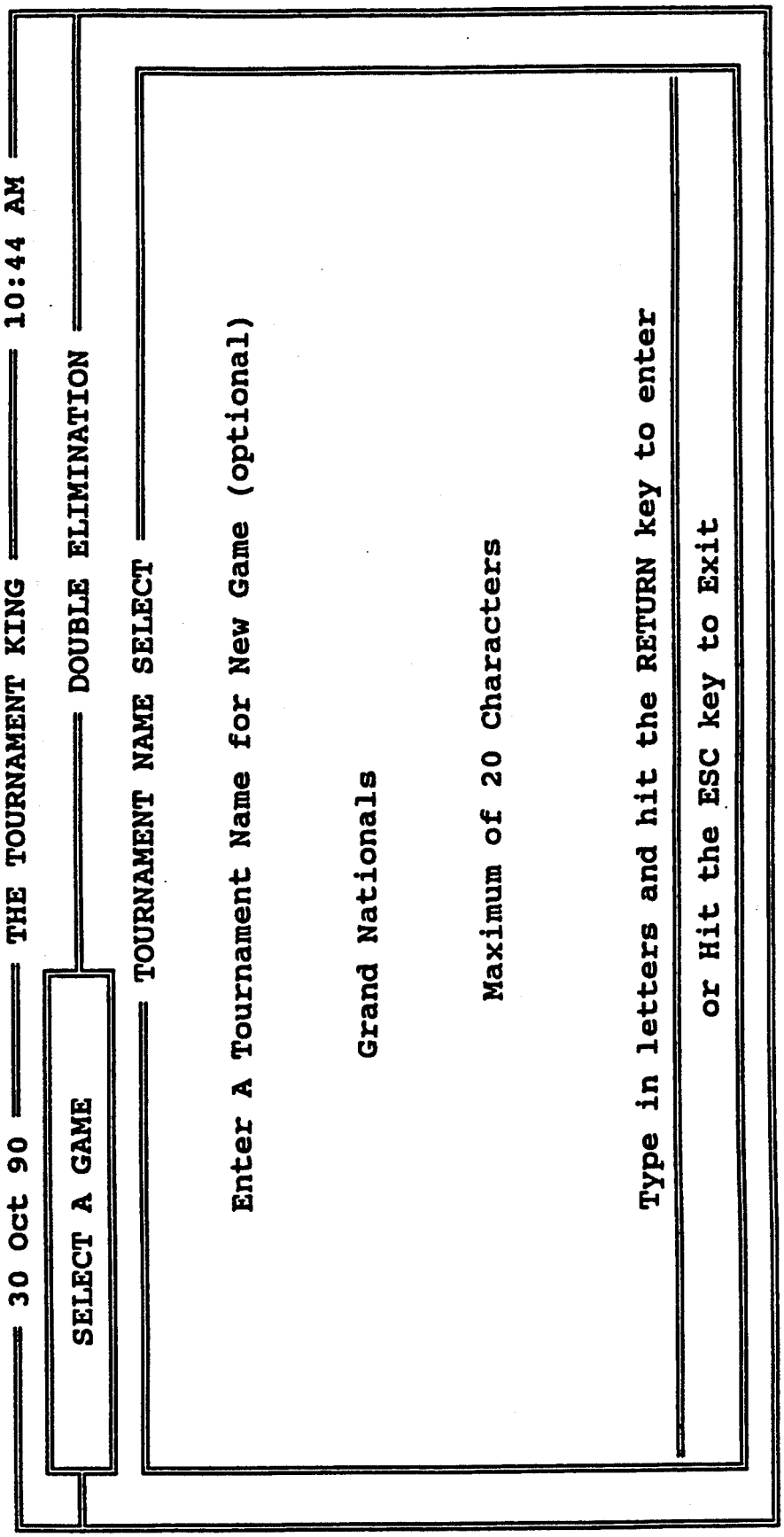
FIG. 17 is an illustration of the tournament name selection menu of the game selection portion of a preferred embodiment of the automatic universal tournament management system adapted to manage dart tournaments.

The operator is prompted by the tournament name selection screen illustrated in FIG. 17 to enter the name of the tournament to be scheduled ("Grand Nationals" was entered for the purpose of this example).

Figure 18:
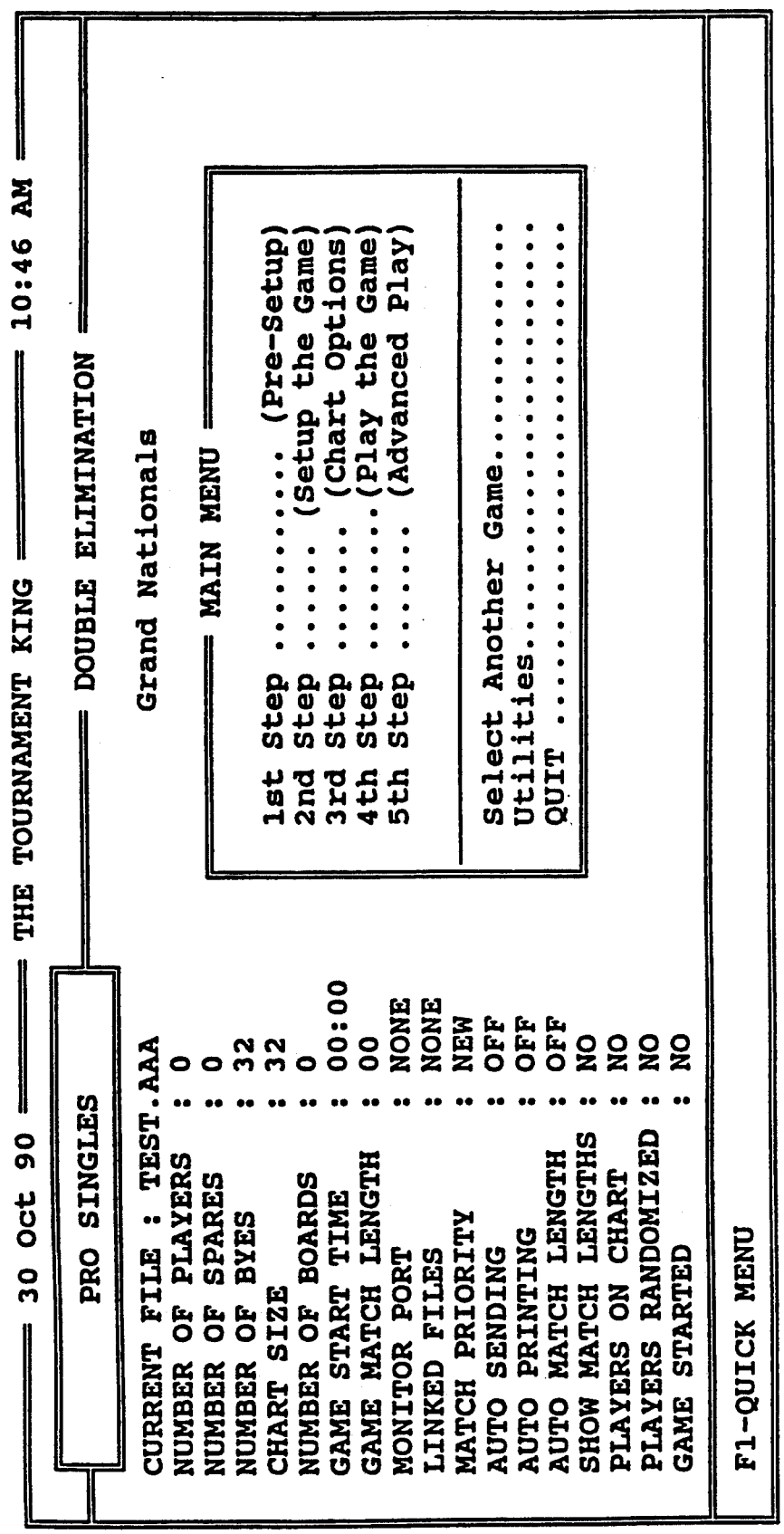
FIG. 18 is an illustration of the primary menu of a preferred embodiment of the automatic universal tournament management system adapted to manage dart tournaments.
Figure 19:
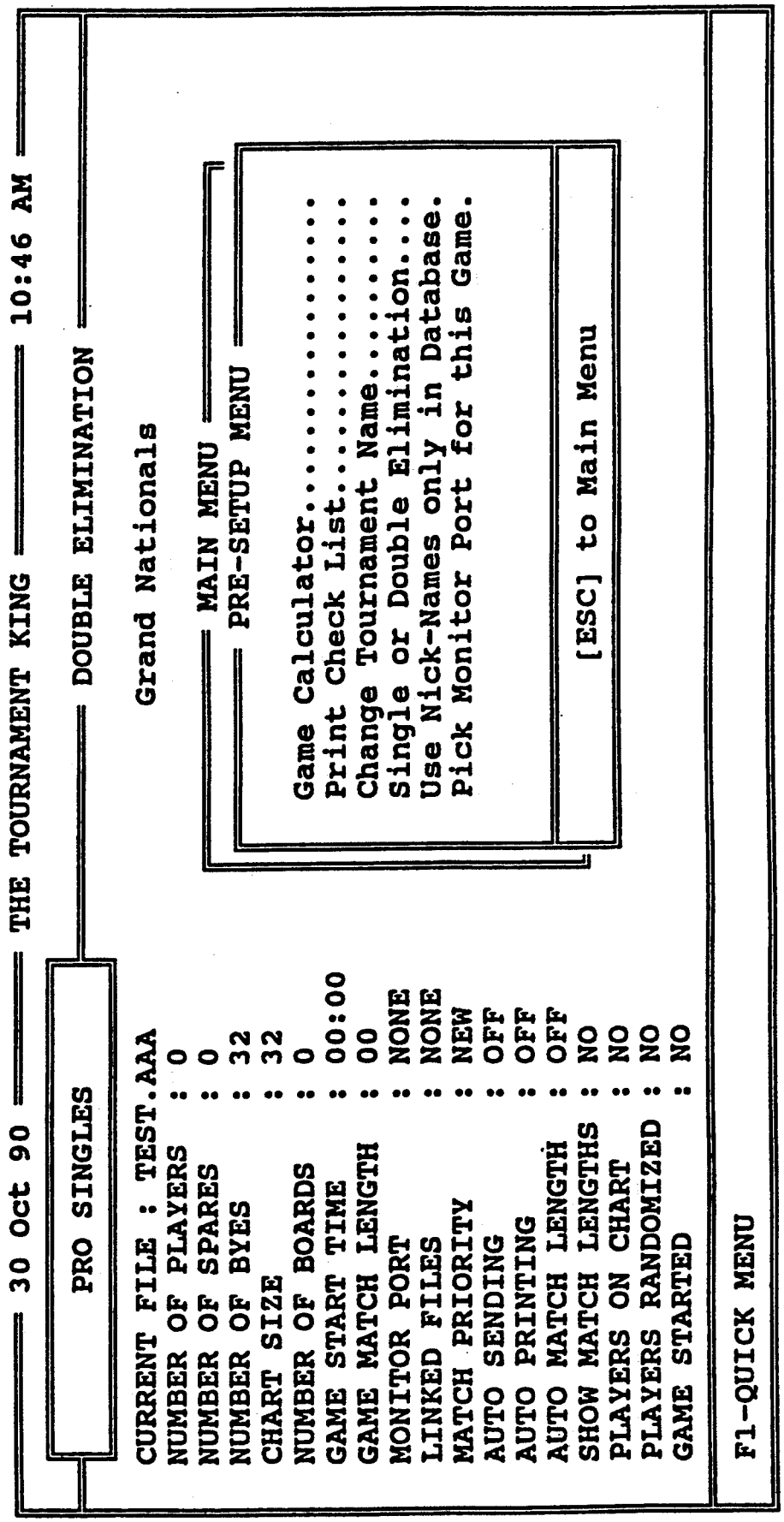
FIG. 19 is an illustration of the pre-setup menu of a preferred embodiment of the automatic universal tournament management system adapted to manage dart tournaments.
Figure 21:
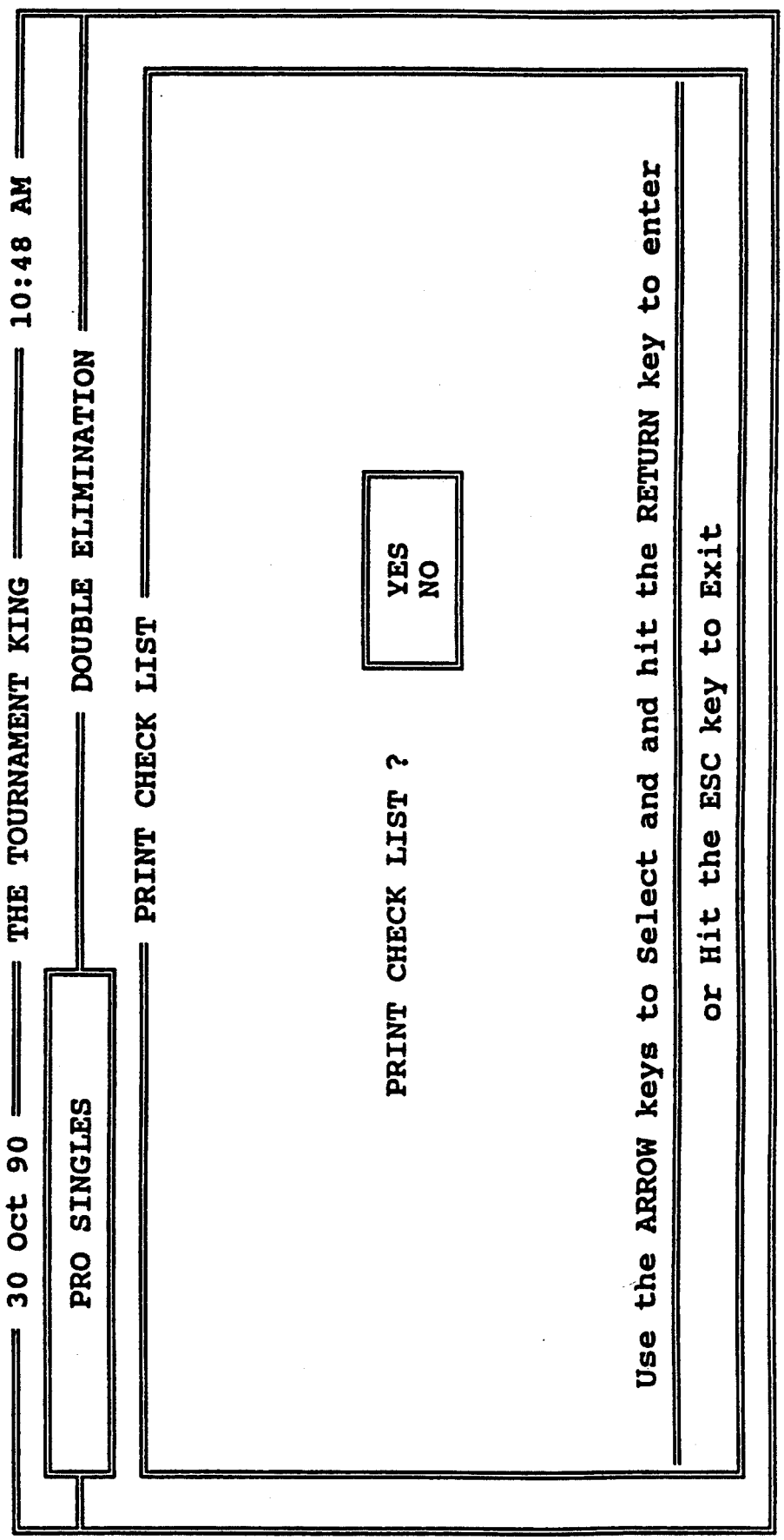
FIG. 21 is an illustration of the print check list confirmation screen of the pre-setup menu of a preferred embodiment of the automatic universal tournament management system adapted to manage dart tournaments.
Figure 22:
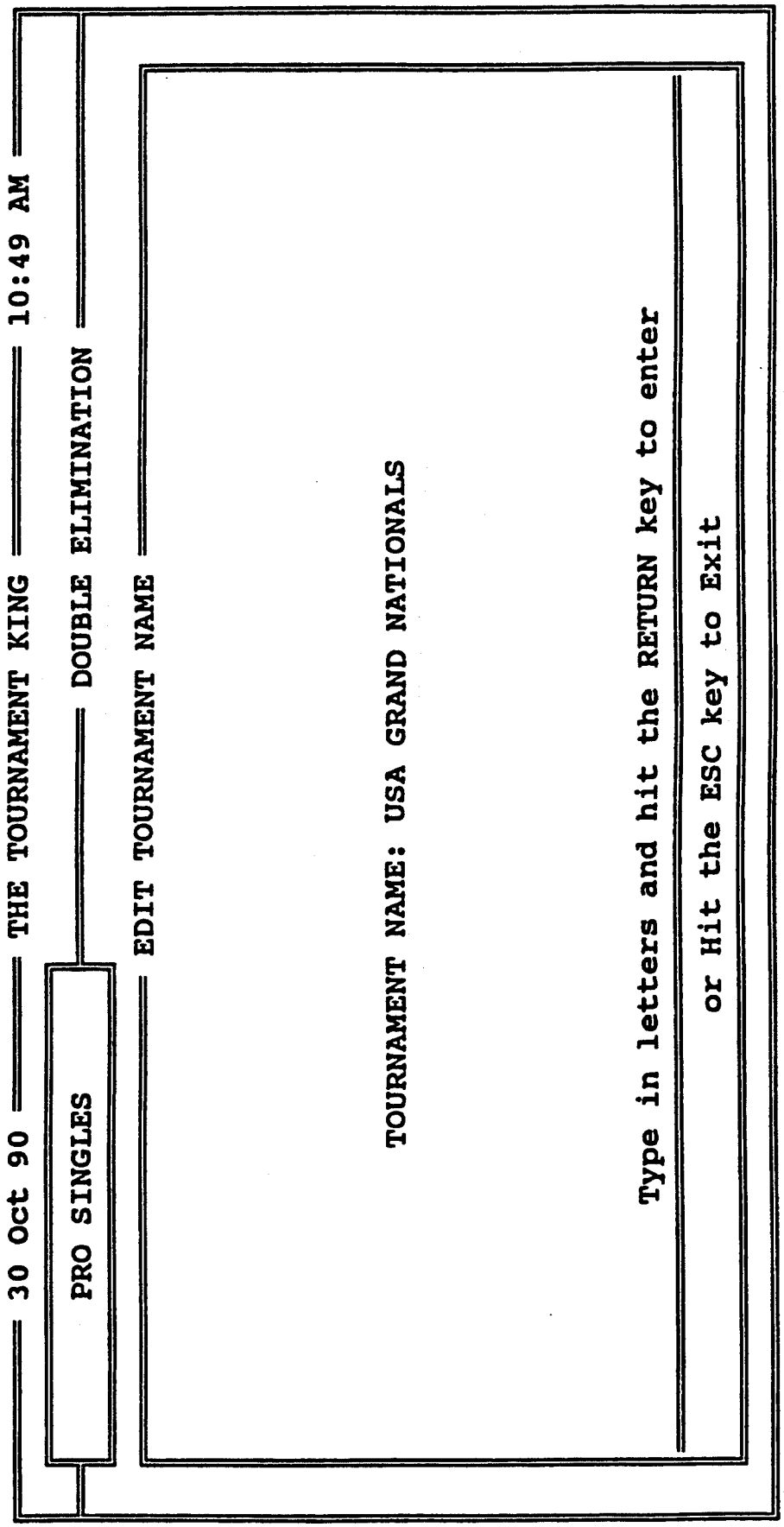
FIG. 22 is an illustration of the edit tournament name screen of the pre-setup menu of a preferred embodiment of the automatic universal tournament management system adapted to manage dart tournaments.
Figure 23:
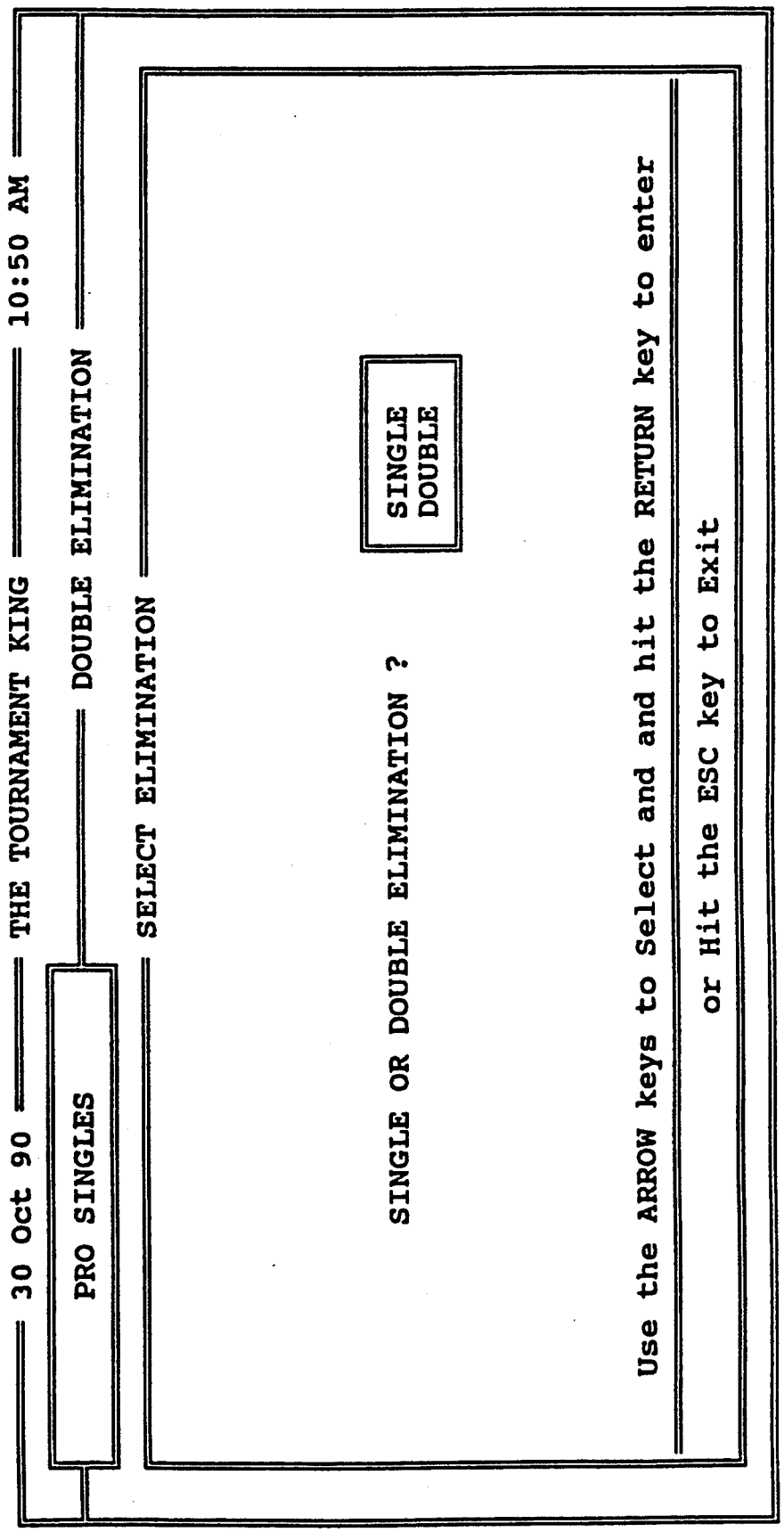
FIG. 23 is an illustration of the select elimination screen of the pre-setup menu of a preferred embodiment of the automatic universal tournament management system adapted to manage dart tournaments.
Figure 24:
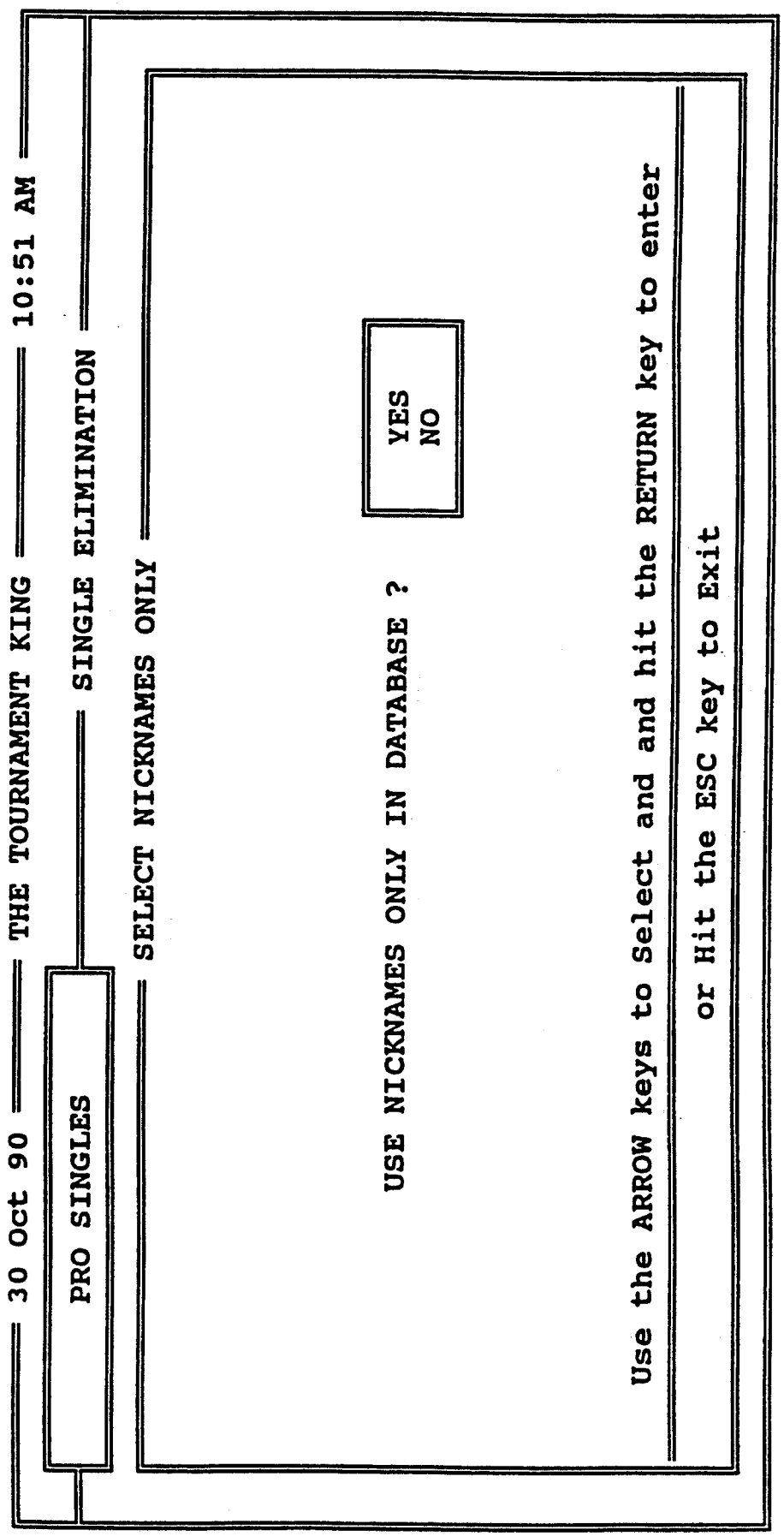
FIG. 24 is an illustration of the select nicknames only screen of the pre-setup menu of a preferred embodiment of the automatic universal tournament management system adapted to manage dart tournaments.
Figure 25:
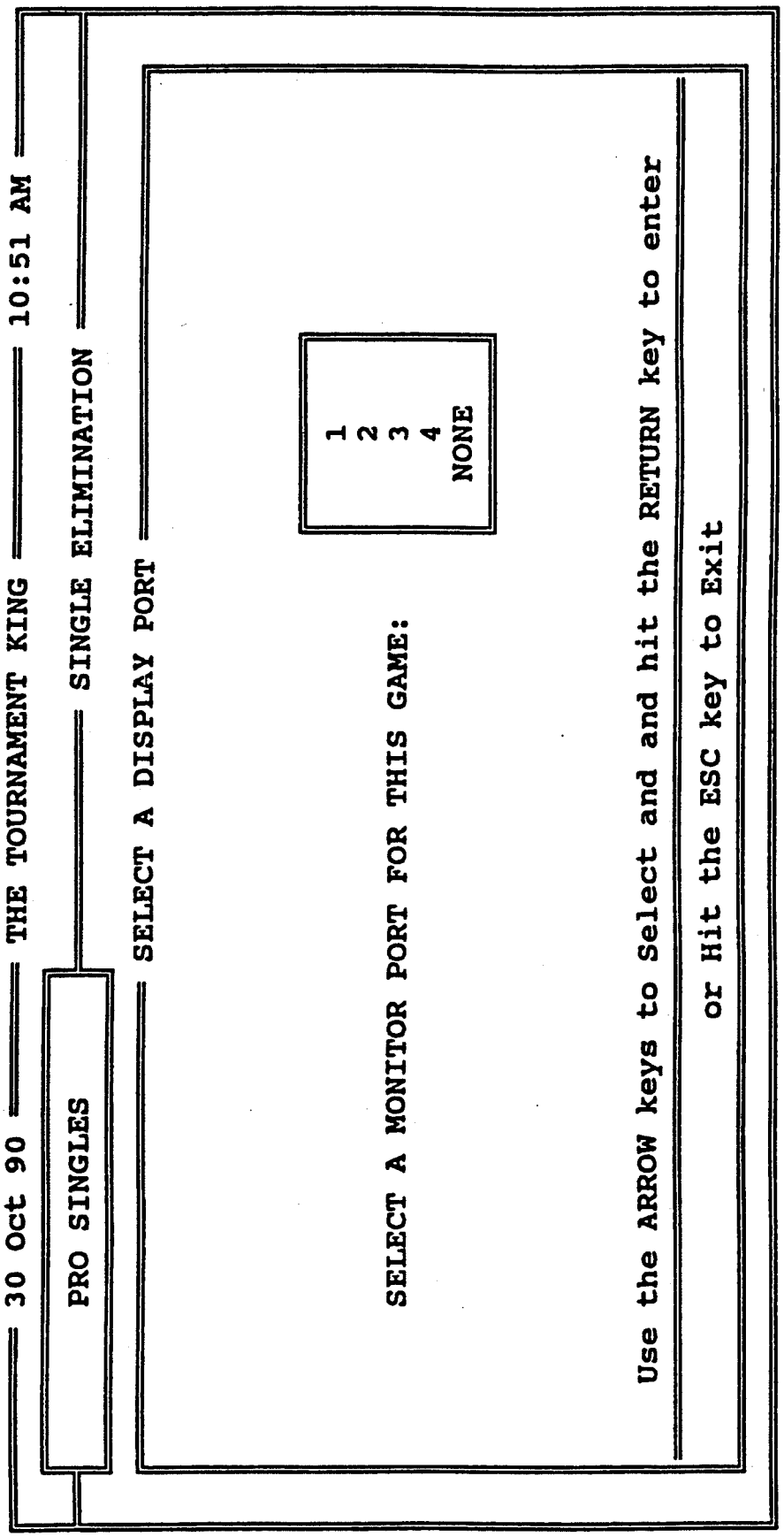
FIG. 25 is an illustration of the monitor port selection screen of the pre-setup menu of a preferred embodiment of the automatic universal tournament management system adapted to manage dart tournaments.
Figure 26:
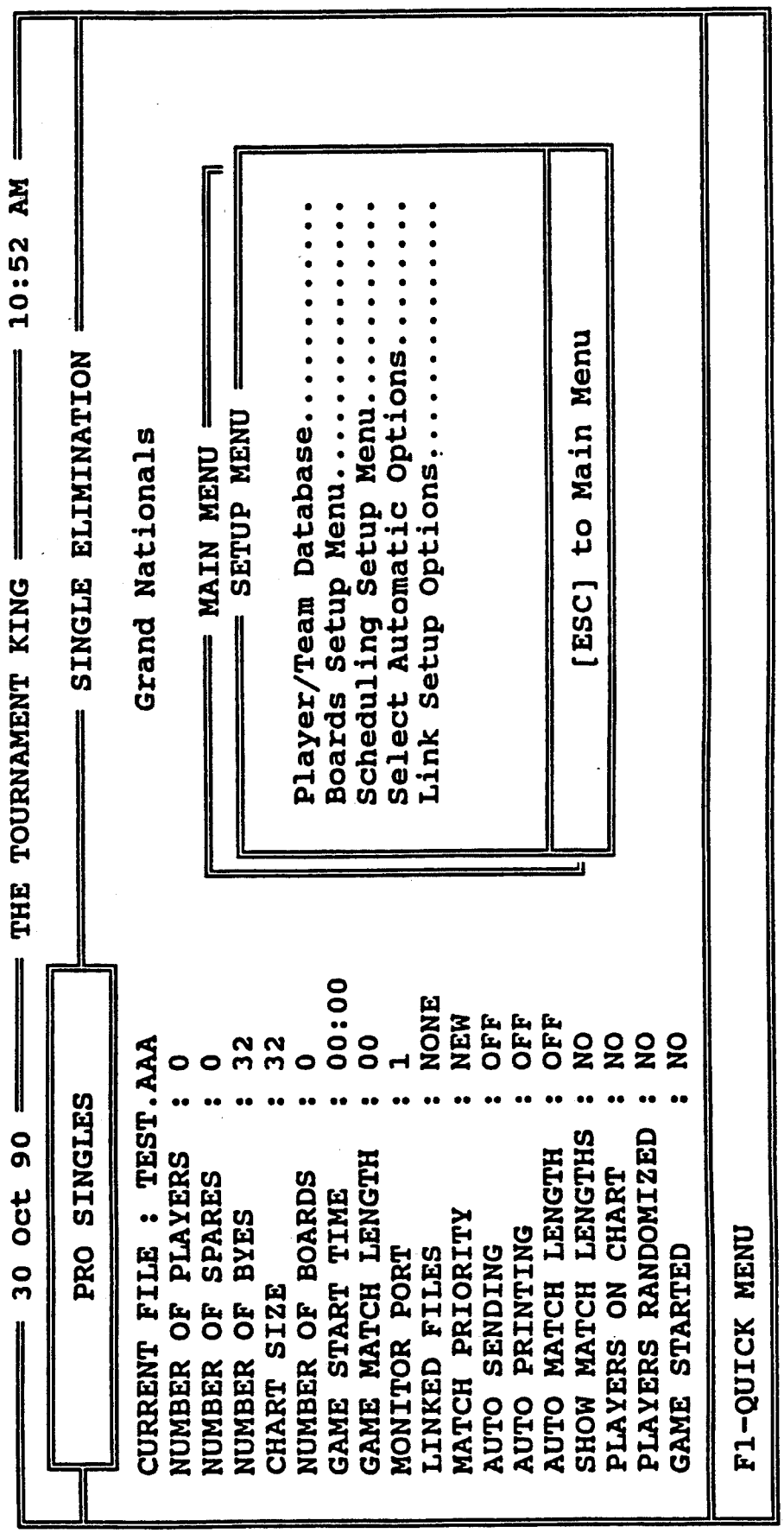
FIG. 26 is an illustration of the setup menu of a preferred embodiment of the automatic universal tournament management system adapted to manage dart tournaments.
Figure 27:
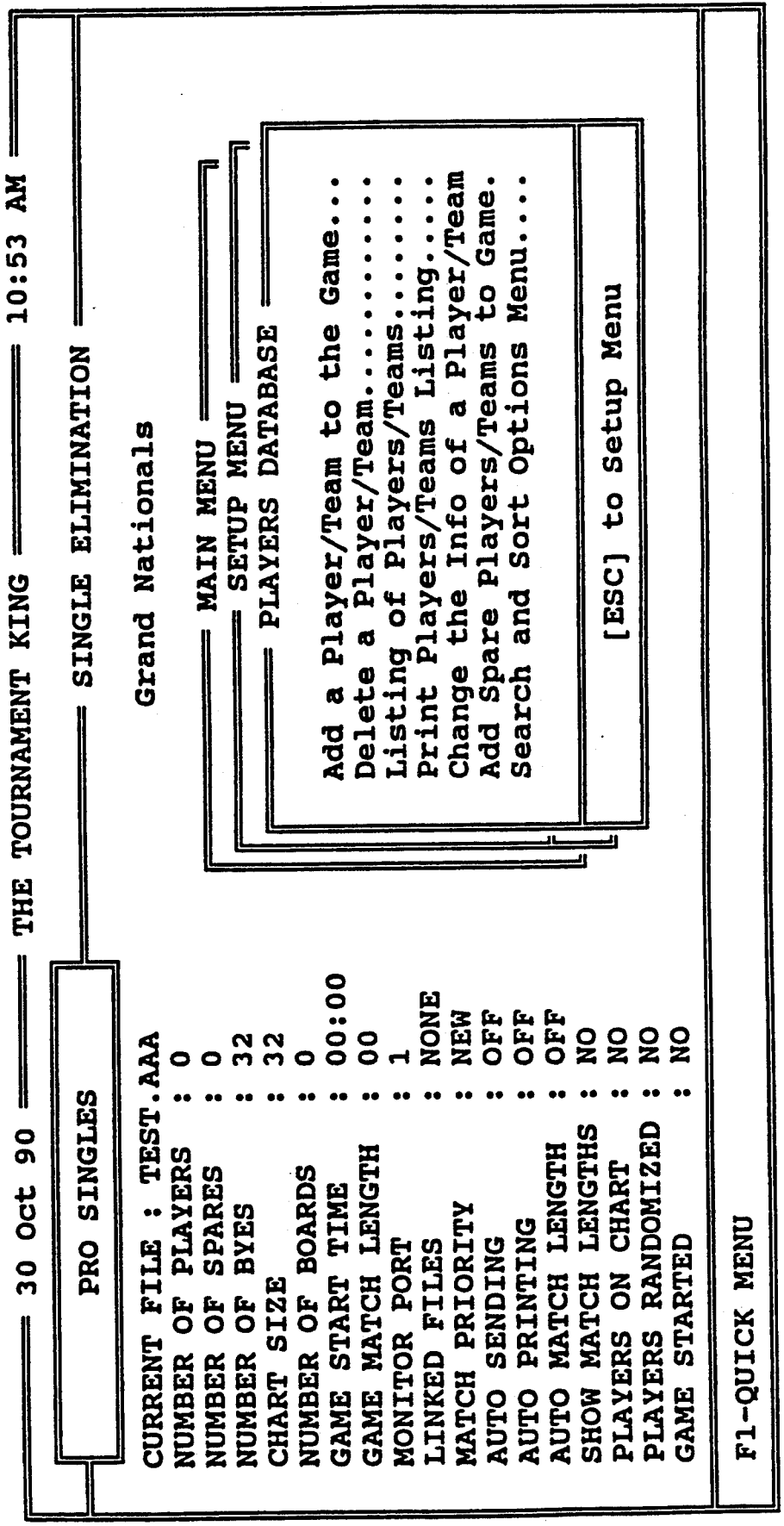
FIG. 27 is an illustration of the players database selection submenu of the setup menu of a preferred embodiment of the automatic universal tournament management system adapted to manage dart tournaments.
Figure 29:
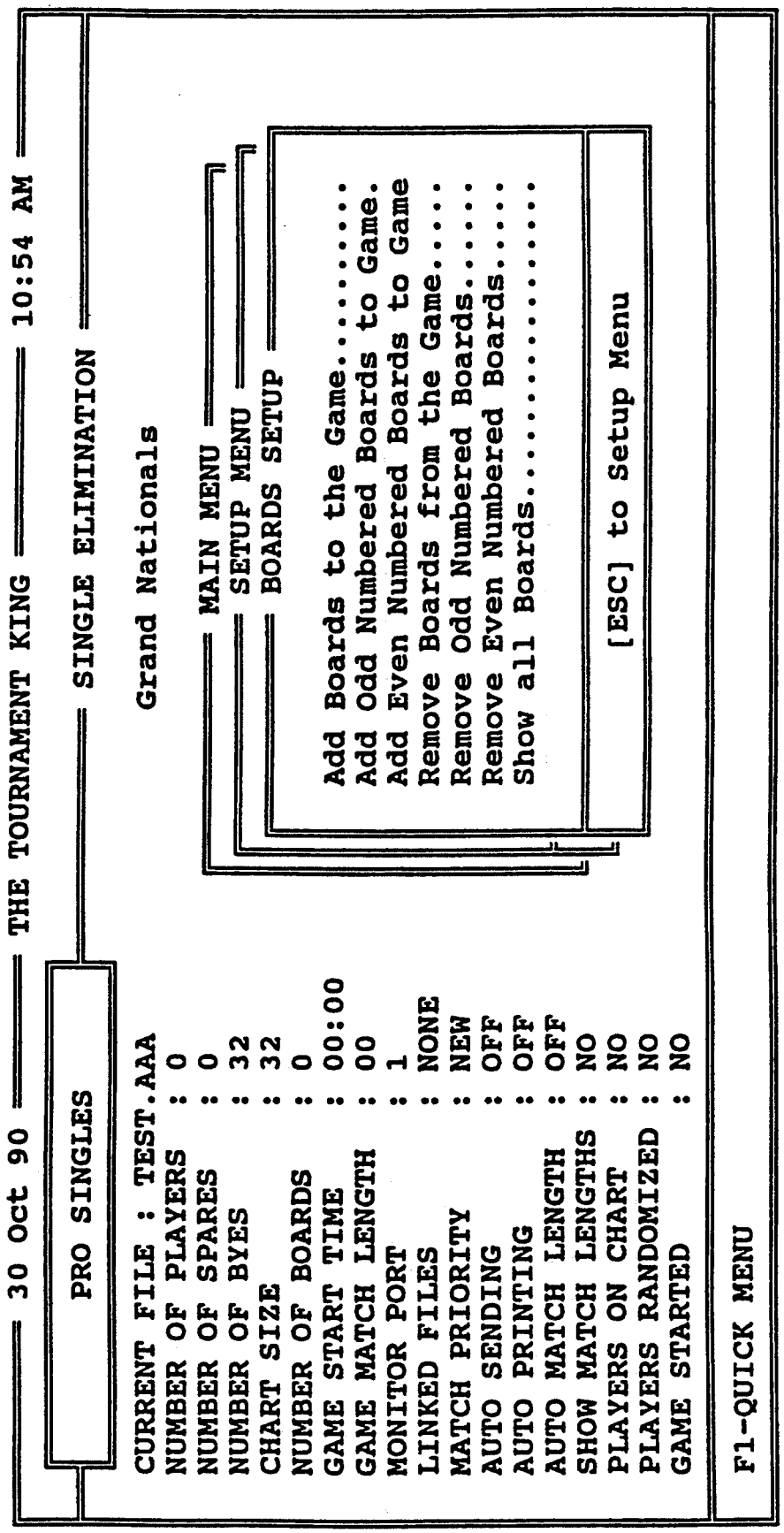
FIG. 29 is an illustration of the boards setup submenu of the setup menu of a preferred embodiment of the automatic universal tournament management system adapted to manage dart tournaments.
Figure 30:
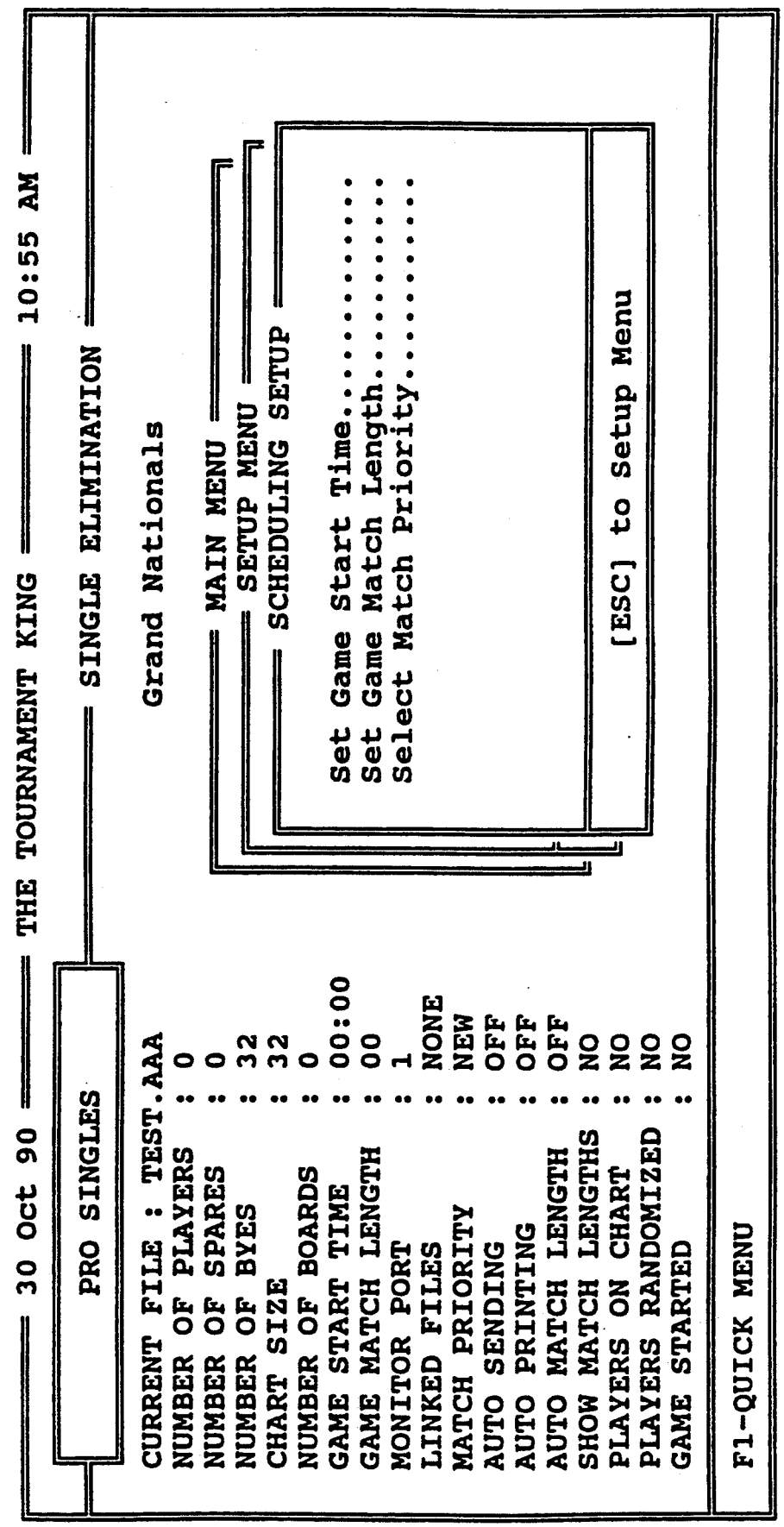
FIG. 30 is an illustration of the scheduling setup submenu of the setup menu of a preferred embodiment of the automatic universal tournament management system adapted to manage dart tournaments.
Figure 31:
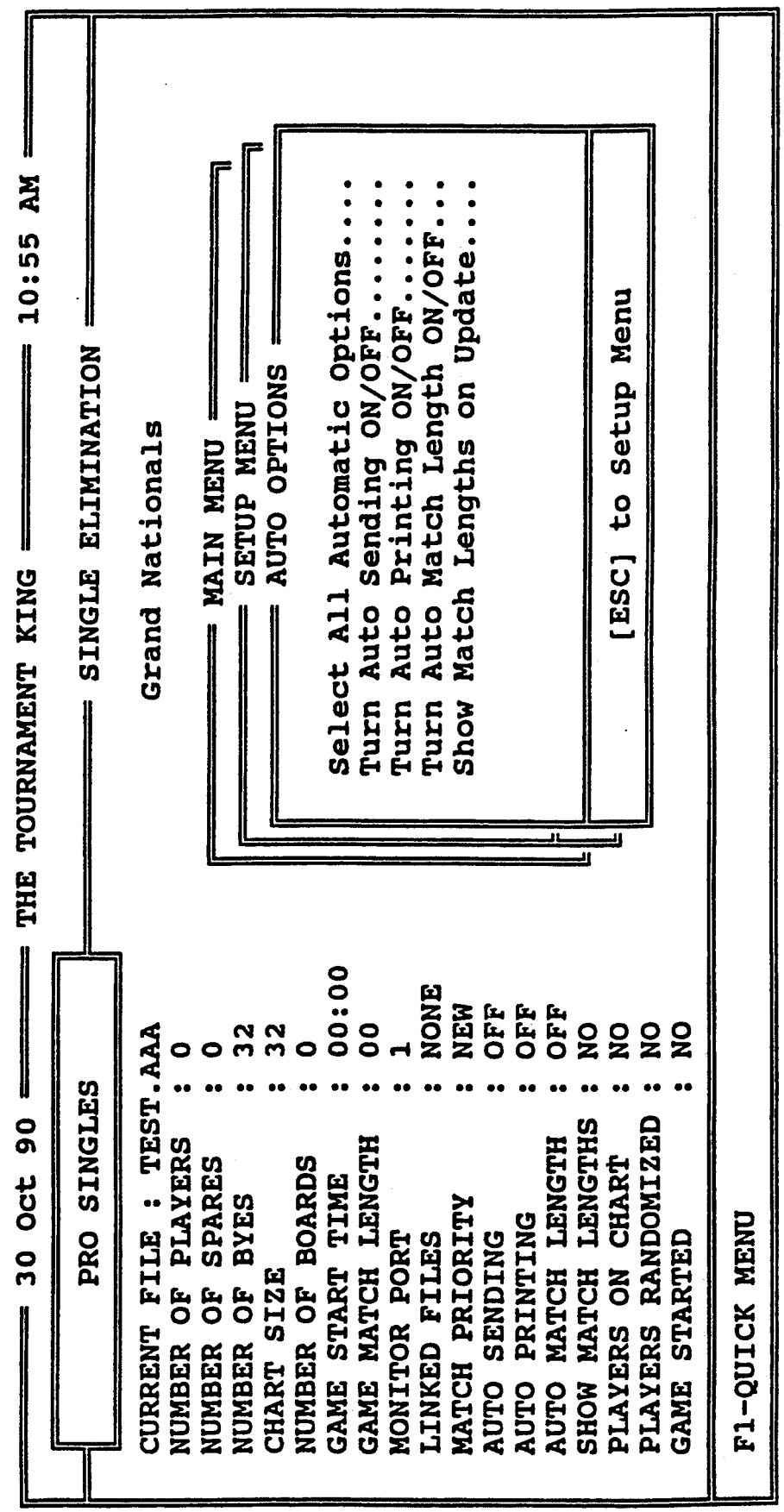
FIG. 31 is an illustration of the auto options submenu of the setup menu of a preferred embodiment of the automatic universal tournament management system adapted to manage dart tournaments.

The "MAIN MENU" next appears as illustrated in FIG. 18. Here the operator is prompted to enter tournament information. The operator must first select the "PRE-SETUP" options for general program setup. FIGS. 19 through 25 illustrate the screens and prompts found in the "PRE-SETUP MENU."

The operator must next select the "SETUP MENU" (FIG. 26) from the "MAIN MENU" (FIG. 18). If the operator selects the "Player/Team Database" selection from the "SETUP MENU" the menu illustrated in FIG. 27 will appear (see, also, FIG. 28). If the operator selects the "Boards Setup" selection from the "SETUP MENU" the menu illustrated in FIG. 29 will appear. Should the operator select the "Scheduling Setup Menu" selection from the "SETUP MENU" the screen illustrated in FIG. 30 will appear. If the "Select Automatic Options" selection is made from the "SETUP MENU" the menu illustrated in FIG. 31 will appear on the monitor 18 in order to prompt the operator. Likewise, if the "Link Setup Options" selection is made from the "SETUP MENU" the menu illustrated in FIG. 32 will appear.

Figure 33:
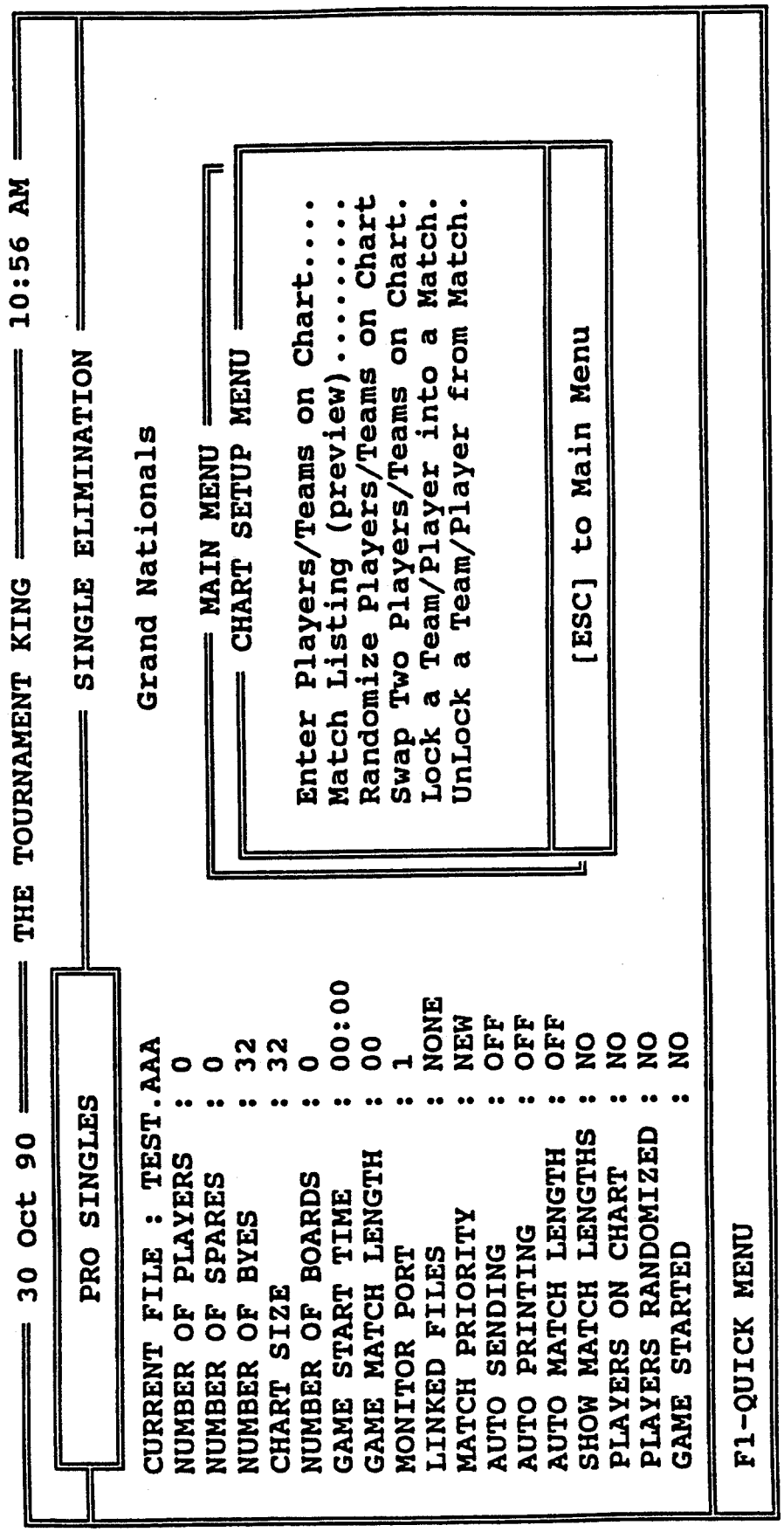
FIG. 33 is an illustration of the chart setup menu of a preferred embodiment of the automatic universal tournament management system adapted to manage dart tournaments.
Figure 34:
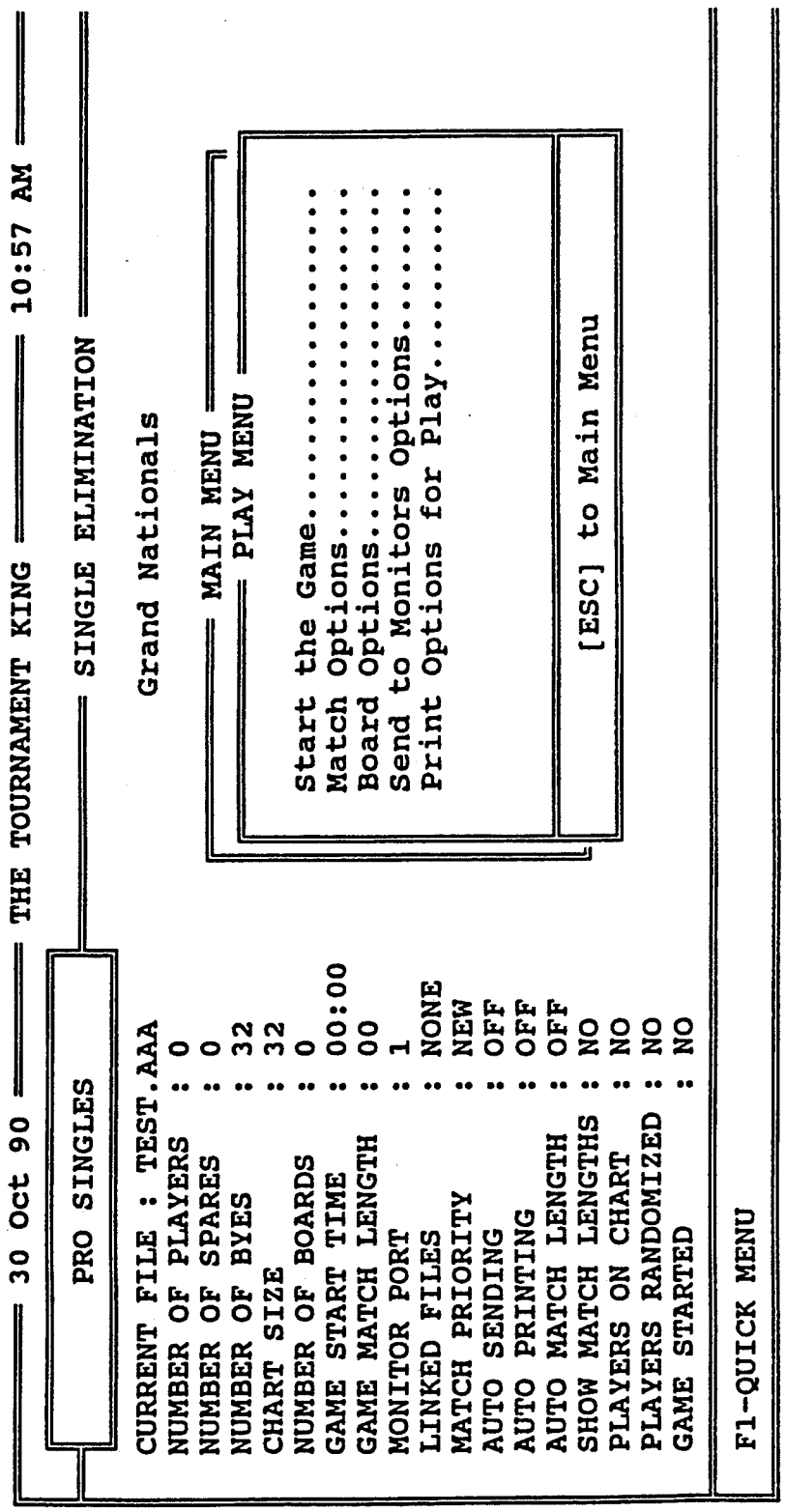
FIG. 34 is an illustration of the play menu of a preferred embodiment of the automatic universal tournament management system adapted to manage dart tournaments.
Figure 35:
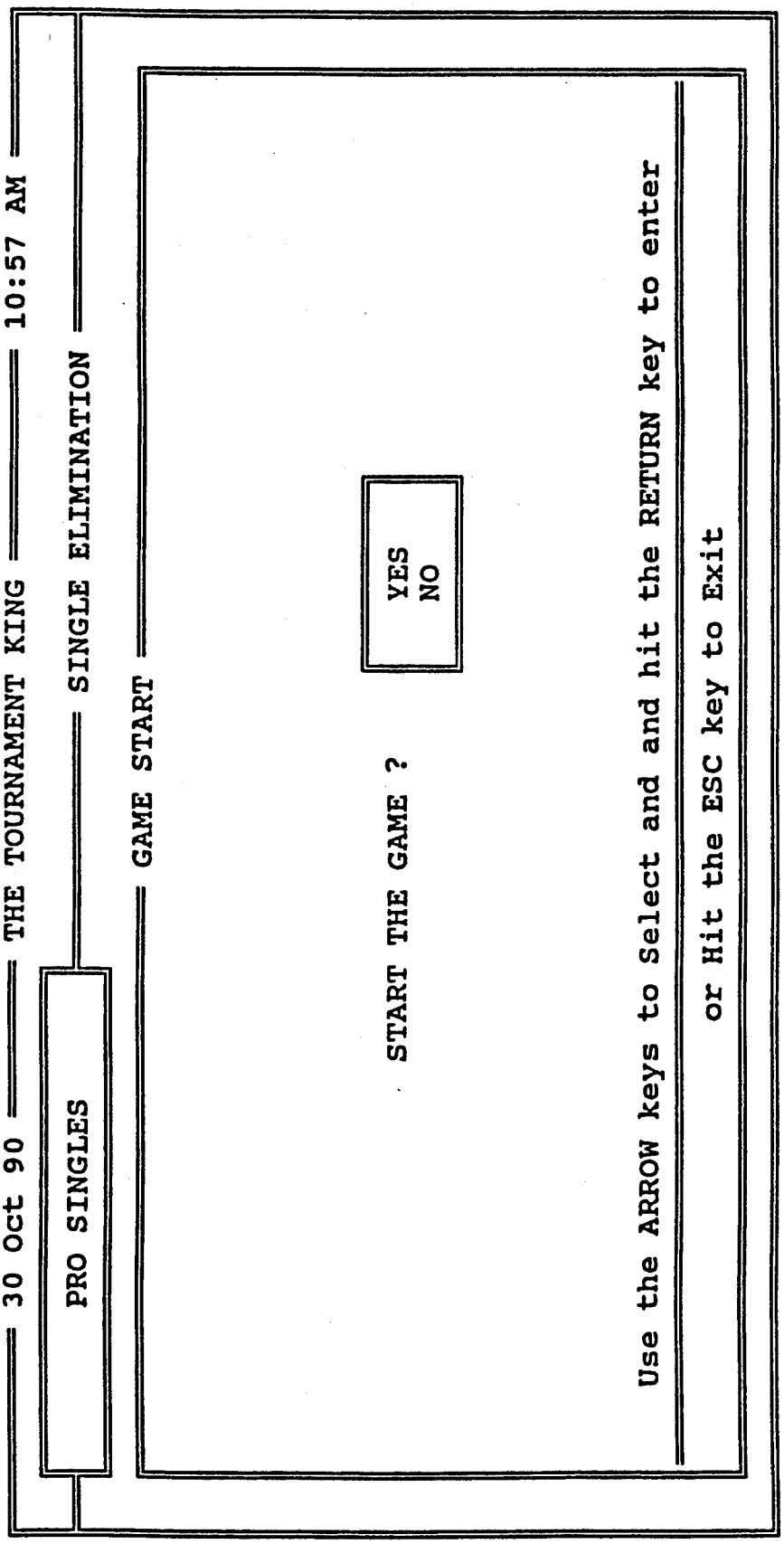
FIG. 35 is an illustration of the game start selection screen of the play menu of a preferred embodiment of the automatic universal tournament management system adapted to manage dart tournaments.

If "Chart Options" is selected from the "MAIN MENU" (FIG. 18) the menu illustrated in FIG. 33 will appear on the monitor 18. Likewise, if the "Play the Game" option is selected from the "MAIN MENU" the menu illustrated in FIG. 34 appears. The operator is prompted by the screen illustrated in FIG. 35 to start the game.

Figure 36:
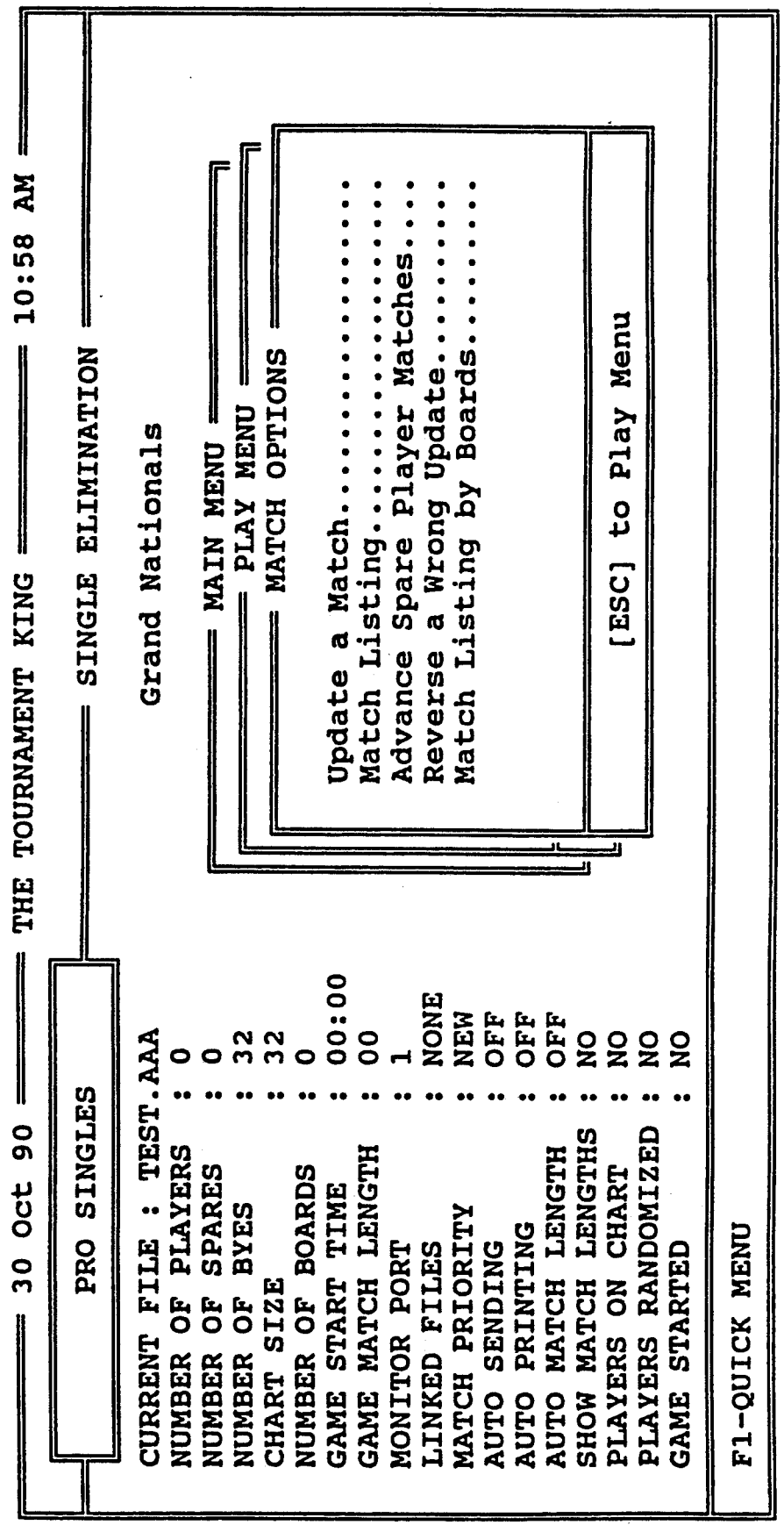
FIG. 36 is an illustration of the match options submenu of the play menu of a preferred embodiment of the automatic universal tournament management system adapted to manage dart tournaments.
Figure 37:
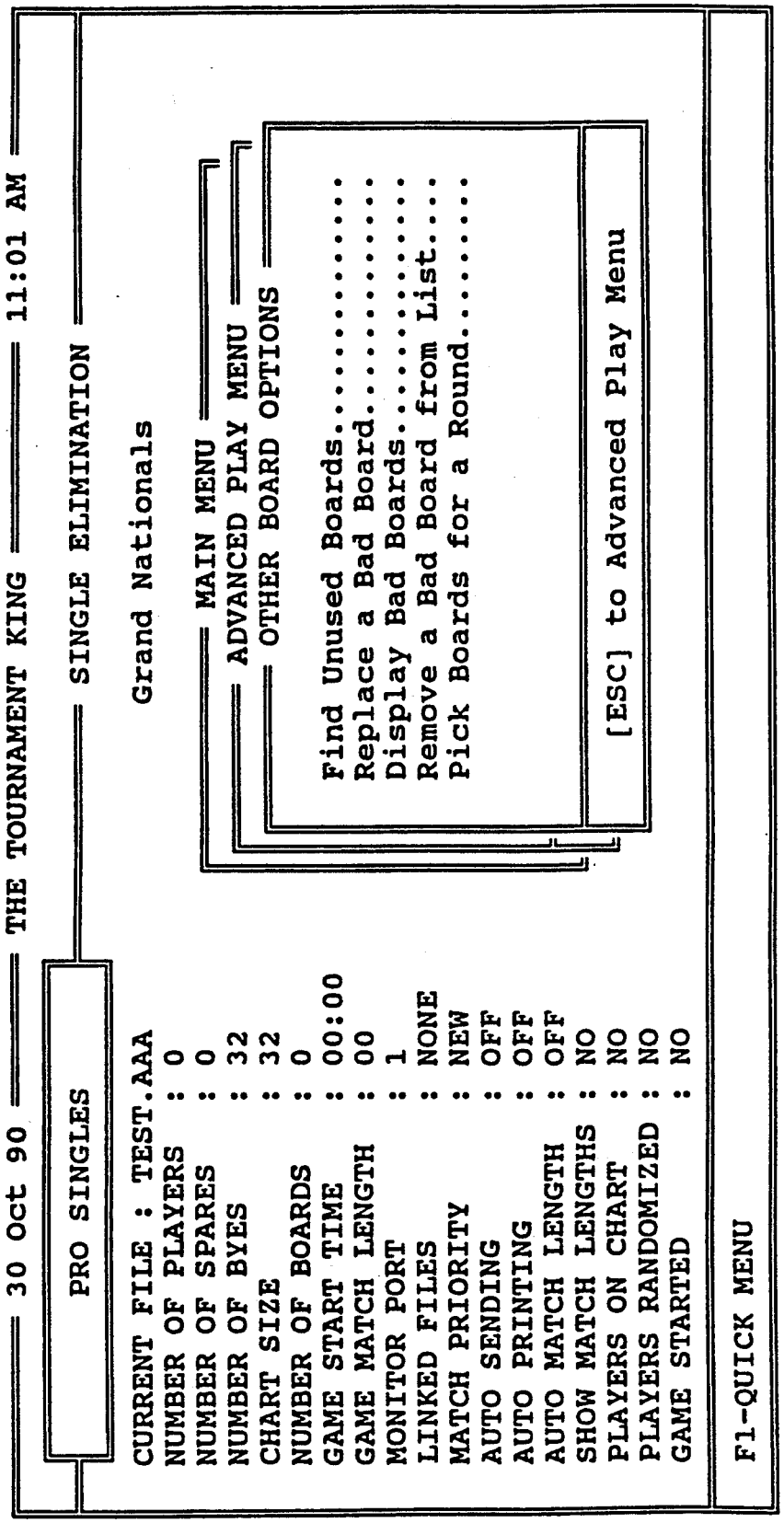
FIG. 37 is an illustration of the other board options submenu of the advanced play menu of a preferred embodiment of the automatic universal tournament management system adapted to manage dart tournaments.
Figure 38:
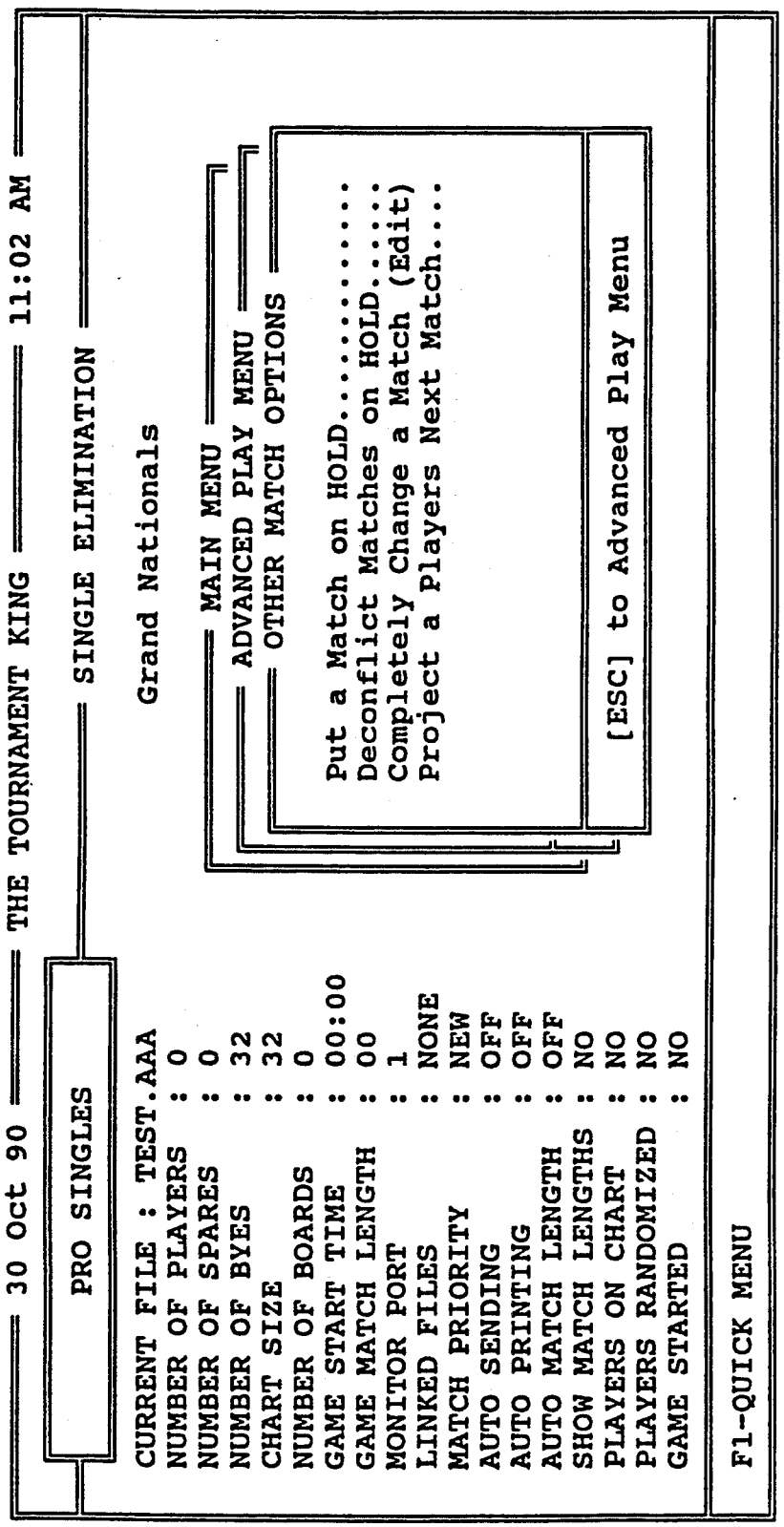
FIG. 38 is an illustration of the other match options submenu of the advanced play menu of a preferred embodiment of the automatic universal tournament management system adapted to manage dart tournaments.
Figure 39:
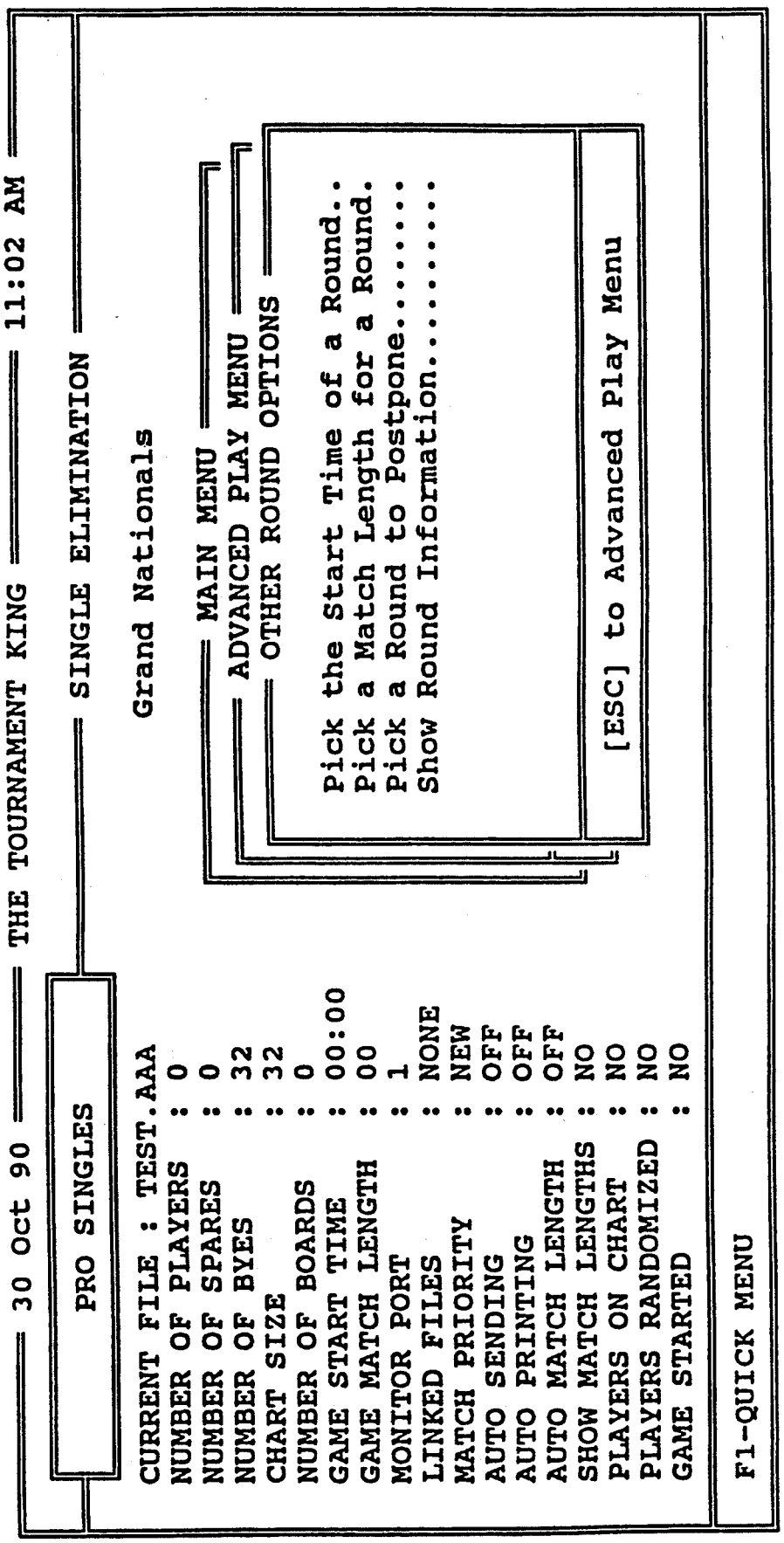
FIG. 39 is an illustration of the other rounds options submenu of the advanced play menu of a preferred embodiment of the automatic universal tournament management system adapted to manage dart tournaments.
Figure 40:
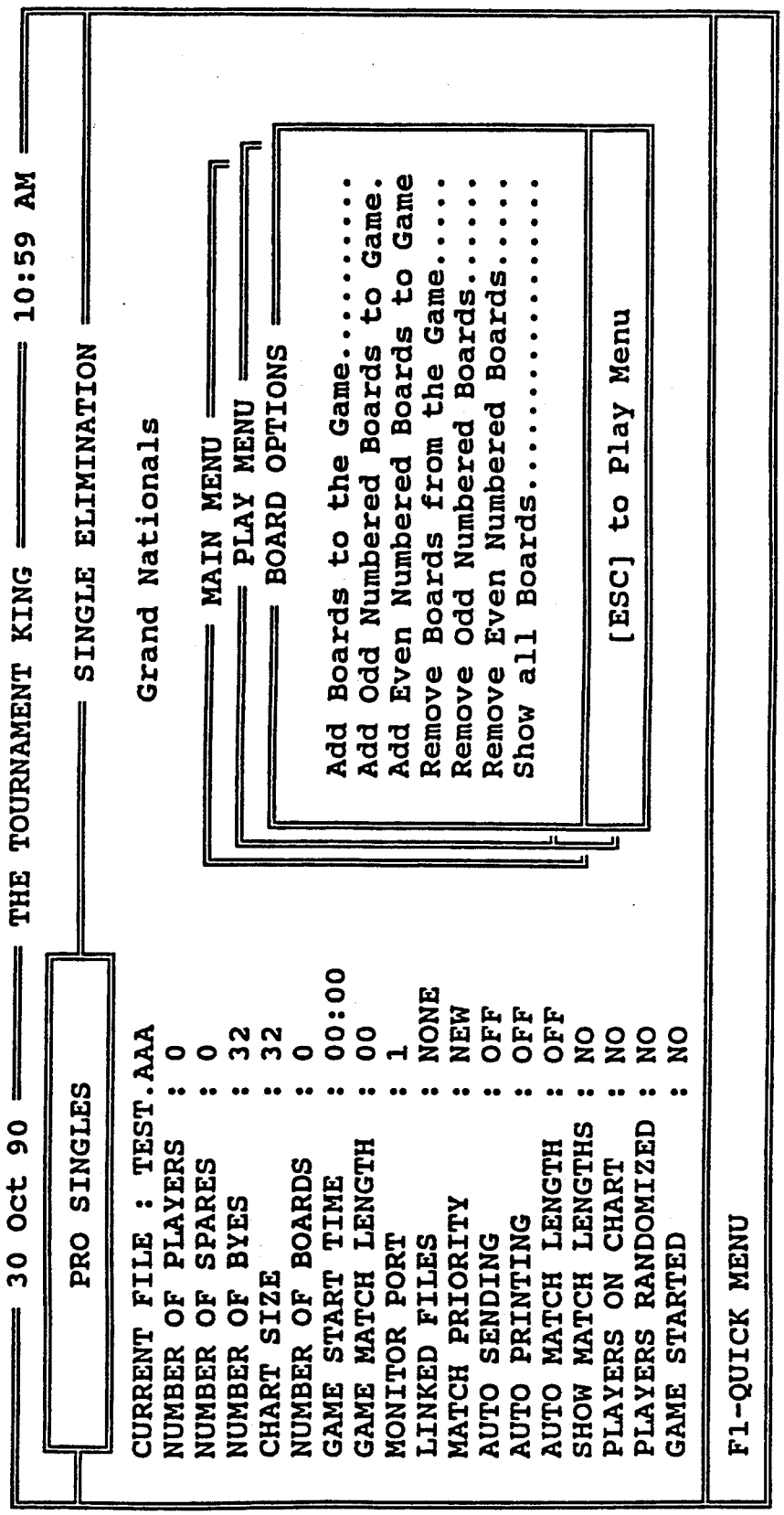
FIG. 40 is an illustration of the board options submenu of the play menu of a preferred embodiment of the automatic universal tournament management system adapted to manage dart tournaments.
Figure 41:
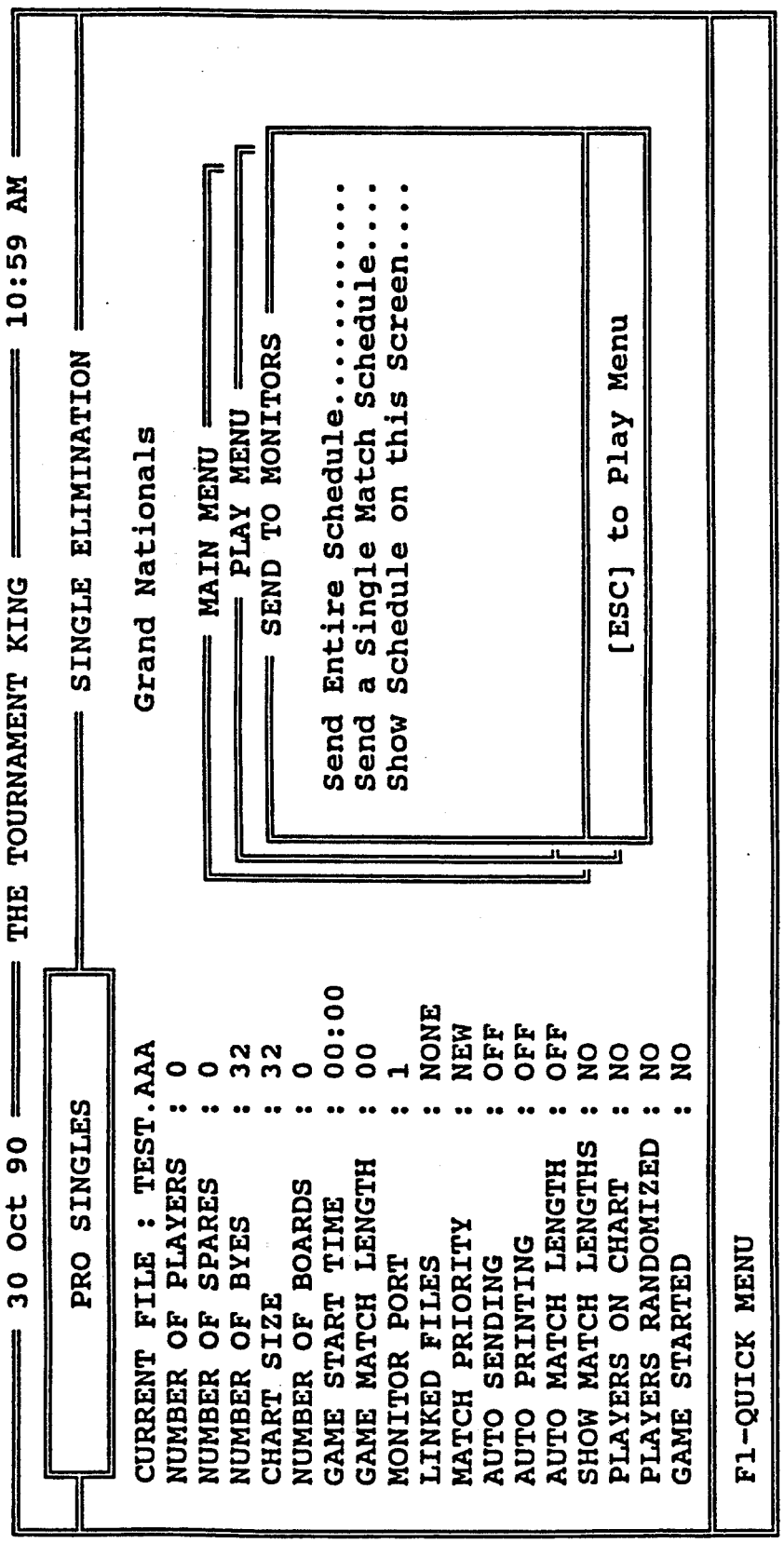
FIG. 41 is an illustration of the send to monitors submenu of the play menu of a preferred embodiment of the automatic universal tournament management system adapted to manage dart tournaments.
Figure 42:
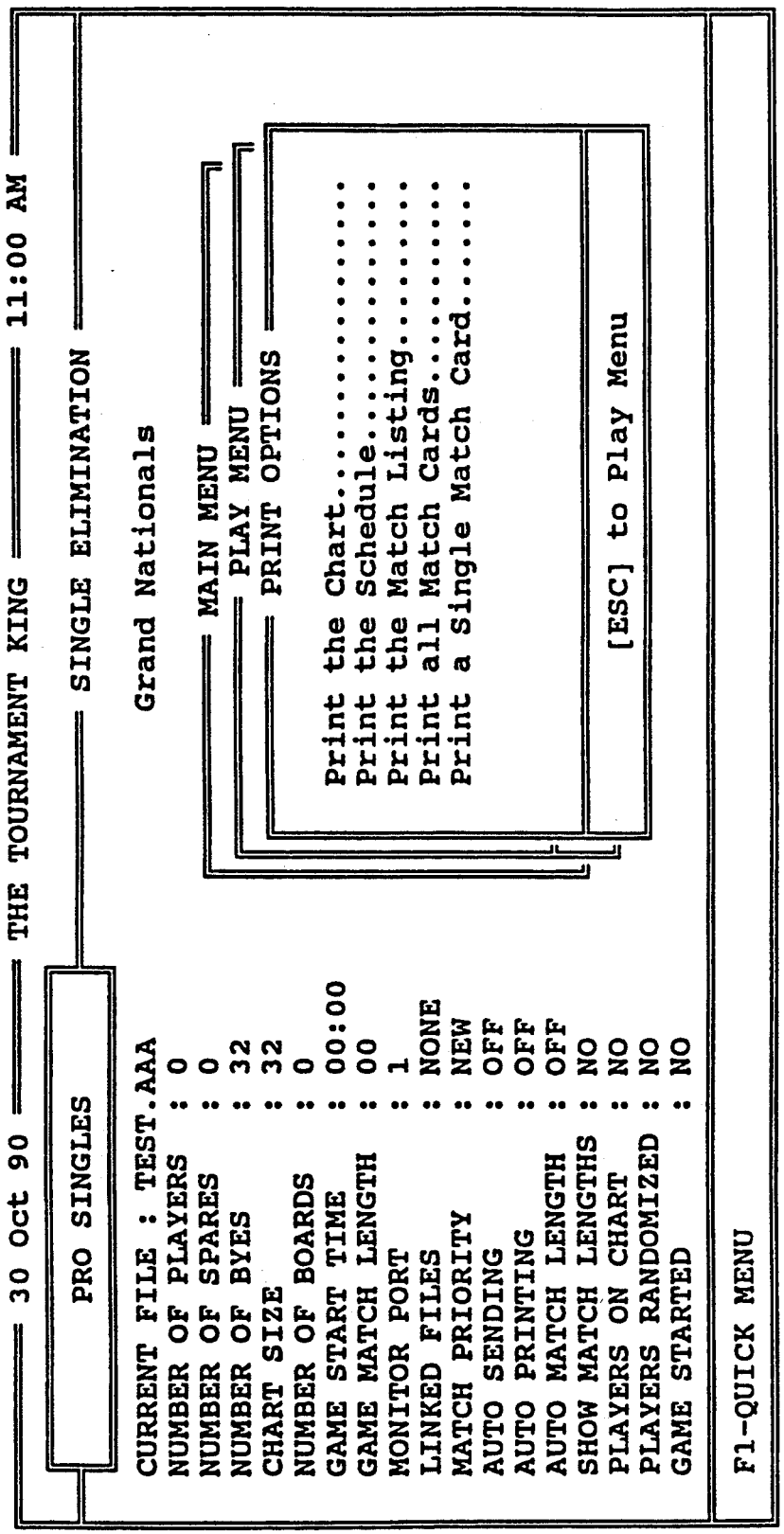
FIG. 42 is an illustration of the print options submenu of the play menu of a preferred embodiment of the automatic universal tournament management system adapted to manage dart tournaments.
Figure 43:
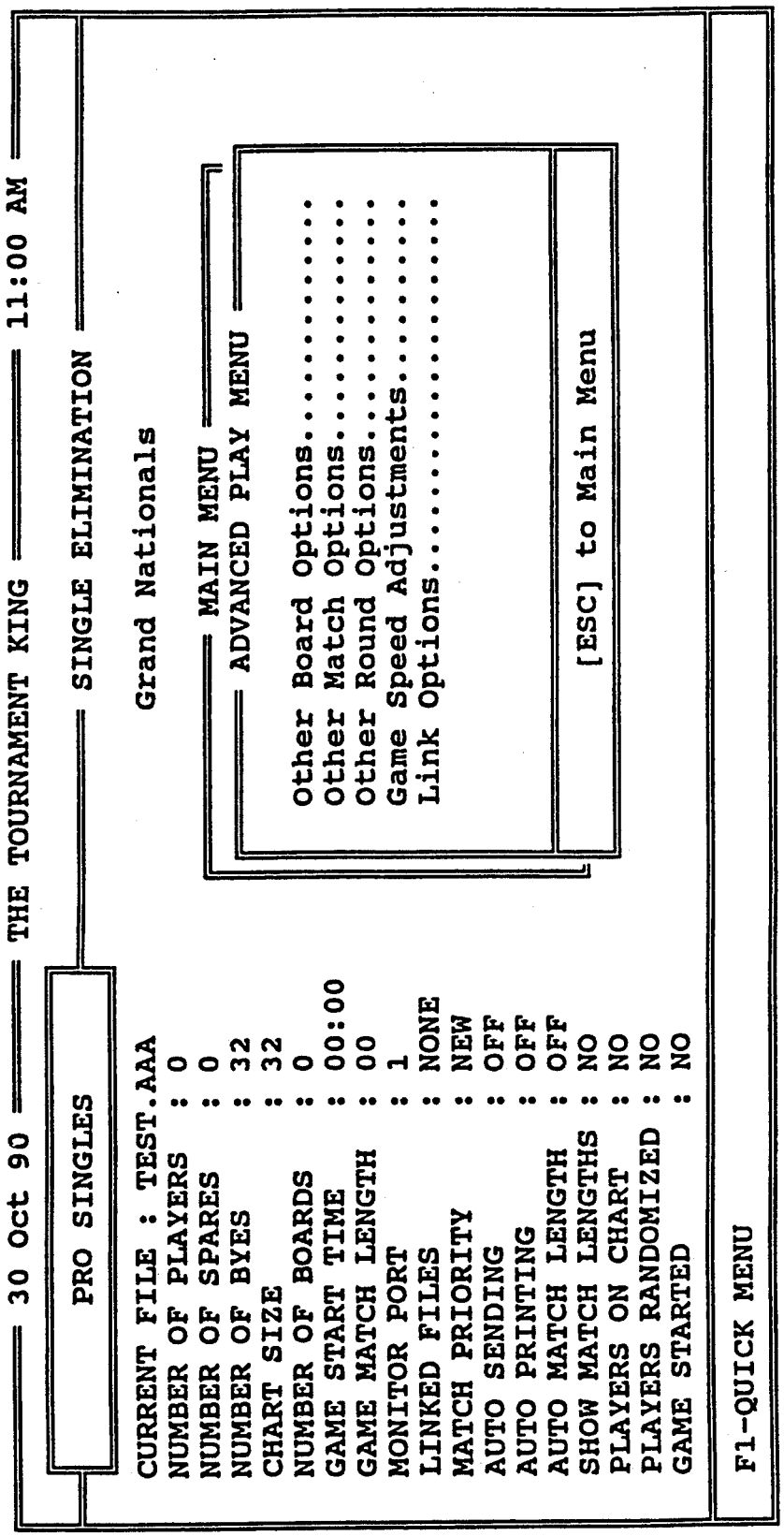
FIG. 43 is an illustration of the advanced play menu of a preferred embodiment of the automatic universal tournament management system adapted to manage dart tournaments.
Figure 44:
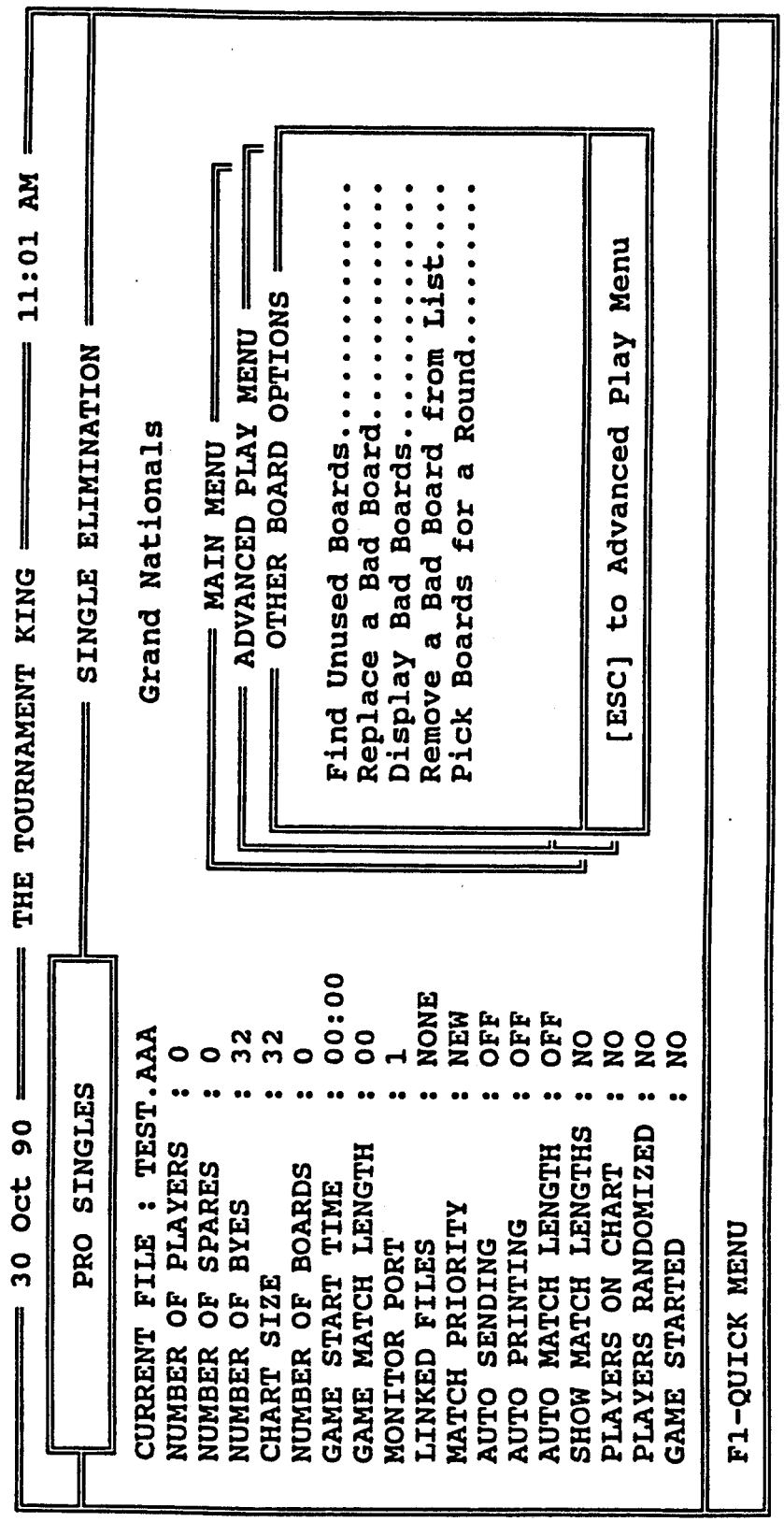
FIG. 44 is an illustration of the other board options submenu of the advanced play menu of a preferred embodiment of the automatic universal tournament management system adapted to manage dart tournaments.
Figure 45:
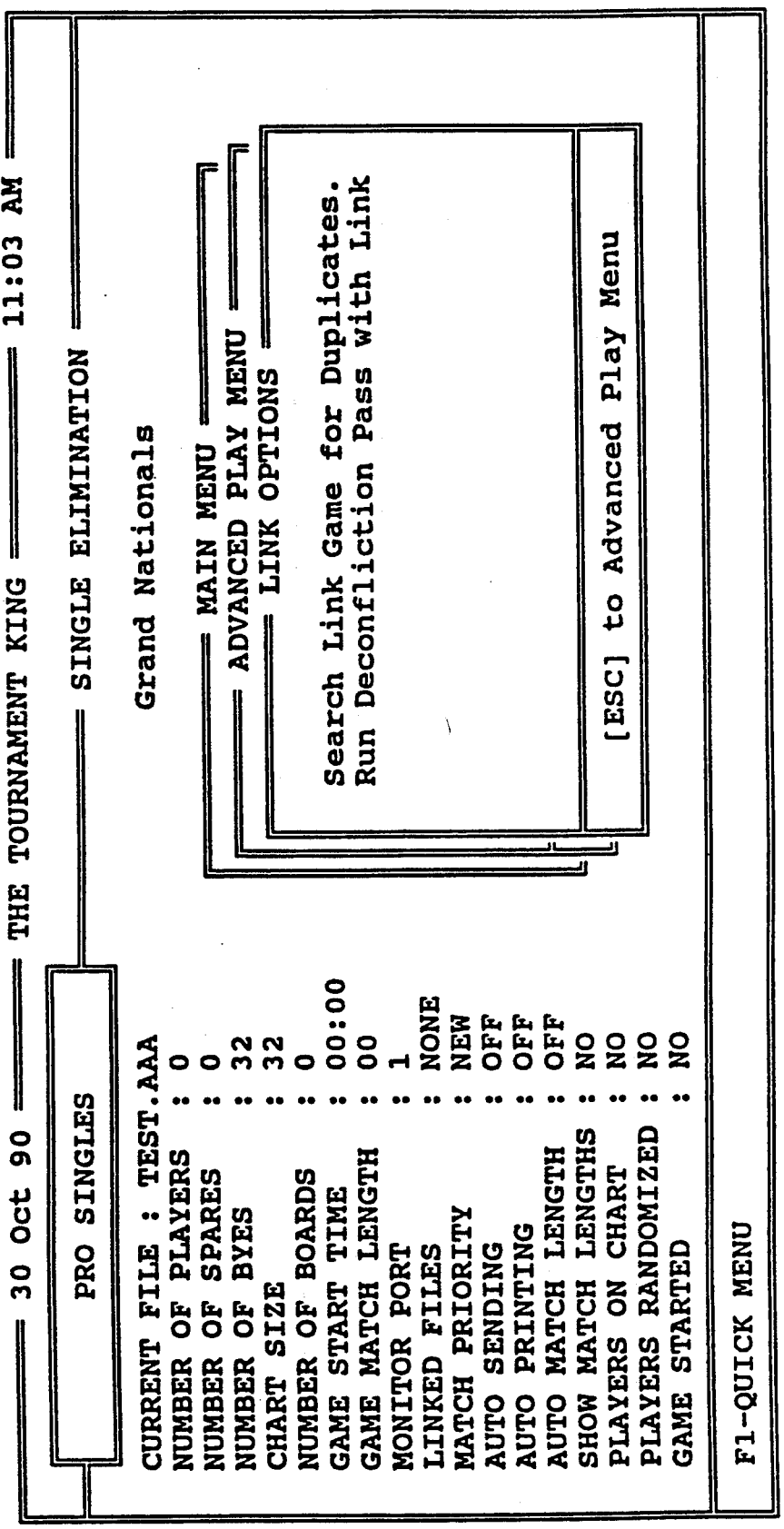
FIG. 45 is an illustration of the link options submenu of the advanced play menu of a preferred embodiment of the automatic universal tournament management system adapted to manage dart tournaments.
Figure 46:
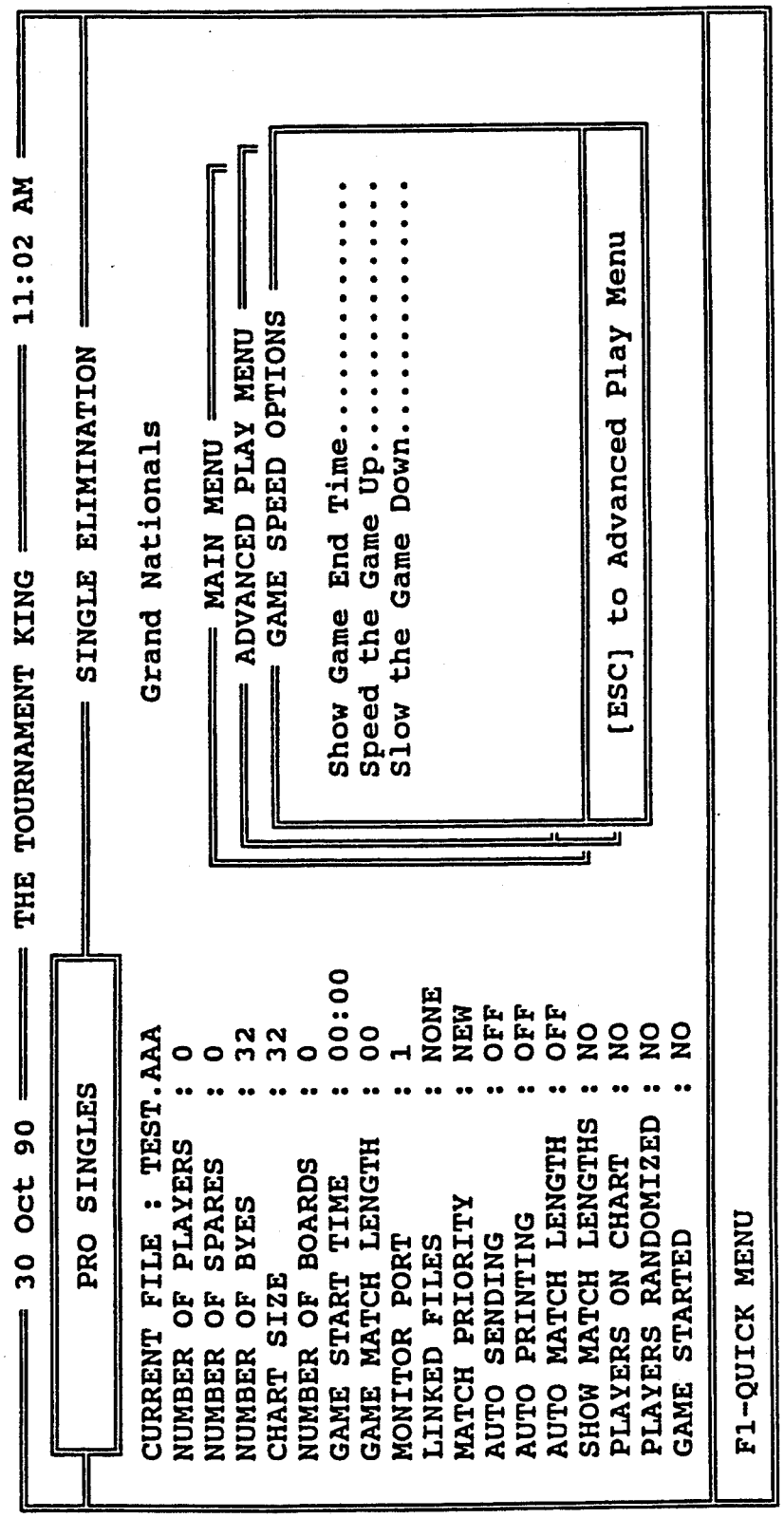
FIG. 46 is an illustration of the game speed options submenu of the advanced play menu of a preferred embodiment of the automatic universal tournament management system adapted to manage dart tournaments.
Figure 47:
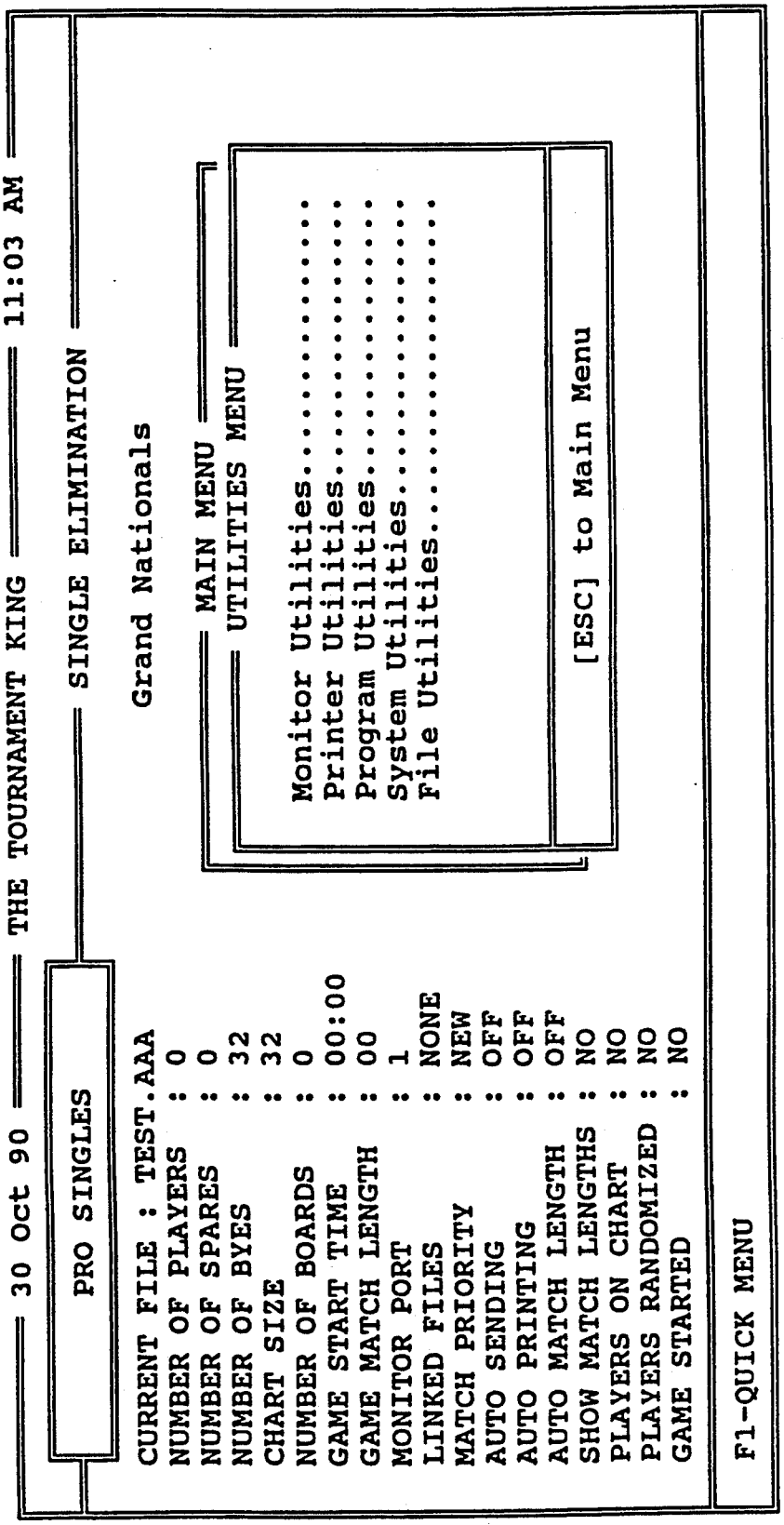
FIG. 47 is an illustration of the utilities menu of a preferred embodiment of the automatic universal tournament management system adapted to manage dart tournaments.
Figure 48:
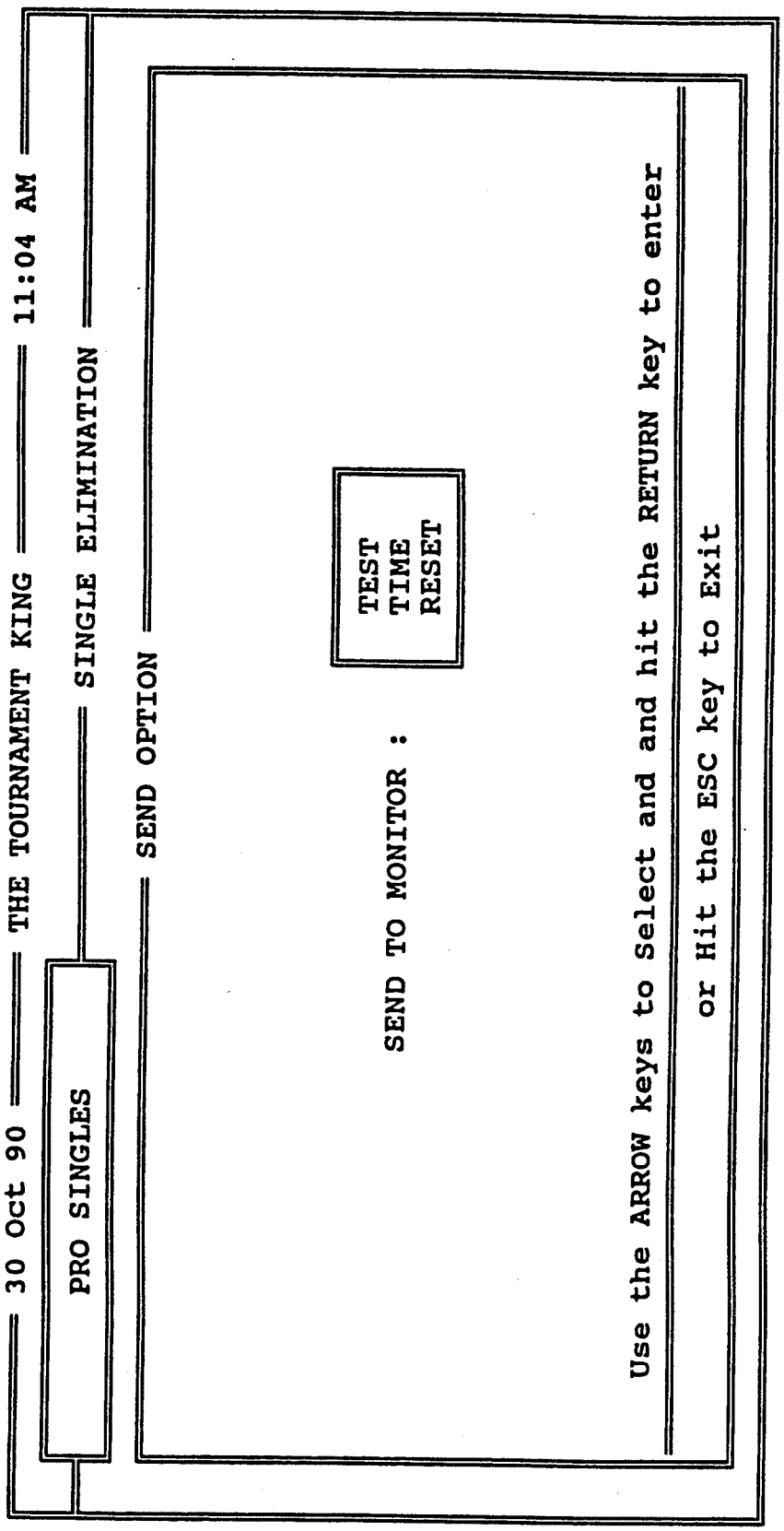
FIG. 48 is an illustration of the monitor utility selection screen of the utilities menu of a preferred embodiment of the automatic universal tournament management system adapted to manage dart tournaments.
Figure 49:
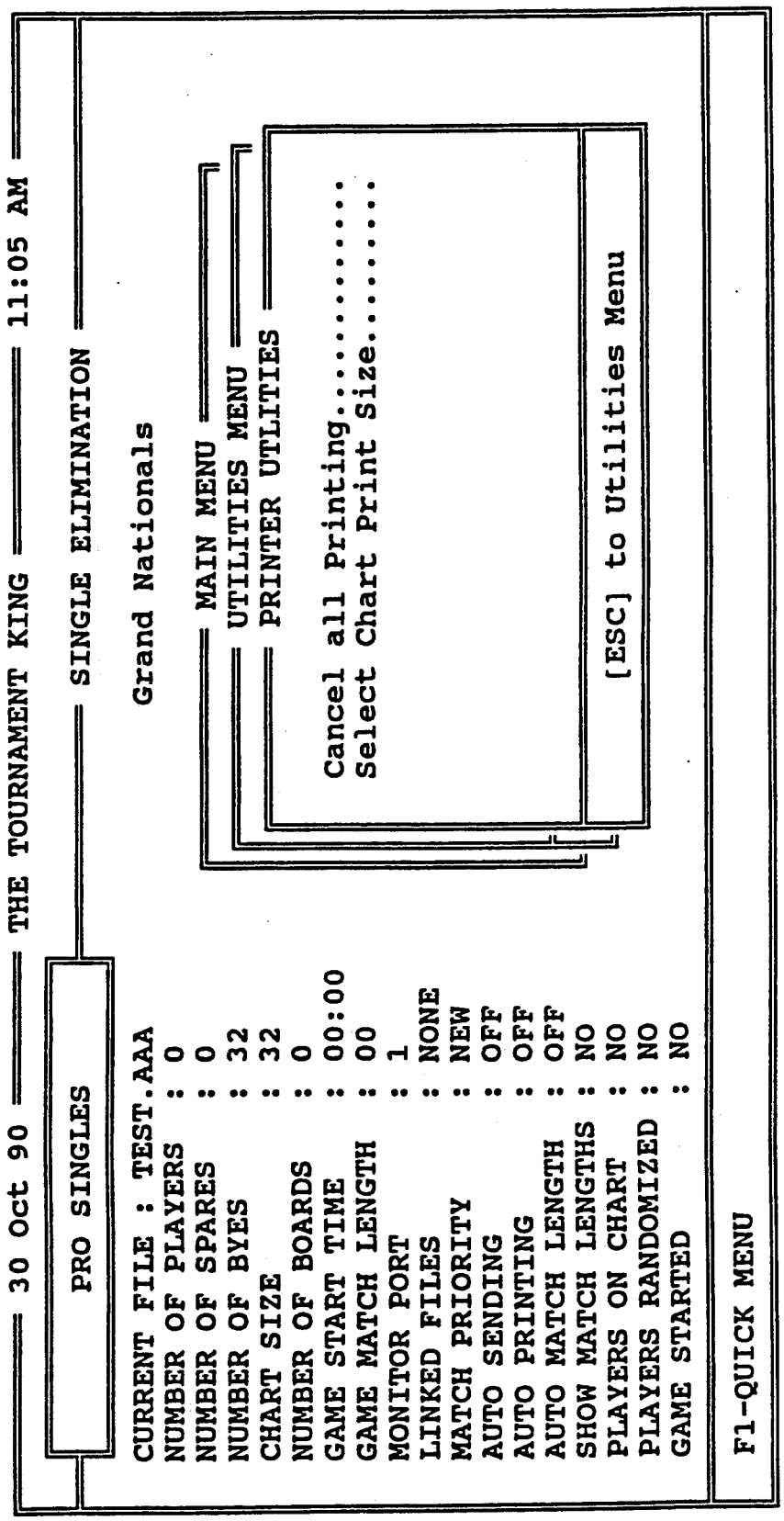
FIG. 49 is an illustration of the printer utilities submenu of the utilities menu of a preferred embodiment of the automatic universal tournament management system adapted to manage dart tournaments.
Figure 50:
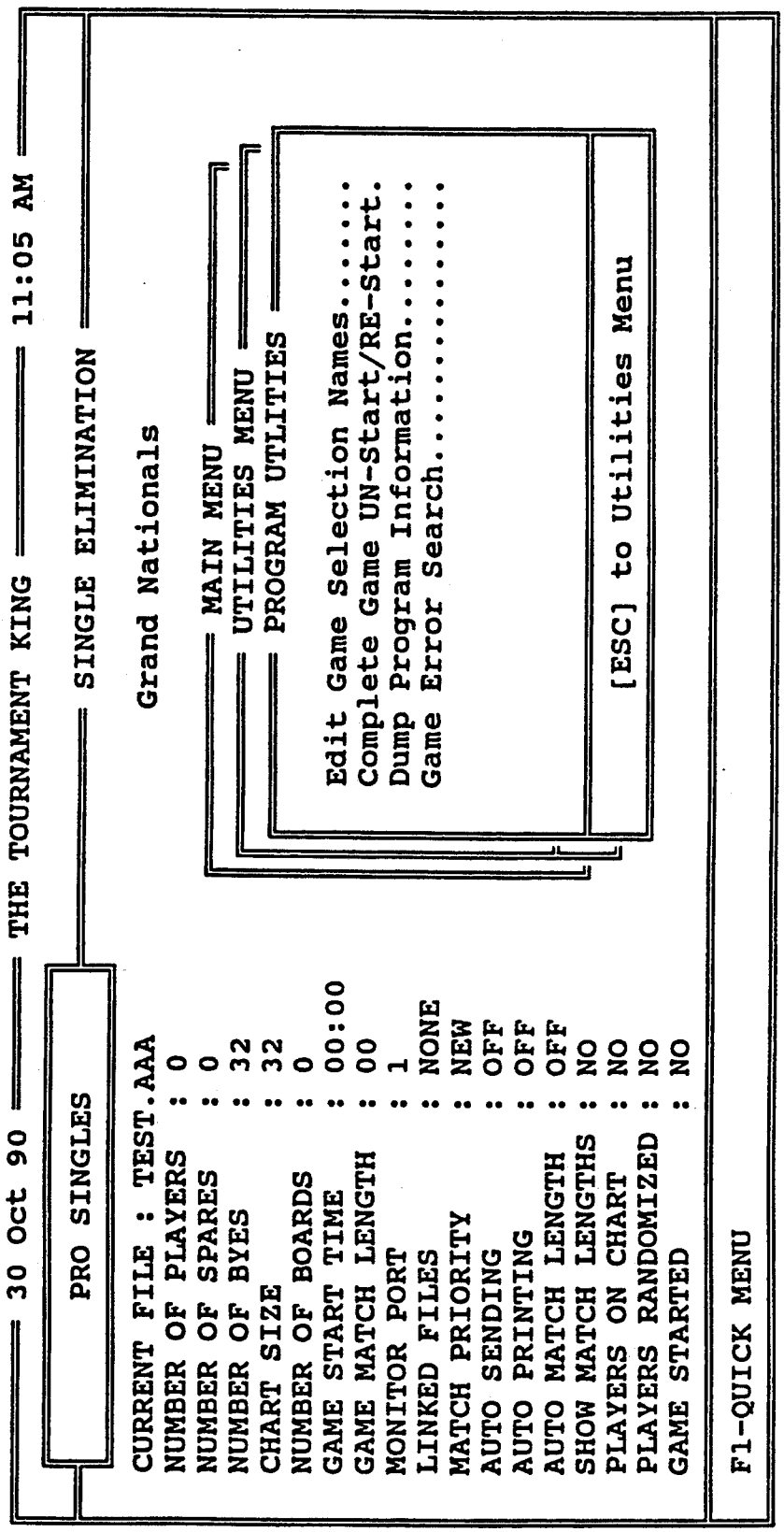
FIG. 50 is an illustration of the program utilities submenu of the utilities menu of a preferred embodiment of the automatic universal tournament management system adapted to manage dart tournaments.
Figure 51:
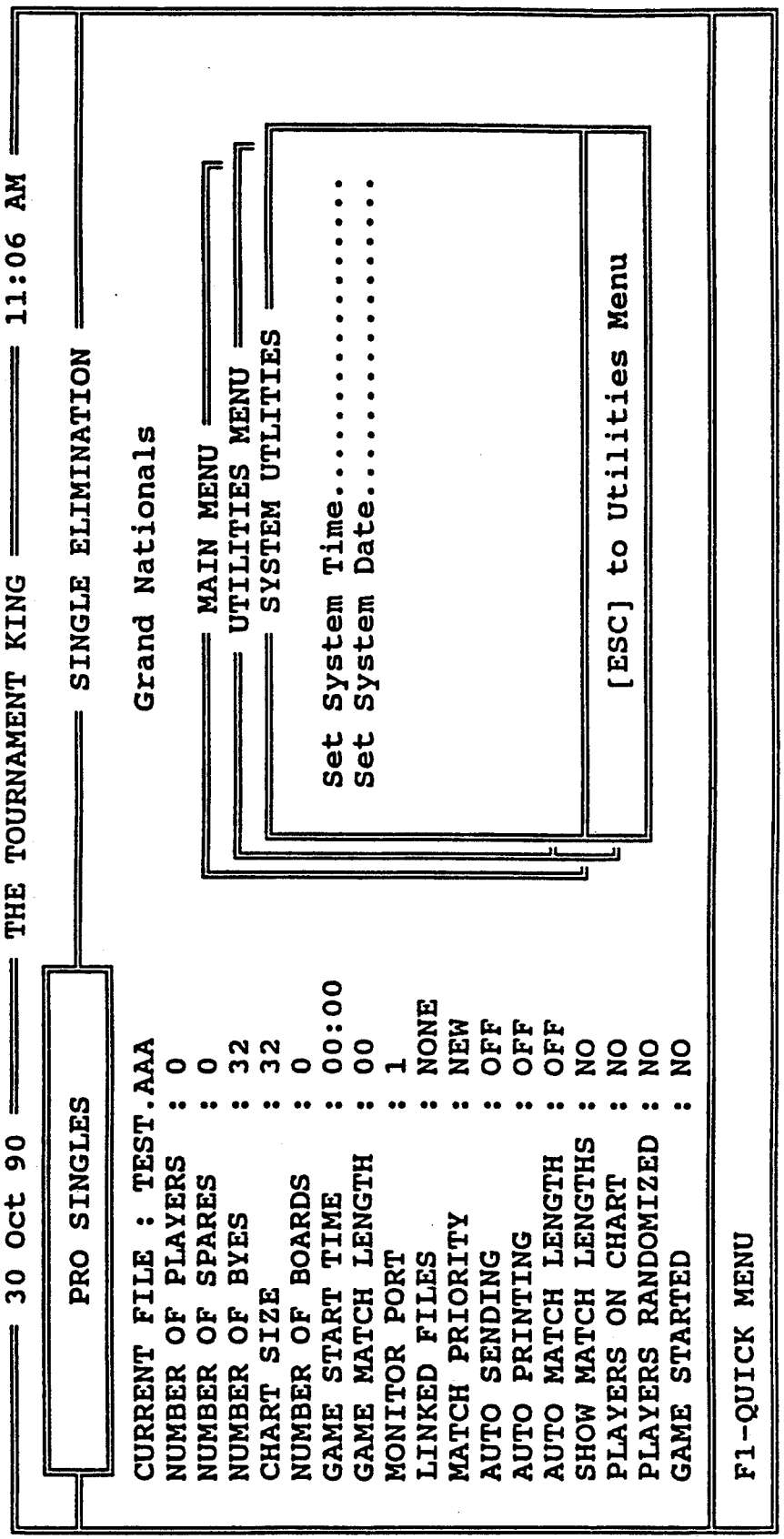
FIG. 51 is an illustration of the system utilities submenu of the utilities menu of a preferred embodiment of the automatic universal tournament management system adapted to manage dart tournaments.
Figure 52:
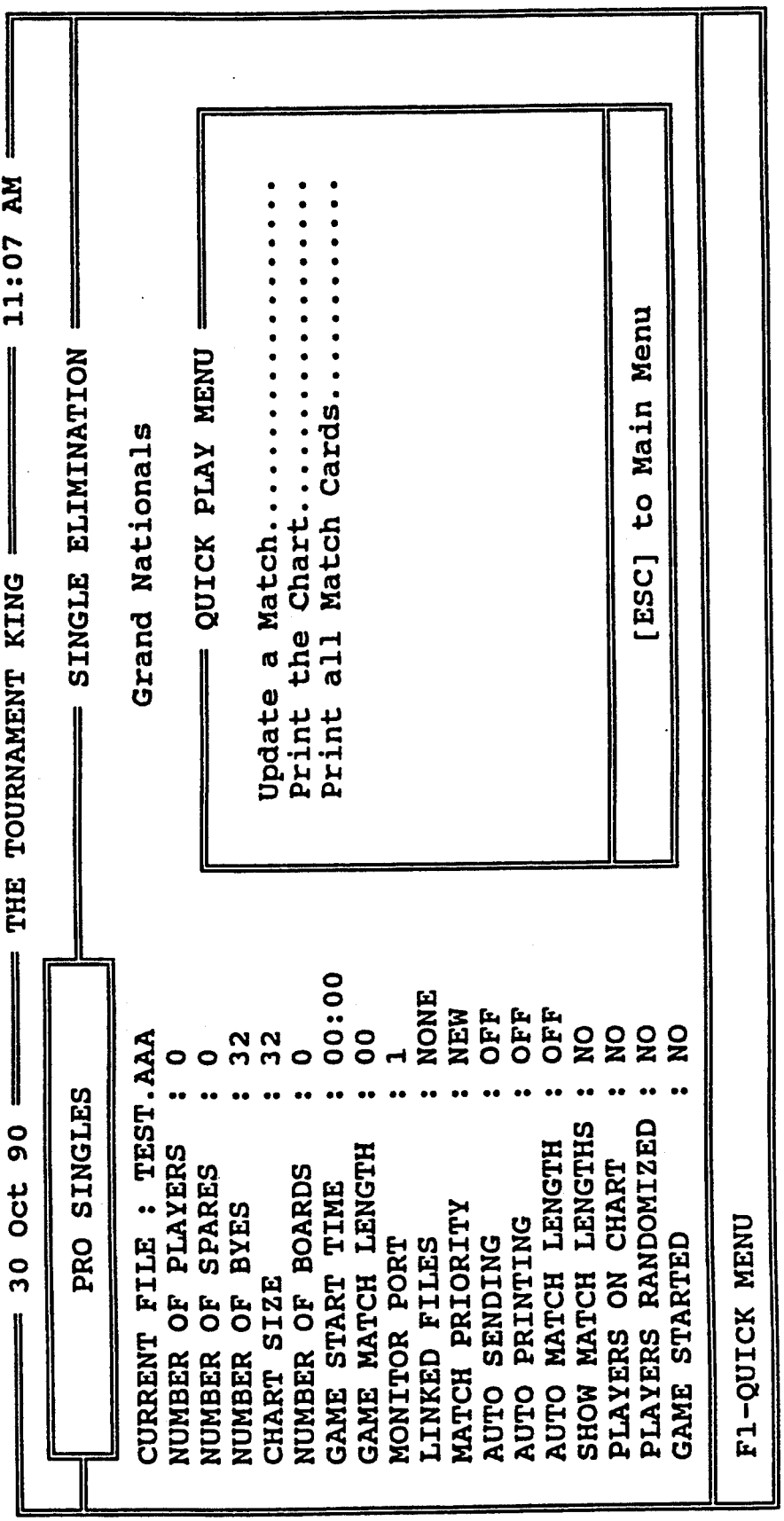
FIG. 52 is an illustration of the file utilities submenu of the utilities menu of a preferred embodiment of the automatic universal tournament management system adapted to manage dart tournaments.

Match Options may be selected from the "Play Menu" as is illustrated by the screen shown in FIG. 36. FIGS. 40, 41, and 42 illustrate other important "Play Menu" submenus.

If the "Advance Play" option is selected from the "MAIN MENU" (FIG. 18) the screens illustrated in FIGS. 37, 38, 39, and 43 through 46 will appear on the monitor 18 to prompt the operator.

The "Utilities Menu" is illustrated in FIG. 47 and FIGS. 48 through 52 illustrate the various options available to the tournament operator via the "Utilities Menu."

Figure 53:
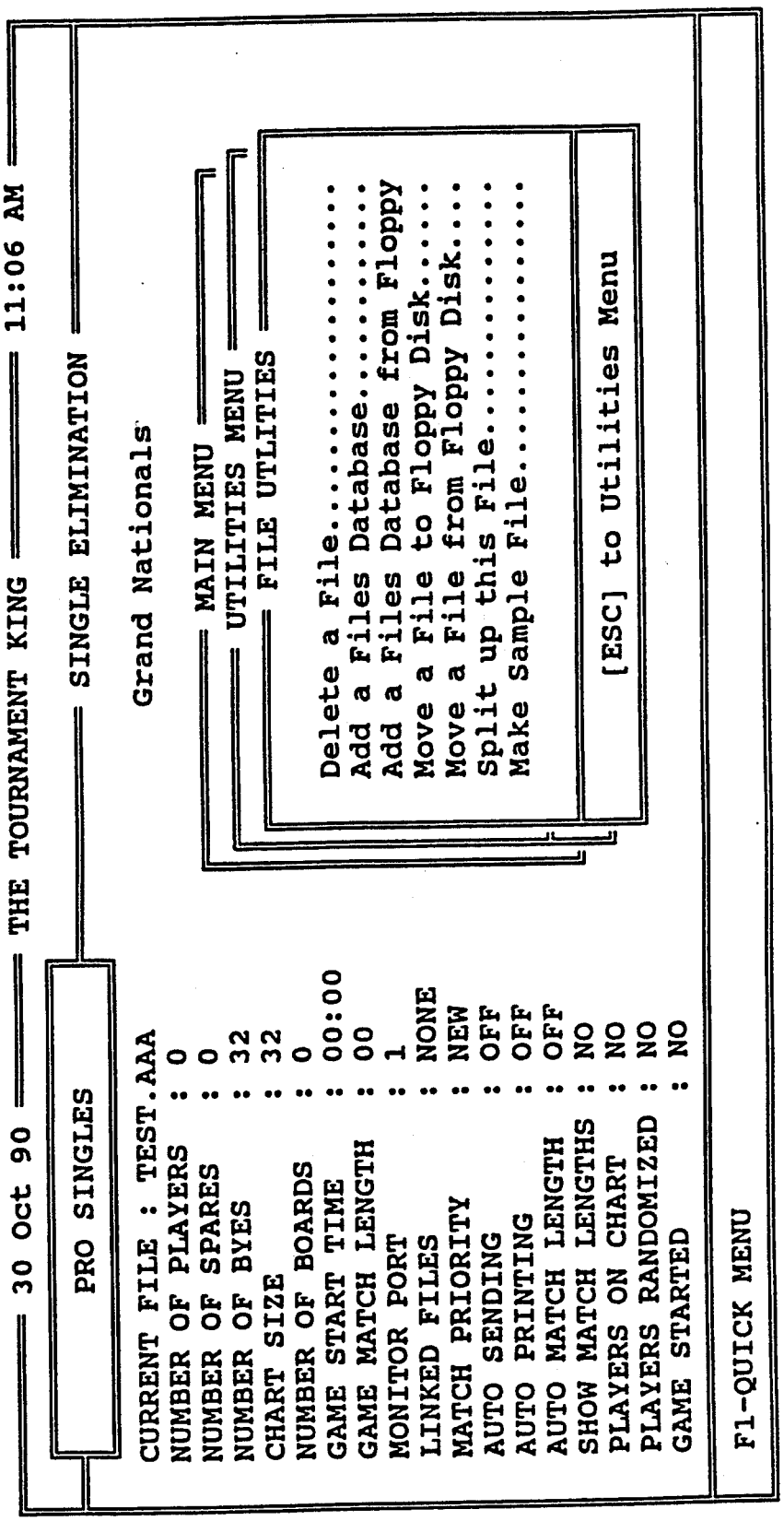
FIG. 53 is an illustration of the quick play menu of a preferred embodiment of the automatic universal tournament management system adapted to manage dart tournaments.

The "QUICK MENU" may be accessed from any screen by pressing F1. The options available under the "QUICK MENU" are illustrated in FIG. 53.

The following algorithms, written in C, will be helpful to those skilled in the art who desire to practice the invention.

Figure 32:
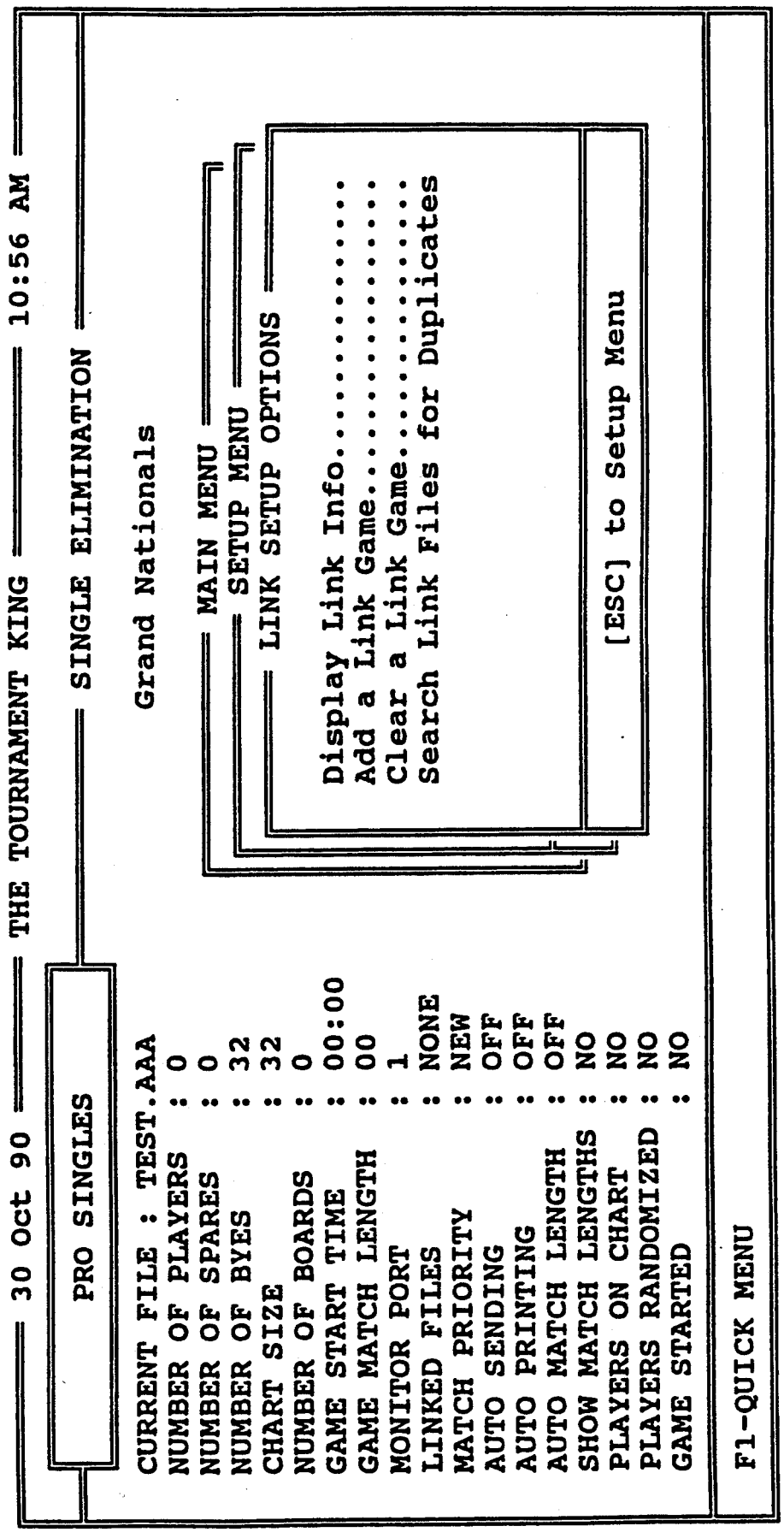
FIG. 32 is an illustration of the link setup options submenu of the setup menu of a preferred embodiment of the automatic universal tournament management system adapted to manage dart tournaments.

```
illustrated in Figure 32 will appear.

If "Chart Options" is selected from the "MAIN MENU" (Figure
18) the menu illustrated in Figure 33 will appear on the monitor
18.  Likewise, if the "Play the Game" option is selected from the
"MAIN MENU" the menu illustrated in Figure 34 appears.  The
operator is prompted by the screen illustrated in Figure 35 to
start the game.

Match Options may be selected from the "Play Menu" as is
illustrated by the screen shown in Figure 36.  Figures 40, 41, and
42 illustrate other important "Play Menu" submenus.

If the "Advance Play" option is selected from the "MAIN MENU"
(Figure 18) the screens illustrated in Figures 37, 38, 39, and 43
through 46 will appear on the monitor 18 to prompt the operator.

The "Utilities Menu" is illustrated in Figure 47 and Figures
48 through 52 illustrate the various options available to the
tournament operator via the "Utilities Menu."
```

The "QUICK MENU" may be accessed from any screen by pressing F1. The options available under the "QUICK MENU" are illustrated in Figure 53.

The following algorithms, written in C, will be helpful to those skilled in the art who desire to practice the invention.

Algorithm to determine winners bracket winner placement on chart:

```c
win_to_win()
{
int round,k,count;div_t x:
for( round=1, count=game.chart_size/2 ; count>=1;round++, count=count/2 ) {
   for( k=1 ;k<=count; k++ ) {
      if( p11.round==round && p11.match[0][0]==k ) {
  . .  p11.round++;
         x=div(k+1,2);
         p11.match[0][0]=x.quot;

return(1);
    }
  }
  if( count÷+1 ) { return(0);}}}
```

Algorithm to determine winners bracket loser placement on chart:

```c
win_to_lose()
{
    if( win_to_lose_first() ) {      return(1);}
 else if( win_to_lose_last() ) {     return(1);}
 else if( win_to_lose_second() ) {   return(1);}
 else if( win_to_lose_od_first() ) { return(1);}
 else if( win_to_lose_od_second() ) { return(1);}
 else if( win_to_lose_ev_first() ) { return(1);}
 else if( win_to_lose_ev_second() ) { return(1);}
return(O);} win_to_lose_first()
{
div_t x;
if( p11.round==1 ) {
      x+div(p11.match[O][O]+1,2);
      p11.match[O][O]=x.quot;
      p11.round++;
      p11.bracket[O][O]=O;
      return(1);
}
return(O);} win_to_lose_last()
{
if( p11.round==max_round() ) {
      p11.match[O][O]=1;
      p11.round=p11.round*2-1;
      p11.bracket[O][O]=O;
      return(1);
}
return(O);}
```

```
win_to_lose_second()
{
int j,k;
if(p11.round==2 ) {
   for( k=1,j=game.chart_size/4 ;j>=1; k++,j-- ) {
        if( p11.match[O][O]==k ) {
                  p11.round=3;
                  p11.match[O][O]=j;
                  p11.bracket[O][O]=O;
                  return(1);
         }
     }
} return(O);} win_to_lose_od_first()
{
int round,k,count,j;
for(round-3,coutn-game.chart_size/8;count>1;round-round+2,count=count/4){
   for ( k-1,j-count/2+1 ;j<=count; k++,j++ ) {
      if ( p11.round==round && p11.match[O][O]==k ) {
                  p11.round=p11.round*2-1;
                  p11.match[O][O]=j;
                  p11.bracket[O][O]=O;
                  return(1);
        }
   }
   if( count<=2 ) { return(O);}
}
return(O);} win_to_lose_od_second()
{
int round,k,count,j;
for(round=3,count=game.chart_size/8;count>=1;round=round+2,count=count/4) {
   for( k=count/2+1,j=1 ;k<=count; k++,j++ ) {
        if( p11.round==round && p11.match[O][O]==k ) {
                  p11.round=p11.round*2-1;
                  p11.match[O][O]=j;
                  p11.bracket[O][O]=O;
                  return(1);
        }
   }
   if( count<=2 ) { return(O);}
}
return(O);} win_to_lose_ev_first()
{
int round,j,k,count;
for(round=4,count=game.chart_size/16;count>1;round=round+2,count=count/4){
   for ( k=1, j=count/2 ;k<=count/2; k++, j-- ) {
        if( p11.round==round && p11.match[O][O]==k ) {
                  p11.round=p11.round*2-1;
                  p11.match[O][O]=j;
                  p11.bracket[O][O]=O;
                  return(1);
        }
   }
   if( count<=2 ) ( return(O);}
}
return(O);}
```

```
win_to_lose_ev_second()
{int round,j,k,count;
for(round=4,count=game.chart_size/16;count>1;round=round*2,count=count/4){ for( k=count/2+1, j=count ;k<=count; k++, j-- ) {
        if( p11.round==round && p11.match[O][O]==k ) { p11.round=p11.round*2-1;
        p11.match[O][O]=j;
        p11.bracket[O][O]=O;
        return(1);

}
  }
  if( count<=2 ) { return(O);}
}
return(O);}
```

Algorithms to determine loser bracket winners placement on double elimination charts:

```
lose_to_lose()
{
if( lose_to_lose_odd() ) {           return(1);}
else if(lose_to_lose_even() ) {      return(1);}
return(O);} lose_to_lose_odd()
{
int round,k,count;div_t x;
for(round=1,count=game.chart_size/2;count>=1;round=round*2,count=/2){
   for( k=1 ;k<=count; k++ ) {
        if( count !=1 && p11.round==round && p11.match[O][O]==k ) {
                p11.round++;
                x=div(k+1,2);
                p11.match[O][O]=x.quot;
                return(1);
        }
        else if( count==1&&p11.round==round&&p11.match[O][O]==1){
                x=div(round+3,2);
                p11.round=x.quot;
                p11.match[O][O]=1;
                p11.bracket[O][O]=1;
                game.last_match=1;
                return(1);
        }
    }
    if( count==1 ) { return(O);}}} lose_to_lose_even()
{
int round,k,count;
for(round=2,count=game.chart_size/4;count>=1;round=round+2,count=count/2){
  for( k-1 ;k<=count; k++ ) {
    if( p11.round==round && p11.match[O][O]==k ) {
             p11.round++;
             p11.match[O][O]=k;
             return(1);

}

}
  }
  if( count==1 ) { return(O);}}}
```

Algorithm to determine if a match on the chart is a 'BYE':

```
a_bye(m)int m;
int count,scount,dec,start;count=1;

if( count==game.byes ) {
        if( m==game.chart_size/2 ) {
                return(1);
        }
        return(0);
}
else if( count<game.byes ) {
        while( count<=game.byes ) {
                count=count*2;
        }
        count=count/2;
        dec=game.chart_size/(count*2);
        scount=game.byes-count;
        start=game.chart_size/2;
        while( count ) {
                if( m==start ) {
                        return(1);
                }
                count--;
                start=start-dec;
        }
        start=game.chart.size/2-dec/2;
        while( scount ) {
                if( m==start ) {
                        return(1);
                }
                scount--;
                start=start-dec;
        }
}
return(0);}
```

Algorithm to determine if a match on the chart is an 'ADVANCE' for double elimination charts:

```
advance(m,r)int m,r;
{
int count,scount,dec,start;count=1;

if(game.elimination==2){
if( count<=game.byes && r==2 ) {
        if( count==game.byes ) {
                if( m==game.chart_size/4 ) {
                        return(1);

}
                return(0);
        }
        while( count<=game.byes ) {
                count=count*2;
        }
        count=count/2;
        dec=game.chart_size/(count*4);
        scount=game.byes-count;
        start=game.chart_size/4;
        while( count ) {
                if( m==start ) {
                        return(1);
                }
                count--;
                start=start-dec;
        }
```

```
                start=game.chart_size/4-dec/2;
                while( scount ) {
                        if( m==start ) {
                                return(1);
                        }
                        scount--;
                        start=start-dec;

}
}
else if( r==3 && game.byes-game.chart_size/4>0 ) {
        count=game.byes-game.chart_size/4;
        start=game.chart_size/4;
        while( count ) {
           if( m==start ) {
               return(1);
           }
           count--;
           start--;
    }
}
}return(0);}
```

Algorithms for master scheduling for double elimination charts:

```
schedule()
{
int     r=get_win_side(),
        count=all_count();
if( count!=-1 ) {
    p11.btime[0][0]=count*game.match_length[r][1];
    p11.btime[0][0]=time_plus_min(game.wtime[r][1],p11.btime[0][0]);
    p11.status=0;
    return(1);
}
return(0);} all_count()
{
int br,m,r,wr,lr,mm,size,count,bcount,bptr;
br=p11.bracket[0][0]
m=p11.match[0][0]
r=p11.round;

wr=1;lr=2;bcount=1;bptr=1;count=0;

check_up(wr,bptr,count);
bptr=game.bstart[wr][1];

for( mm=1, size=game. chart_size/2 ;mm<=size; mm++ ) {
   if( m==mm && r==wr && br==1 ) {
      get_board(1,bptr);
      return(count);
   }
if( !a_bye(mm) ) {
   bcount++;
   bptr++;
   if( bcount>game.bnums[1][1] ) {
        bcount=1;
        count++;

game.bup[1][1]=1;
   }
}
if( bptr>game.bnums[1][1] ) {
        bptr=1;
        game.bup[1][1]=1;

}
```

```
    }
}
wr=2;
count++;
check_up(wr,bptr,count);
count=0;
bcount=1;
bptr=game.bstart[wr][1]

for( mm=1, size/2 ;mm<=size; mm++ ) {
   if( m==mm && r=wr && br==1 ) {
        get_board(2,bptr);
        return (count);
   }
   bcount++;
   bptr++;
   if( bcount)game.bnums[wr][1] ) {
      bcount=1;
      count++;
      game.bup[wr][1]=1;
   }
if( bptr>game.bnums[wr][1] ) {
   bptr=1;
   game.bup[wr][1]=1;
   }
} for( mm=1 ;mm<=size; mm++ ) {
   if( m==mm && r==lr && br==0) {
   get_board(2,bptr);
   return(count);
   }
   if( !advance(mm,2) ) {
   bcount++;
   bptr++;
   if( bcount>game.bnums[2][1] ) {
         bcount=1;
         count++;
         game.bup[wr][1]=1;
   }
   if( bptr)game.bnums(wr)(i) ) (
        bptr=1;
          game.bup[wr][1]=1;
      }
   }

}
lr++;
count++;
bcount=1;

for( mm=1 ;mm<size; mm++ ) {
   if( m==mm && r==lr && br==0) {
   get_board(2,bptr);
   return(count);
   }
   if( !advance(mm,3) ) {
   bcount++;
   bptr++;
   if( bcount>game.bnums[2][1] ) { bcount=1;
   count++;
   game.bup[wr][1]=1;
```

```
                }
            if( bptr>game.bnums[wr][1] ) {
                    bptr=1;
                    game.bup[wr][1]=1;

}
        }
    }
    while( wr<=max_round() ) {
            count++;
            wr++;
            check_up(wr,bptr,count);
            count=0;
            bcount=1;
            bptr=game.bstart[wr][1];

if( size>1 ) { size=size/2; } for( mm=1 ;mm<=size; mm++ ) {
                    if( m==mm && r==wr && br==1 ) {
                            get_board(wr,bptr);
                            return(count);
                    }
                    bcount++;
                    bptr++;
                    if( bcount>game.bnums[wr][1] ) {
                            bcount=1;
                            count++;
                            game.bup[wr][1]=1;
                    }
                    if( bptr>game.bnums[wr][1] ) {
                            bptr=1;
                            game.bup[wr][1]=1;

}
            } lr++;
        for( mm=1 ;mm<=size; mm++ ) {
                if( m==mm && r==lr && br==0 ) {
                        get_board(wr,bptr);
                        return(count);
                }
                bcount++;
                bptr++;
                if( bcount>game.bnums[wr][1] ) {
                        bcount=1;
                        count++;
                        game.bup[wr][1]=1;
                }
                if( bptr>game.bnums[wr][1] ) {
                        bptr=1;
                        game.bup[wr][1]=1;
                }
        }
    lr++;
    count++;
    bcount=1;
    for( mm=1 ;mm<=size; mm++ ) {
            if( m==mm && r-lr && br==0 ) {
                    get_board(wr,bptr);
                    return(count);
            } bcount++;
            bptr++;
```

```
            if( bcount>game.bnums[wr}{1] ) {
                    bcount=1;
                    count++;
                    game.bup[wr][1]=1;
            }
            if( bptr>game.bnums[wr][1] ) {
                    bptr=1;
                    game.bup[wr][1]=1
            }
        }
    }
return(-1);} check_up(wr,bptr,count)int wr,bptr,count;
{
if( !game.rup[wr][1] ) {
        update_match_length(wr);
        update_time(wr,count);
        update_bnum(wr,bptr);
        game.rup[wr][1]=1;
}} update_match_length(wr)int wr;
{
if( !game.match_length[wr][1] ) {
        game.match_length[wr][1]=game.match_length[wr-1][1];
        if( wr==3 ) {
                if( game.length ) {
                        game.match_length[3][1]=game.match_length[3][1]-10;
                }
        }
        if( wr>3 ) {
                if( game.length ) {
                        check_adjust(wr);
                }
        }
    }
if( game.match_length[wr][1]<=O ) { game.match_length[wr][1]=30; }
} update_time(wr,count)int wr,count;
{
if( !game.wtime[wr][1] ) {
    game.wtime[wr][1]=count*game.match_length[wr-1][1]+game.postpone[wr][1];
    game.wtime[wr][1]=time_plus_min(game.wtime[wr-1][1],game.wtime[wr][1];
}} get_win-side()
{
int w;div_t x;
w=p11.round;
if( !p11.bracket[O]{o} ) {
        x=div(w,2);
        if( !x.rem ) { x=div(w+2,2); }
        else { x=div(w+1,2); }
        return(x.quot);
}return(w);} update_bnum(wr,bptr)int wr,bptr;

{
if( !game.bnums[wr][1] ) {
            xfer_boards(wr);
            game.bnums[wr][1]=in_total(wr);
```

```
{
if( !game.bnums[wr][1]) {
        errors(71);
        get_more_boards(wr);
}
if( bptr>game.bnums[wr][1] ) { bptr=random(game.bnums[wr][1]); }
if( !bptr ) { bptr=1; }
game.bstart[wr][1]=bptr;} xfer_boards(wr)int wr;
{
int j;
for( j=1 ;j<=260; j++ ) {
   if( !game.marked[wr-1][j] && game.total[wr-1][j] ) {
       game.total[wr][j]=game.total[wr-1][j];
       }
}} get_more_boards(wr)int wr;
{
int j;
for( j=1 ;j<=260; j++ ) {       game.total[wr][j]=game.total[0][j];    }
game.bnums[wr][1]=in_total(wr);} get_board(wr,bptr)int wr,bptr;
{
int k,count;
for( k=1, count=0 ;k<=260; k++ ) {
        if( game.total[wr][k] ) {
                count++;
                if( count==bptr ) {
                        p11.board[0][0]=k;
                        game.in_use[wr][k]++;
                        if(game.bad[k]){p11.board[0][0]=game.bad[k];}
                        return(k) ;
                }
        }
}
return(0);} return_board(wr)int wr;
{
int b=p11.board[0][0];
if (game.in_use[wr][b] ) { game.in_use[wr][b]--;save_game();}} check_adjust(r)int r;
{
    if( game.match_length[r][1]>game.parts[0]+5 ) { adjust_length(1,r); }
else if( game.match_length[r][1]<game.parts[0]-5 ) { adjust_length(0,r); }
} adjust_length(n,r)int n,r;
{
int pick,ad;
setkbloop(NULL);
kbclear();

menu1();
switch( n ) {
        case 0:ad=game.match_length[r][1]-5;break;
        case 1:ad=game.match_length[r][1]+5;break;
}
wcenters(1,LCYAN|_BLUE,"MATCH LENGTH ADJUST");
wgotoxy(3,8);
wprintf("CURRENT MATCH LENGTH : %2.2D MINUTES",game.match_length[r][1]);
wgotoxy(4,8);
wprintf("AVERAGE MATCH LENGTH : %2.2D MINUTES",game.parts[0]);
wgotoxy(5,8);
```

```
wprintf("ADJUSTED MATCH LENGTH: %2.2d MINUTES",ad);
menu1(1);
wprints(12,16,YELLOW|_BLACK,"DO YOU WISH TO MAKE THE ADJUSTMENT ?");
wopen(11,52,14,62,1,YELLOW|_BLACK,YELLOW|_BLACK);
yn();pick=wmenuget();wclose();wclose();
if( pick==1 ) { game.match_length[r][1]=ad; }wclose();}
```

While the invention has been described with a certain degree
of particularity, it is manifest that many changes may be made in
the details and arrangement of components without departing from
the spirit and scope of the disclosure. It is understood that the
invention is not limited to the embodiments set forth herein for
purposes of exemplification, but is to be limited only by the scope While the invention has been described with a certain degree of particularity, it is manifest that many changes may be made in the details and arrangement of components without departing from the spirit and scope of the disclosure. It is understood that the invention is not limited to the embodiments set forth herein for purposes of exemplification, but is to be limited only by the scope of the appended claims including the full range of equivalency to which each element thereof is entitled.

Thus, there has been shown and described an automatic universal tournament management system which accomplishes at least all of the stated objects.

I claim:

1. An automatic universal tournament management system adapted to schedule tournaments, comprising,
   a digital computer having a processor, memory, at least one input port, and at least one output port;
   data entry means for entering and converting tournament information including team/player information, match site information, tournament time information and match results into machine readable tournament information data signals;
   first data transfer means connected between said data entry means and said computer input port for transferring tournament information data signals to said computer via said computer input port;
   means for receiving, loading and storing said tournament information data signals into said computer memory;
   said digital computer further comprising data signal processing means for retrieving said tournament information data signals stored in said computer memory and processing said signals for producing a match scheduling and tournament results chart output including location, time and bracket information for a number of teams/players;
   said data signal processing means being operative to initially process said data signals by automatically placing from 17 to 2,048 teams/players in a tournament bracket and assigning an opponent or a bye and automatically initially organizing said match scheduling and tournament results chart output with said initially processed signals;
   said data signal processing means being operative automatically assign a chart size to said match scheduling and tournament results chart output based on the number of teams/players input through said data entry means, said chart size selected from the chart size group consisting of 32 slots, 64 slots, 128 slots, 256 slots, 512 slots, 1,024 slots and 2,048 slots;
   said data signal processing means automatically assigning a number of byes to said chart output equal to the number of teams/players subtracted from the selected chart size;
   second data transfer means;
   an output device adapted to display said match scheduling and tournament results chart output processed from said tournament information data signals; and
   said output device connected to the output port of said computer via said second data transfer means whereby said match scheduling and tournament results chart output is converted into human readable form via said output device thereby informing tournament teams/players of tournament results, scheduled matches and match times.

2. The automatic universal tournaments management system of claim 1, wherein said digital computer is a conventional personal computer.

3. The automatic universal tournament management system of claim 1, wherein said data entry means is a conventional digital computer keyboard.

4. The automatic universal tournament management system of claim 1, wherein means for receiving, loading, and storing said tournament information data signals into said computer memory is a digital computer microprocessor.

5. The automatic universal tournament management system of claim 1, wherein said output device is at least one computer display.

6. The automatic universal tournament management system of claim 1, further comprising a plurality of computer displays operatively connected to said output port.

7. The automatic universal tournament management system of claim 1, further comprising means for printing tournament charts.

8. The automatic universal tournament management system of claim 7, wherein said means for printing tournament charts comprises at least one chart printer adapted to receive said match scheduling and tournament results chart output and print said chart output in human readable form.

9. The automatic universal tournament management system of claim 8, wherein said chart printer prints portions of said tournament charts in segments said tournament charge being updated by printing and then inserting into said tournament chart only those segmented portions of said chart that contain updated tournament information.

10. The automatic universal tournament management system of claim 1, further comprising means for printing one or more match cards, said match cards including player or team name, match starting time and related tournament information.

11. The automatic universal tournament management system of claim 1, wherein said digital computer is operative to process several sets of tournament information simultaneously such that several tournaments may be continuously updated and processed.

12. An automatic universal tournament management system adapted to schedule tournaments, comprising:
   a digital computer having a processor, memory, at least one input port, and at least one output port;
   data entry means for entering and converting tournament information including team/player information, match site information, tournament time information, and match results into machine readable tournament information data signals;
   first data transfer means connected between said data entry means and said computer input port for transferring tournament information data signals to said computer via said computer input port;
   means for receiving, loading, and storing said tournament information data signals into said computer memory;
   said digital computer further including data signal processing means for retrieving said tournament information data signals stored in said computer memory and processing said signals for producing a match scheduling and tournament results chart output including location, time and bracket information for a number of team/players; second data transfer means;
   an output device adapted to display said match scheduling and tournament results chart output processed from said tournament information data signals; and
   said output device connected to the output port of said computer via said second data transfer means whereby said match scheduling and tournament results chart output is converted into human readable form via said output device thereby informing tournament teams/players of tournament results, scheduled matches and match times;
   said output device comprising means for printing said tournament chart output;
   said means for printing tournament charts comprising at least one chart printer adapted to receive said match scheduling and tournament results chart output and print said chart output in human readable form; and
   said chart printer printing portions of said tournament charts in segments said tournament chart being updated by printing and then inserting into said tournament chart only those segmented portions of said chart that contain updated tournament information.

13. A universal method of automatically managing a tournament by providing in combination: a digital computer; data entry means; data signal processing means for scheduling, tracking, recording, and displaying tournament information; at least one first output device adapted to display tournament information; and at least one second output device adapted to print tournament information; wherein said method comprising the steps of:
   (a) inputting tournament information via said data entry means, said tournament information including names of team/players;
   (b) selecting between single and double elimination tournament chart format;
   (c) automatically initially processing said tournament information according to said selected tournament chart format and automatically limiting the chart size according to the number of teams/players such that teams/players are automatically matched against an opponent or given a bye in said tournament chart format;
   (d) displaying said processed tournament information on at least one of said first output devices;
   (e) printing at least one tournament chart via one of said second output devices in segmented portions that may be posted so that when placed together said segmented portions depict said tournament chart indicating team/player first matches, byes and extra teams/players;
   (f) inputting the winner and/or loser of each match via said data entry means;
   (g) automatically reprocessing said tournament information containing said winner of each match, and automatically generating updated tournament information;
   (h) printing those segmented portions of said tournament chart containing updated tournament information;
   (i) updating said tournament chart by replacing outdated segmented portions of said tournament chart with segmented portions of said tournament chart containing updated tournament information; and
   (j) repeating said steps (f), (g), (h) and (i) until a tournament winning team/player is determined by inputting the winner and/or loser of the final match of said tournament.

14. The universal method of automatically managing a tournament of claim 13, further comprising the step of providing means to add additional tournament information during or after said processing step whereby said tournament information may be reprocessed to include said additional tournament information;

15. The universal method of automatically managing a tournament of claim 13, further comprising the step of providing means to modify existing tournament information during or after said processing and modifying said existing tournament information whereby said tournament information may be reprocessed to include said modified tournament information.

16. An automatic universal tournament management system adapted to schedule tournaments, comprising:
   a digital computer having a processor, memory, at least one input port, and at least one output port;
   data entry means for entering and converting tournament information including team/player information, match site information, tournament time information, and match results into machine readable tournament information data signals;

first data transfer means connected between said data entry means and said computer input port for transferring tournament information data signals to said computer via said computer input port;

means for receiving, loading, and storing said tournament information data signals into said computer memory;

said digital computer further including data signal processing means for retrieving said tournament information data signals stored in said computer memory and processing said signals for producing a match scheduling and tournament results chart output including location, time and bracket information for a number of team/players;

said data signal processing means automatically initially processing said data signals automatically placing from 17 to 2,048 teams/players in a tournament bracket and assigning an opponent or a bye and automatically initially organizing said match scheduling and tournament results chart output with said initially processed signals.

second data transfer means;

an output device adapted to display said match scheduling and tournament results chart output processed from said tournament information data signals; and said output device connected to the output port of said computer via said second data transfer means whereby said match scheduling and tournament results chart output is converted into human readable form via said output device thereby informing tournament teams/players of tournament results; scheduled matches and match times;

said output device comprising means for printing said tournament chart output;

said means for printing tournament charts comprising at least one chart printer adapted to receive said match scheduling and tournament results chart output and print said chart output in human readable form;

said chart printer printing portions of said tournament charts in segments, said tournament chart being updated by printing and then inserting into said tournament chart only those segmented portions of said chart that contain updated tournament information; and said system adapted to schedule a tournament selected from the group consisting of tennis tournaments, racquetball tournaments, softball tournaments, baseball tournaments, golf tournaments, bowling tournaments, racing tournaments, dart tournaments, chess tournaments, pool tournaments, horseshoes tournaments, and marksmanship tournaments.

17. A universal method of automatically managing a tournament wherein said method comprises the steps of:
(a) providing in combination: a digital computer; data entry means; data signal processing means for scheduling, tracking, recording and displaying tournament information; at least one first output device adapted to display tournament information; and at least one second output device adapted to print tournament information;
(b) initiating said program;
(c) selecting one set of tournament information, from those stored by said computer, through said data entry means;
(d) inputting a chart type, either single or double elimination, a start time, the length of the match, and the number of sporting locales available for tournament play through said data entry means;
(e) inputting teams/players through said data entry means for inclusion on said chart;
(f) said data signal processing means automatically producing an initial tournament chart by automatically placing said teams/players in said chart, automatically assigning opponents and automatically placing byes when all teams/players are entered in said chart to complete said chart;
(g) displaying said tournament chart on at least one of said first output devices;
(h) printing at least one tournament chart via one of said second output devices in segmented portions that may be posted so that when placed together said segmented portions depict said tournament chart indicating team/player first matches, byes and extra teams/players;
(i) inputting the winner and/or loser of each match via said data entry means;
(j) said data signal processing means automatically reprocessing said tournament information containing said winner of each match, and automatically generating updated tournament information;
(k) printing those segmented portion of said tournament chart containing updated tournament information;
(l) updating said tournament chart by replacing outdated segmented portions of said tournament chart with segmented portions of said tournament chart containing updated tournament information; and
(m) repeating said steps (i), (j), (k) and (l) until a tournament winning team/player is determined by inputting the winner and/or loser of the final match of said tournament.

* * * * *